United States Patent
Arroyo et al.

(10) Patent No.: US 11,144,624 B2
(45) Date of Patent: Oct. 12, 2021

(54) SECURE LOGIN WITH AUTHENTICATION BASED ON A VISUAL REPRESENTATION OF DATA

(71) Applicant: Apple Inc., Cupertino, CA (US)

(72) Inventors: Vincent P. Arroyo, Union City, CA (US); Ramiro Calvo, Palo Alto, CA (US); Max M. Gunther, San Francisco, CA (US); Hannah S. Story, San Mateo, CA (US); Onar Vikingstad, San Jose, CA (US); Lin Yang, New York, NY (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 16/241,199

(22) Filed: Jan. 7, 2019

(65) Prior Publication Data

US 2019/0228140 A1    Jul. 25, 2019

Related U.S. Application Data

(60) Provisional application No. 62/620,422, filed on Jan. 22, 2018.

(51) Int. Cl.
  *G06K 9/00* (2006.01)
  *G06F 21/32* (2013.01)
  (Continued)

(52) U.S. Cl.
  CPC .............. *G06F 21/32* (2013.01); *G06F 21/36* (2013.01); *G06K 9/00087* (2013.01);
  (Continued)

(58) Field of Classification Search
  CPC ..... G06F 21/32; G06F 21/36; G06K 9/00087; G06K 9/00288; H04L 2463/082; H04L 63/0853; H04L 63/0861
  See application file for complete search history.

(56) References Cited

U.S. PATENT DOCUMENTS

| 6,922,147 B1 | 7/2005 | Viksnins et al. |
| 7,081,905 B1 | 7/2006 | Raghunath |

(Continued)

FOREIGN PATENT DOCUMENTS

| AU | 2015100708 A4 | 7/2015 |
| AU | 2015100709 A4 | 7/2015 |

(Continued)

OTHER PUBLICATIONS

Brief Communication regarding Oral Proceedings received for European Patent Application No. 19171661.2, dated May 28, 2020, 2 pages.

(Continued)

*Primary Examiner* — Avinash Yentrapati
(74) *Attorney, Agent, or Firm* — Dentons US LLP

(57) ABSTRACT

Techniques for managing secure login with authentication while viewing a unique code are described. In some examples, a requesting device displays a visual representation of data. An authenticating device detects the presence of the visual representation of data. The authenticating device prompts a user to provide authorization information at the authenticating device. The authenticating device receives a set of one or more inputs. The authenticating device transmits information authorizing access to content on the requesting device.

48 Claims, 37 Drawing Sheets

(51) Int. Cl.
  *H04L 29/06* (2006.01)
  *G06F 21/36* (2013.01)
  *H04W 12/77* (2021.01)
(52) U.S. Cl.
  CPC ...... *G06K 9/00288* (2013.01); *H04L 63/0853* (2013.01); *H04L 63/0861* (2013.01); *H04L 2463/082* (2013.01); *H04W 12/77* (2021.01)

(56) References Cited

U.S. PATENT DOCUMENTS

| | | |
|---|---|---|
| RE42,574 E | 7/2011 | Cockayne |
| 8,195,576 B1 | 6/2012 | Grigg et al. |
| 8,392,259 B2 | 3/2013 | MacGillivray et al. |
| 8,571,937 B2 | 10/2013 | Rose et al. |
| 8,880,055 B1 | 11/2014 | Clement et al. |
| 8,942,420 B2 | 1/2015 | Kim et al. |
| 9,355,393 B2 | 5/2016 | Purves et al. |
| 9,549,323 B2 | 1/2017 | Lee et al. |
| 2003/0142227 A1 | 7/2003 | Van Zee |
| 2003/0181201 A1 | 9/2003 | Bomze et al. |
| 2004/0169722 A1 | 9/2004 | Pena |
| 2005/0253814 A1 | 11/2005 | Ghassabian |
| 2006/0021003 A1 | 1/2006 | Fisher et al. |
| 2006/0064313 A1 | 3/2006 | Steinbarth et al. |
| 2006/0179404 A1 | 8/2006 | Yolleck et al. |
| 2006/0224882 A1 | 10/2006 | Chin |
| 2007/0131759 A1 | 6/2007 | Cox et al. |
| 2007/0162963 A1 | 7/2007 | Penet et al. |
| 2007/0180492 A1 | 8/2007 | Hassan et al. |
| 2007/0226778 A1 | 9/2007 | Pietruszka |
| 2007/0229221 A1 | 10/2007 | Saotome |
| 2007/0260558 A1 | 11/2007 | Look |
| 2008/0027947 A1 | 1/2008 | Pritchett et al. |
| 2008/0040786 A1 | 2/2008 | Chang |
| 2008/0052181 A1 | 2/2008 | Devitt-carolan et al. |
| 2008/0120707 A1 | 5/2008 | Ramia |
| 2009/0083850 A1 | 3/2009 | Fadell et al. |
| 2009/0173784 A1 | 7/2009 | Yang |
| 2009/0307139 A1 | 12/2009 | Mardikar et al. |
| 2010/0008535 A1 | 1/2010 | Abulafia et al. |
| 2010/0023449 A1 | 1/2010 | Skowronek et al. |
| 2010/0026453 A1 | 2/2010 | Yamamoto et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0082485 A1 | 4/2010 | Lin et al. |
| 2010/0122327 A1* | 5/2010 | Linecker ............... H04L 63/168 726/6 |
| 2010/0164864 A1 | 7/2010 | Chou |
| 2010/0267362 A1 | 10/2010 | Smith et al. |
| 2010/0275259 A1 | 10/2010 | Adams et al. |
| 2010/0306107 A1 | 12/2010 | Nahari |
| 2011/0010470 A1 | 1/2011 | Hulbert et al. |
| 2011/0225057 A1 | 9/2011 | Webb et al. |
| 2011/0225426 A1 | 9/2011 | Agarwal et al. |
| 2012/0028609 A1 | 2/2012 | Hruska |
| 2012/0036556 A1 | 2/2012 | Lebeau et al. |
| 2012/0185397 A1 | 7/2012 | Levovitz |
| 2012/0197740 A1 | 8/2012 | Grigg et al. |
| 2012/0238363 A1 | 9/2012 | Watanabe et al. |
| 2012/0284185 A1 | 11/2012 | Mettler et al. |
| 2012/0284297 A1 | 11/2012 | Aguera-arcas et al. |
| 2012/0290376 A1 | 11/2012 | Dryer et al. |
| 2013/0024932 A1 | 1/2013 | Toebes et al. |
| 2013/0085931 A1 | 4/2013 | Runyan |
| 2013/0124855 A1* | 5/2013 | Varadarajan ............. G06F 21/31 713/155 |
| 2013/0189953 A1 | 7/2013 | Mathews |
| 2013/0198112 A1 | 8/2013 | Bhat |
| 2013/0212655 A1 | 8/2013 | Hoyos et al. |
| 2013/0232073 A1 | 9/2013 | Sheets et al. |
| 2013/0244615 A1 | 9/2013 | Miller |
| 2013/0254574 A1 | 9/2013 | Zacchio et al. |
| 2013/0254858 A1* | 9/2013 | Giardina ............... G06F 21/42 726/7 |
| 2013/0262857 A1* | 10/2013 | Neuman ............... H04L 63/18 713/155 |
| 2013/0297414 A1 | 11/2013 | Goldfarb et al. |
| 2013/0326563 A1 | 12/2013 | Mulcahy et al. |
| 2013/0332358 A1 | 12/2013 | Zhao |
| 2014/0025520 A1 | 1/2014 | Mardikar et al. |
| 2014/0026188 A1 | 1/2014 | Gubler |
| 2014/0036099 A1 | 2/2014 | Balassanian |
| 2014/0052553 A1 | 2/2014 | Uzo |
| 2014/0058860 A1 | 2/2014 | Roh et al. |
| 2014/0058935 A1 | 2/2014 | Mijares |
| 2014/0058941 A1 | 2/2014 | Moon et al. |
| 2014/0068751 A1 | 3/2014 | Last |
| 2014/0099886 A1 | 4/2014 | Monroe |
| 2014/0122331 A1 | 5/2014 | Vaish et al. |
| 2014/0140587 A1 | 5/2014 | Ballard et al. |
| 2014/0143145 A1 | 5/2014 | Kortina et al. |
| 2014/0155031 A1 | 6/2014 | Lee et al. |
| 2014/0156531 A1 | 6/2014 | Poon et al. |
| 2014/0187856 A1 | 7/2014 | Holoien et al. |
| 2014/0189829 A1* | 7/2014 | McLachlan ............ H04L 63/08 726/6 |
| 2014/0197234 A1 | 7/2014 | Hammad |
| 2014/0247229 A1 | 9/2014 | Cho et al. |
| 2014/0282987 A1 | 9/2014 | Narendra et al. |
| 2014/0283018 A1 | 9/2014 | Dadu et al. |
| 2014/0292396 A1 | 10/2014 | Bruwer et al. |
| 2014/0298478 A1 | 10/2014 | Kim et al. |
| 2014/0344082 A1 | 11/2014 | Soundararajan |
| 2014/0359454 A1 | 12/2014 | Lee et al. |
| 2015/0012417 A1 | 1/2015 | Joao et al. |
| 2015/0014141 A1 | 1/2015 | Rao et al. |
| 2015/0020081 A1 | 1/2015 | Cho et al. |
| 2015/0056957 A1 | 2/2015 | Mardikar et al. |
| 2015/0077362 A1 | 3/2015 | Seo |
| 2015/0095174 A1 | 4/2015 | Dua |
| 2015/0111559 A1 | 4/2015 | Leaver et al. |
| 2015/0179008 A1 | 6/2015 | Sung et al. |
| 2015/0304330 A1 | 10/2015 | Soamboonsrup et al. |
| 2015/0347738 A1* | 12/2015 | Ulrich ................... G06F 21/35 726/17 |
| 2016/0006745 A1 | 1/2016 | Furuichi et al. |
| 2016/0012465 A1 | 1/2016 | Sharp |
| 2016/0021003 A1 | 1/2016 | Pan |
| 2016/0048705 A1 | 2/2016 | Yang |
| 2016/0180305 A1 | 6/2016 | Dresser et al. |
| 2016/0189451 A1 | 6/2016 | Yoo et al. |
| 2016/0224966 A1 | 8/2016 | Van Os et al. |
| 2016/0224973 A1 | 8/2016 | Van Os et al. |
| 2016/0259936 A1 | 9/2016 | Mukherjee et al. |
| 2016/0261581 A1* | 9/2016 | Wang ................... H04L 63/166 |
| 2017/0039567 A1* | 2/2017 | Stern ................... G06Q 20/3276 |
| 2017/0264608 A1* | 9/2017 | Moore .................. H04W 12/06 |
| 2018/0131721 A1* | 5/2018 | Jones ................... H04L 63/0861 |
| 2019/0278900 A1 | 9/2019 | Yang et al. |

FOREIGN PATENT DOCUMENTS

| | | |
|---|---|---|
| CN | 101796764 A | 8/2010 |
| CN | 101809581 A | 8/2010 |
| CN | 102663303 A | 9/2012 |
| CN | 103853328 A | 6/2014 |
| CN | 104038256 A | 9/2014 |
| CN | 104077534 A | 10/2014 |
| EP | 2654275 A1 | 10/2013 |
| EP | 2701107 A1 | 2/2014 |
| EP | 2725537 A1 | 4/2014 |
| JP | 2004-104813 A | 4/2004 |
| JP | 2004-287592 A | 10/2004 |
| JP | 2006-163960 A | 6/2006 |
| JP | 2007-304854 A | 11/2007 |
| JP | 2010-503082 A | 1/2010 |
| JP | 2011-65590 A | 3/2011 |
| JP | 2011-237857 A | 11/2011 |
| JP | 2012-504273 A | 2/2012 |
| JP | 2013-222410 A | 10/2013 |

(56) References Cited

FOREIGN PATENT DOCUMENTS

| | | |
|---|---|---|
| JP | 2014-110638 A | 6/2014 |
| JP | 2014-131359 A | 7/2014 |
| JP | 2014-191653 A | 10/2014 |
| KR | 10-0403196 B1 | 10/2003 |
| KR | 10-2011-0056561 A | 5/2011 |
| KR | 10-2013-0138659 A | 12/2013 |
| KR | 10-2014-0121764 A | 10/2014 |
| TW | 201137722 A | 11/2011 |
| TW | 201316247 A | 4/2013 |
| TW | 201324310 A | 6/2013 |
| TW | 201409345 A | 3/2014 |
| WO | 2009/042392 A2 | 4/2009 |
| WO | 2010/39337 A2 | 4/2010 |
| WO | 2013/023224 A2 | 2/2013 |
| WO | 2013/103912 A1 | 7/2013 |
| WO | 2014/78965 A1 | 5/2014 |
| WO | 2014/115605 A1 | 7/2014 |

OTHER PUBLICATIONS

Summons to Attend Oral Proceedings received for European Patent Application No. 19171661.2, dated Jun. 2, 2020, 13 pages.
Notice of Acceptance received for Australian Patent Application No. 2018229544, dated May 4, 2020, 3 pages.
Office Action received for Chinese Patent Application No. 201580043701.6, dated Oct. 12, 2020, 22 pages (5 pages of English Translation and 17 pages of Official Copy).
Notice of Allowance received for Chinese Patent Application No. 201610069731.0, dated Sep. 6, 2019, 2 pages (1 page of English Translation and 1 page of Official Copy).
Applicant-Initiated Interview Summary received for U.S. Appl. No. 16/422,736, dated Feb. 24, 2021, 3 pages.
Office Action received for European Patent Application No. 15719347.5, dated Apr. 9, 2020, 4 pages.
Summons to Attend Oral Proceedings received for European Patent Application No. 19171661.2, dated Apr. 16, 2020, 12 pages.
Office Action received for Korean Patent Application No. 10-2020-7010007, dated Mar. 15, 2021, 7 pages (3 pages of English Translation and 4 pages of Official Copy).
Advisory Action received for U.S. Appl. No. 16/422,736, dated Mar. 12, 2021, 3 pages.
Decision on Request for Rehearing received for U.S. Appl. No. 14/869,831, dated Mar. 8, 2021, 9 pages.
Decision to Grant received for Danish Patent Application No. PA201670042, dated Mar. 19, 2018, 2 pages.
"Does Apple Pay change payment?", Mac Fan, Japan, Mynavi Publishing Corporation, vol. 22, No. 11 common No. 381, Nov. 1, 2014, 11 pages (4 pages of English Translation and 7 pages of Official Copy).
Final Office Action received for U.S. Appl. No. 14/719,217, dated Feb. 23, 2017, 37 pages.
Final Office Action received for U.S. Appl. No. 14/869,831, dated Aug. 2, 2016, 14 pages.
Final Office Action received for U.S. Appl. No. 14/869,831, dated Jul. 30, 2018, 31 pages.
Final Office Action received for U.S. Appl. No. 14/869,831, dated May 19, 2017, 20 pages.
Final Office Action received for U.S. Appl. No. 14/870,694, dated Apr. 7, 2017, 16 pages.
Intention to Grant received for Danish patent Application No. PA201670042, dated Jan. 29, 2018, 2 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2016/015316, dated Aug. 10, 2017, 10 pages.
International Search Report and Written Opinion received for PCT Patent Application No. PCT/US2016/015316, dated Mar. 8, 2016, 13 pages.

Non-Final Office Action received for U.S. Appl. No. 14/869,831, dated Jan. 29, 2016, 18 pages.
Non-Final Office Action received for U.S. Appl. No. 14/869,831, dated Nov. 22, 2017, 17 pages.
Non-Final Office Action received for U.S. Appl. No. 14/719,217, dated Jul. 26, 2018, 40 pages.
Non-Final Office Action received for U.S. Appl. No. 14/719,217, dated Jul. 28, 2016, 28 pages.
Non-Final Office Action received for U.S. Appl. No. 14/870,694, dated Sep. 23, 2016, 13 pages.
Notice of Acceptance received for Australian Patent Application No. 2016211504, dated Oct. 17, 2017, 3 pages.
Notice of Allowance received for Korean Patent Application No. 10-2017-7024513, dated Apr. 20, 2018, 5 pages (2 pages of English Translation and 3 pages of Official copy).
Notice of Allowance received for Taiwanese Patent Application No. 104114953, dated Oct. 17, 2017, 3 pages (Official Copy only). (See Communication under 37 CFR § 1.98(a) (3)}.
Notice of Allowance received for U.S. Appl. No. 14/719,217, dated Feb. 13, 2019, 13 pages.
Notice of Allowance received for U.S. Appl. No. 14/870,694, dated Dec. 11, 2018, 6 pages.
Notice of Allowance received for U.S. Appl. No. 14/870,694, dated Jul. 31, 2018, 7 pages.
Office Action received for Australian Patent Application No. 2015302298, dated Apr. 4, 2018, 3 pages.
Office Action received for Australian Patent Application No. 2015302298, dated Jul. 20, 2018, 3 pages.
Office Action received for Australian Patent Application No. 2015302298, dated Sep. 14, 2017, 3 pages.
Office Action received for Australian Patent Application No. 2015302298, dated Sep. 4, 2018, 5 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016102031, dated Feb. 28, 2017, 4 pages.
Office Action received for Australian Patent Application No. 2018200628, dated Jan. 24, 2019, 3 pages.
Office Action received for Chinese Patent Application No. 201580043701.6, dated Dec. 24, 2018, 20 pages (5 pages of English Translation and 15 pages of Official copy).
Office Action received for Chinese Patent Application No. 201620101636.X, dated May 25, 2016, 3 pages (1 page of English Translation and 2 pages of Official Copy).
Office Action received for Chinese Patent Application No. 201620101636.X, dated Oct. 13, 2016, 3 pages (1 page of English Translation and 2 pages of Official Copy).
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017, 2 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Nov. 9, 2018, 3 pages.
Office Action received for Danish Patent Application No. PA201770292, dated Sep. 6, 2017, 4 pages.
Office Action received for European Patent Application No. 16703893.4, dated Sep. 17, 2018, 7 pages.
Office Action received for Japanese Patent Application No. 2017-507413, dated May 25, 2018, 14 pages (7 pages of English Translation and 7 pages of Official Copy).
Office Action received for Japanese Patent Application No. 2017-540616, dated Jan. 12, 2018, 24 pages (13 pages of English Translation and 11 pages of Official Copy).

(56) References Cited

OTHER PUBLICATIONS

Office Action received for Japanese Patent Application No. 2017-540616, dated Jul. 27, 2018, 20 pages (11 pages of English Translation and 9 pages of Official copy).
Office Action received for Taiwanese Patent Application No. 104114953, dated Feb. 18, 2017, 9 pages (4 pages of English Translation and 5 pages of Official copy).
Office Action received for Taiwanese Patent Application No. 104114953, dated Jun. 8, 2016, 11 pages (5 pages of English Translation and 6 pages of Official copy).
Supplemental Notice of Allowance received for U.S. Appl. No. 14/870,694, dated Jan. 17, 2019, 3 pages.
International Search Report and Written Opinion received for PCT Patent Application No. PCT/US2015/025188, dated Jun. 23, 2015, 11 pages.
Notice of Allowance received for Japanese Patent Application No. 2019-096220, dated Nov. 25, 2019, 4 pages (1 page of English Translation and 3 pages of Official Copy).
Office Action received for Australian Patent Application No. 2018229544, dated Nov. 15, 2019, 4 pages.
Office Action received for Chinese Patent Application No. 201580043701.6, dated Nov. 4, 2019, 20 pages (6 pages of English Translation and 14 pages of Official Copy).
Minutes of the Oral Proceedings received for European Patent Application No. 19171661.2, mailed on Oct. 15, 2020, 5 pages.
Notice of Allowance received for Japanese Patent Application No. 2019-116580, dated Oct. 2, 2020, 4 pages (1 page of English Translation and 3 pages of Official Copy).
Record of Oral Hearing received for U.S. Appl. No. 14/869,831, mailed on Oct. 6, 2020, 12 pages.
Corrected Notice of Allowance received for U.S. Appl. No. 14/719,217, dated Apr. 22, 2019, 2 pages.
Notice of Allowance received for Japanese Patent Application No. 2017-540616, dated Apr. 23, 2019, 4 pages (1 page of English Translation and 3 pages of Official Copy).
Pre-Brief Appeal Conference decision received for U.S. Appl. No. 14/869,831, mailed on Jan. 18, 2019, 3 pages.
Corrected Notice of Allowance received for U.S. Appl. No. 14/719,217, dated Mar. 20, 2019, 2 pages.
Office Action received for Chinese Patent Application No. 201610069731.0, dated Mar. 5, 2019, 10 pages (5 pages of English Translation and 5 pages of Official Copy).
Office Action received for Japanese Patent Application No. 2017-507413, dated Feb. 22, 2019, 11 pages (5 pages of English Translation and 6 pages of Official Copy).
Summons to Attend Oral Proceedings received for European Patent Application. No. 16703893.4, mailed on Mar. 26, 2019, 14 pages.
"Giving Apple Pay a Try", The Consumer Credit Monthly, Kinzai Institute for Financial Affairs, Inc, vol. 33, No. 1, ISSN: 0288-8122, 2015, 7 pages (Official Copy only) (see communication under 37 CFR § 1.98(a) (3)).
Office Action received for Japanese Patent Application No. 2019-096220, dated Sep. 9, 2019, 8 pages (4 pages of English Translation and 4 pages of Official Copy).
Decision to Refuse received for European Patent Application No. 16703893.4, dated Jul. 24, 2019, 22 pages.
European Search Report received for European Patent Application No. 19171661.2, dated Jul. 17, 2019, 6 pages.
Notice of Allowance received for Japanese Patent Application No. 2017-507413, dated Jul. 22, 2019, 4 pages (1 page of English Translation and 3 pages of Official Copy).
Applicant-Initiated Interview Summary received for U.S. Appl. No. 16/422,736, dated Sep. 28, 2020, 3 pages.
Intention to Grant received for European Patent Application No. 15719347.5, dated Dec. 8, 2020, 7 pages.
Examiner's Answer to Appeal Brief received for U.S. Appl. No. 14/869,831, dated Aug. 12, 2019, 16 pages.
Office Action received for European Patent Application No. 19171661.2, dated Aug. 7, 2019, 7 pages.
Office Action received for Korean Patent Application No. 10-2018-7019643, dated Jan. 6, 2020, 7 pages (3 pages of English Translation and 4 pages of Official Copy).
Final Office Action received for U.S. Appl. No. 16/422,736, dated Jan. 11, 2021, 39 pages.
Notice of Acceptance received for Australian Patent Application No. 2018200628, dated Jun. 13, 2019, 3 pages.
Office Action received for European Patent Application No. 15719347.5, dated Jun. 17, 2019, 4 pages.
Minutes of Oral Proceeding received for European Patent Application No. 16703893.4, mailed on Jul. 22, 2019, 9 pages.
Office Action received for Korean Patent Application No. 10-2018-7019643, dated Jul. 2, 2019, 12 pages (5 pages of English Translation and 7 pages of Official Copy).
Result of Consultation received for European Patent Application No. 16703893.4, mailed on Jun. 7, 2019, 3 pages.
International Search Report and Written Opinion received for PCT Patent Application No. PCT/US2019/012571, dated May 6, 2019, 15 pages.
Office Action received for Chinese Patent Application No. 201910354714.5, dated Feb. 3, 2020, 12 pages (7 pages of English Translation and 5 pages of Official Copy).
Decision on Appeal received for Korean Patent Application No. 10-2018-7019643, dated Jun. 9, 2020, 27 pages (3 pages of English Translation and 24 pages of Official Copy).
Non-Final Office Action received for U.S. Appl. No. 16/422,736, dated Jun. 23, 2020, 24 pages.
International Preliminary Report on Patentability received for PCT Patent Application No. PCT/US2019/012571, dated Aug. 6, 2020, 10 pages.
Brief Communication Regarding Oral Proceedings received for European Patent Application No. 19171661.2, dated Sep. 3, 2020, 2 pages.
Office Action received for Korean Patent Application No. 10-2020-7010007, dated Aug. 26, 2020, 12 pages (5 pages of English Translation and 7 pages of Official Copy).
Decision on Appeal received for U.S. Appl. No. 14/869,831, dated Nov. 2, 2020, 8 pages.
Decision to Refuse received for European Patent Application No. 19171661.2, dated Oct. 22, 2020, 7 pages.
Notice of Allowance received for Chinese Patent Application No. 201910354714.5, dated Oct. 14, 2020, 2 pages (1 page of English Translation and 1 page of Official Copy).
Notice of Allowance received for U.S. Appl. No. 16/422,736, dated Apr. 20, 2021, 12 pages.

\* cited by examiner

800

802
Displaying, on the display of the first electronic device, a visual representation of data.

804
Receiving first information that the visual representation of data has been detected by a second electronic device.

806
The first information indicates a first type of authentication available at the second electronic device.

808
In response to receiving the first information, displaying, on the display of the first electronic device, a first prompt prompting a user to provide authentication information at the second electronic device for enabling access to restricted content on the first electronic device.

810
Receiving second information authorizing access to the restricted content on the first electronic device.

812
In response to receiving the second information, providing access to the restricted content on the first electronic device.

*FIG. 8*

SECURE LOGIN WITH AUTHENTICATION BASED ON A VISUAL REPRESENTATION OF DATA

CROSS-REFERENCE TO RELATED APPLICATIONS

This application is a continuation of U.S. Application No. 62/620,422, filed Jan. 22, 2018, the entire contents of which are hereby incorporated by reference.

FIELD

The present disclosure relates generally to computer user interfaces, and more specifically to techniques for managing secure login with authentication using a visual representation of data (e.g., a unique code).

BACKGROUND

Techniques for logging in to a website or service typically rely on a user manually typing a username and password into text fields. Some techniques for logging in to a website or service incorporate the use of another device during the login process.

BRIEF SUMMARY

Some techniques for managing secure login with authentication, however, are generally cumbersome and inefficient. For example, some existing techniques use a complex and time-consuming user interface, which may include multiple key presses or keystrokes. As another example, some existing techniques result in confusion for the user, as the user is unaware of the current status of the login process. Existing techniques require more time than necessary, wasting user time and device energy. This latter consideration is particularly important in battery-operated devices.

Accordingly, the present technique provides electronic devices with faster, more efficient methods and interfaces for managing secure login with authentication using a visual representation of data (e.g., a unique code). Such methods and interfaces optionally complement or replace other methods for managing secure login with authentication. Such methods and interfaces reduce the cognitive burden on a user, improve security, and produce a more efficient human-machine interface. For battery-operated computing devices, such methods and interfaces conserve power and increase the time between battery charges.

In accordance with some embodiments, a method is described. The method comprises: at a first electronic device with a display, one or more cameras, and one or more input devices: detecting, via a first camera of the one or more cameras, the presence of a visual representation of data displayed on a second electronic device; in response to detecting the presence of the visual representation of data, prompting a user to provide authorization information at the first electronic device for enabling access to content on the second electronic device; after prompting the user to provide the authorization information, receiving a set of one or more inputs; and in response to receiving the set of one or more inputs: in accordance with a determination that the set of one or more inputs includes authorization information that matches stored authorization information, transmitting information authorizing access to the content on the second electronic device; and in accordance with a determination that the set of one or more inputs does not include authorization information that matches stored authorization information, forgoing transmitting information authorizing access to the content on the second electronic device.

In accordance with some embodiments, a non-transitory computer-readable storage medium is described. The non-transitory computer-readable storage medium stores one or more programs that are executable by one or more processors of a first electronic device with a display, one or more cameras, and one or more input devices, the one or more programs including instructions for: detecting, via a first camera of the one or more cameras, the presence of a visual representation of data displayed on a second electronic device; in response to detecting the presence of the visual representation of data, prompting a user to provide authorization information at the first electronic device for enabling access to content on the second electronic device; after prompting the user to provide the authorization information, receiving a set of one or more inputs; and in response to receiving the set of one or more inputs: in accordance with a determination that the set of one or more inputs includes authorization information that matches stored authorization information, transmitting information authorizing access to the content on the second electronic device; and in accordance with a determination that the set of one or more inputs does not include authorization information that matches stored authorization information, forgoing transmitting information authorizing access to the content on the second electronic device.

In accordance with some embodiments, a transitory computer-readable storage medium is described. The transitory computer-readable storage medium stores one or more programs that are executable by one or more processors of a first electronic device with a display, one or more cameras, and one or more input devices, the one or more programs including instructions for: detecting, via a first camera of the one or more cameras, the presence of a visual representation of data displayed on a second electronic device; in response to detecting the presence of the visual representation of data, prompting a user to provide authorization information at the first electronic device for enabling access to content on the second electronic device; after prompting the user to provide the authorization information, receiving a set of one or more inputs; and in response to receiving the set of one or more inputs: in accordance with a determination that the set of one or more inputs includes authorization information that matches stored authorization information, transmitting information authorizing access to the content on the second electronic device; and in accordance with a determination that the set of one or more inputs does not include authorization information that matches stored authorization information, forgoing transmitting information authorizing access to the content on the second electronic device.

In accordance with some embodiments, a first electronic device is described. The first electronic device includes: a display, one or more cameras, one or more input devices, one or more processors, and memory storing one or more programs configured to be executed by the one or more processors, the one or more programs including instructions for: detecting, via a first camera of the one or more cameras, the presence of a visual representation of data displayed on a second electronic device; in response to detecting the presence of the visual representation of data, prompting a user to provide authorization information at the first electronic device for enabling access to content on the second electronic device; after prompting the user to provide the authorization information, receiving a set of one or more inputs; and in response to receiving the set of one or more inputs: in accordance with a determination that the set of one or more inputs includes authorization information that matches stored authorization information, transmitting information authorizing access to the content on the second electronic device; and in accordance with a determination that the set of one or more inputs does not include authorization information that matches stored authorization information, forgoing transmitting information authorizing access to the content on the second electronic device.

In accordance with some embodiments, a first electronic device is described. The first electronic device includes: a display, one or more cameras, one or more input devices, one or more processors, and means for detecting, via a first camera of the one or more cameras, the presence of a visual representation of data displayed on a second electronic device; means, in response to detecting the presence of the visual representation of data, for prompting a user to provide authorization information at the first electronic device for enabling access to content on the second electronic device; means, after prompting the user to provide the authorization information, for receiving a set of one or more inputs; and means, in response to receiving the set of one or more inputs, for: in accordance with a determination that the set of one or more inputs includes authorization information that matches stored authorization information, transmitting information authorizing access to the content on the second electronic device; and in accordance with a determination that the set of one or more inputs does not include authorization information that matches stored authorization information, forgoing transmitting information authorizing access to the content on the second electronic device.

In accordance with some embodiments, a method is described. The method comprises: at a first electronic device with a display: displaying, on the display of the first electronic device, a visual representation of data; receiving first information that the visual representation of data has been detected by a second electronic device; in response to receiving the first information, displaying, on the display of the first electronic device, a first prompt prompting a user to provide authentication information at the second electronic device for enabling access to restricted content on the first electronic device; receiving second information authorizing access to the restricted content on the first electronic device; and in response to receiving the second information, providing access to the restricted content on the first electronic device.

In accordance with some embodiments, a non-transitory computer-readable storage medium is described. The non-transitory computer-readable storage medium stores one or more programs that are executable by one or more processors of a first electronic device with a display, the one or more programs including instructions for: displaying, on the display of the first electronic device, a visual representation of data; receiving first information that the visual representation of data has been detected by a second electronic device; in response to receiving the first information, displaying, on the display of the first electronic device, a first prompt prompting a user to provide authentication information at the second electronic device for enabling access to restricted content on the first electronic device; receiving second information authorizing access to the restricted content on the first electronic device; and in response to receiving the second information, providing access to the restricted content on the first electronic device.

In accordance with some embodiments, a transitory computer-readable storage medium is described. The transitory computer-readable storage medium stores one or more programs that are executable by one or more processors of a first electronic device with a display, the one or more programs including instructions for: displaying, on the display of the first electronic device, a visual representation of data; receiving first information that the visual representation of data has been detected by a second electronic device; in response to receiving the first information, displaying, on the display of the first electronic device, a first prompt prompting a user to provide authentication information at the second electronic device for enabling access to restricted content on the first electronic device; receiving second information authorizing access to the restricted content on the first electronic device; and in response to receiving the second information, providing access to the restricted content on the first electronic device.

In accordance with some embodiments, a first electronic device is described. The first electronic device includes: a display, one or more processors, and memory storing one or more programs configured to be executed by the one or more processors, the one or more programs including instructions for: displaying, on the display of the first electronic device, a visual representation of data; receiving first information that the visual representation of data has been detected by a second electronic device; in response to receiving the first information, displaying, on the display of the first electronic device, a first prompt prompting a user to provide authentication information at the second electronic device for enabling access to restricted content on the first electronic device; receiving second information authorizing access to the restricted content on the first electronic device; and in response to receiving the second information, providing access to the restricted content on the first electronic device.

In accordance with some embodiments, a first electronic device is described. The first electronic device includes: a display, one or more processors, and means for displaying, on the display of the first electronic device, a visual representation of data; means for receiving first information that the visual representation of data has been detected by a second electronic device; means, in response to receiving the first information, for displaying, on the display of the first electronic device, a first prompt prompting a user to provide authentication information at the second electronic device for enabling access to restricted content on the first electronic device; means for receiving second information authorizing access to the restricted content on the first electronic device; and means, in response to receiving the second information, for providing access to the restricted content on the first electronic device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing secure login with authentication using a visual representation of data (e.g., a unique code), thereby increasing the effectiveness, efficiency, and user satisfaction with such devices. Such methods and interfaces may complement or replace other methods for managing secure login with authentication using a visual representation of data (e.g., a unique code).

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 8 is a flow diagram illustrating methods of managing secure login with authentication using a visual representation of data (e.g., a unique code).

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing secure login with authentication using a visual representation of data (e.g., a unique code). For example, a user may be attempting to login to a website at a personal laptop computer. The user may seek a more efficient method of logging in to the website. Instead of manually typing a username and password, the user proceeds with an option for an alternative login technique. The alternative login technique enables a user to login by authenticating at the user's personal smartphone device. The personal laptop computer displays a QR code that can be detected via a camera of the personal smartphone device. Detecting the QR code initiates the process for the alternative login technique. The user's personal smartphone device is a trusted device that is already associated with a user account of the user. The user may authenticate at the personal smartphone device, which results in the user successfully logging in to the website at the personal laptop computer. Such techniques can reduce the cognitive burden on a user who uses secure login with authentication using a visual representation of data (e.g., a unique code), thereby enhancing productivity. Further, such techniques can reduce processor and battery power otherwise wasted on redundant user inputs.

Figure 6A:
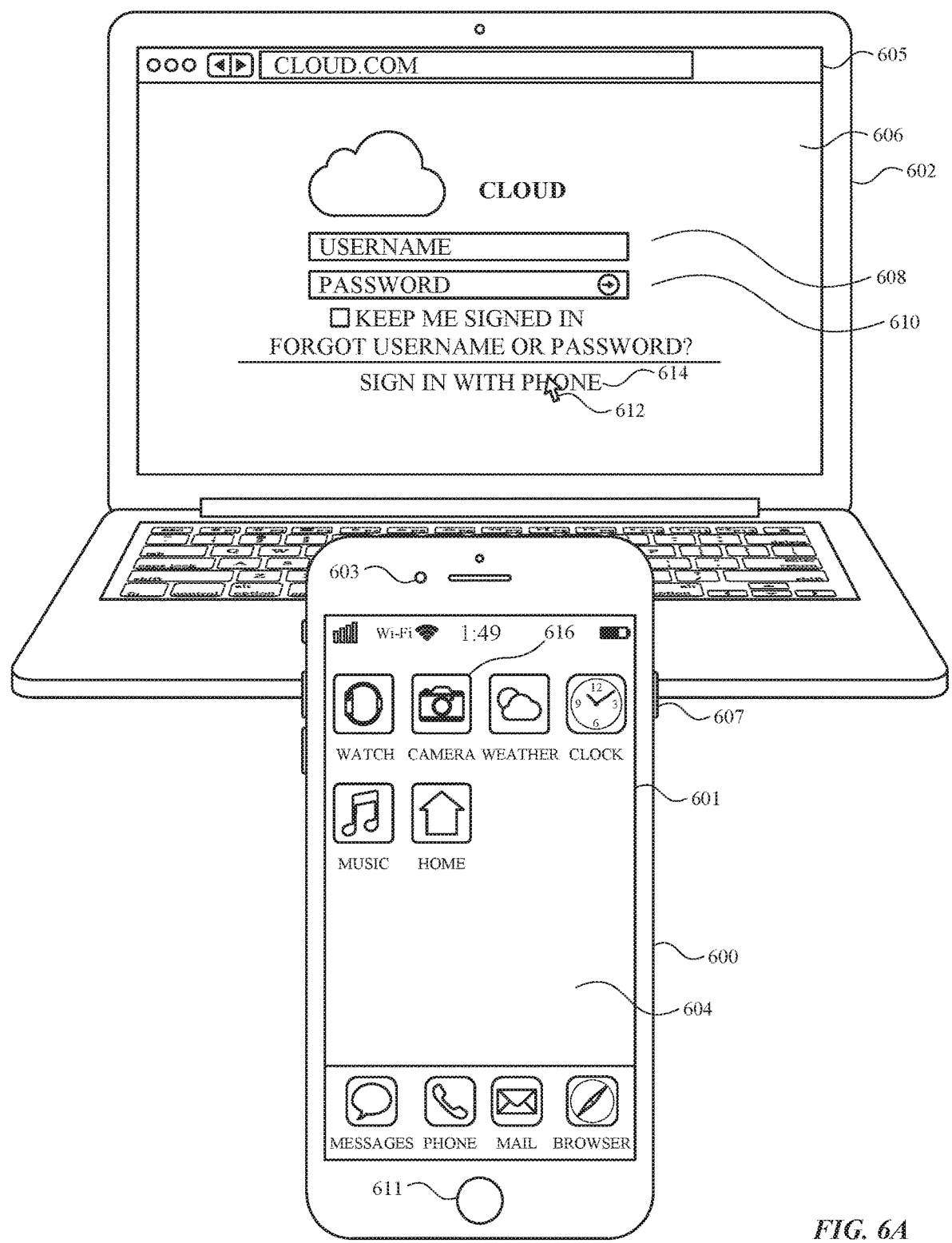
FIGS. 6A-6U illustrate exemplary user interfaces for managing secure login with authentication using a visual representation of data (e.g., a unique code).
Figure 6U:
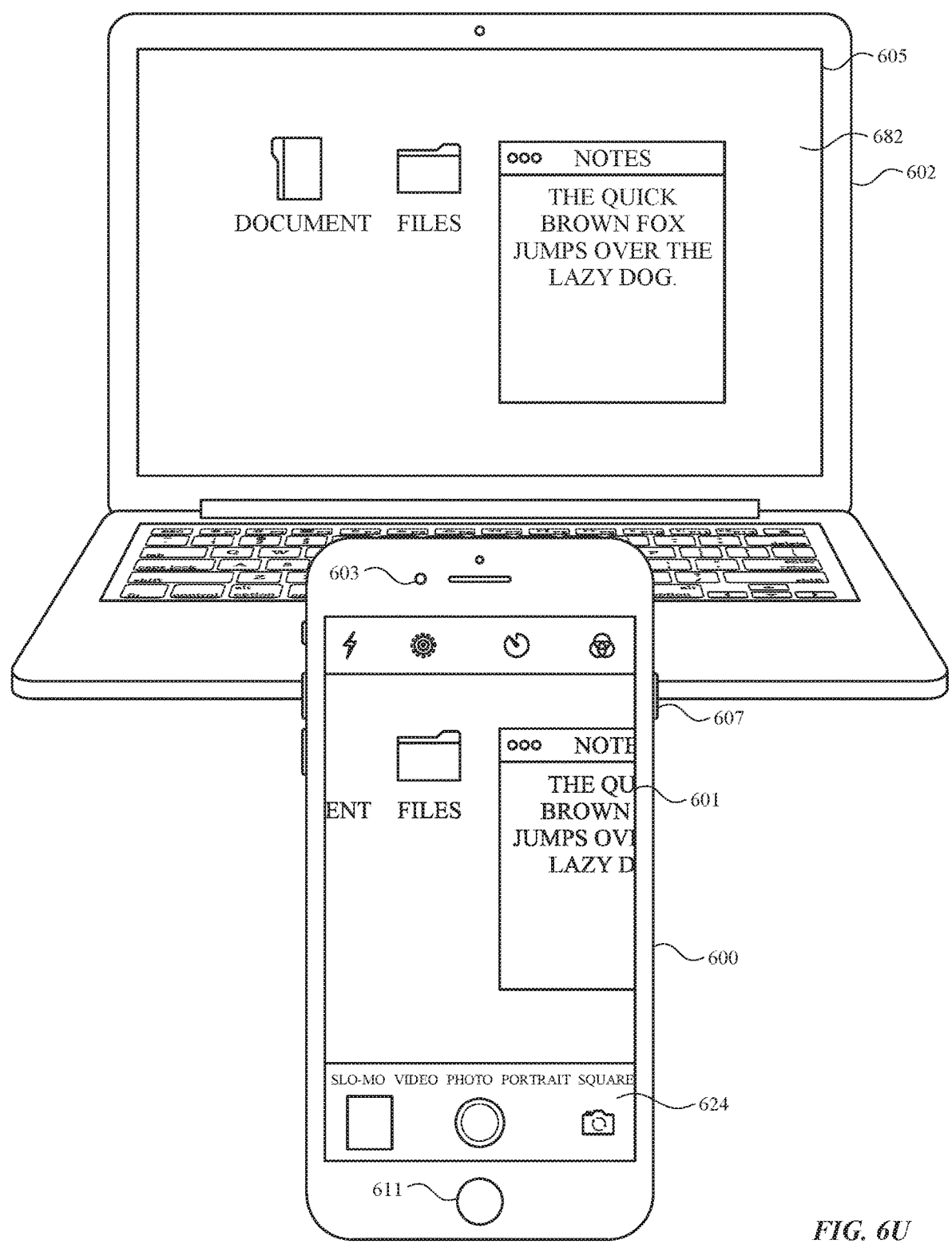
Figure 7:
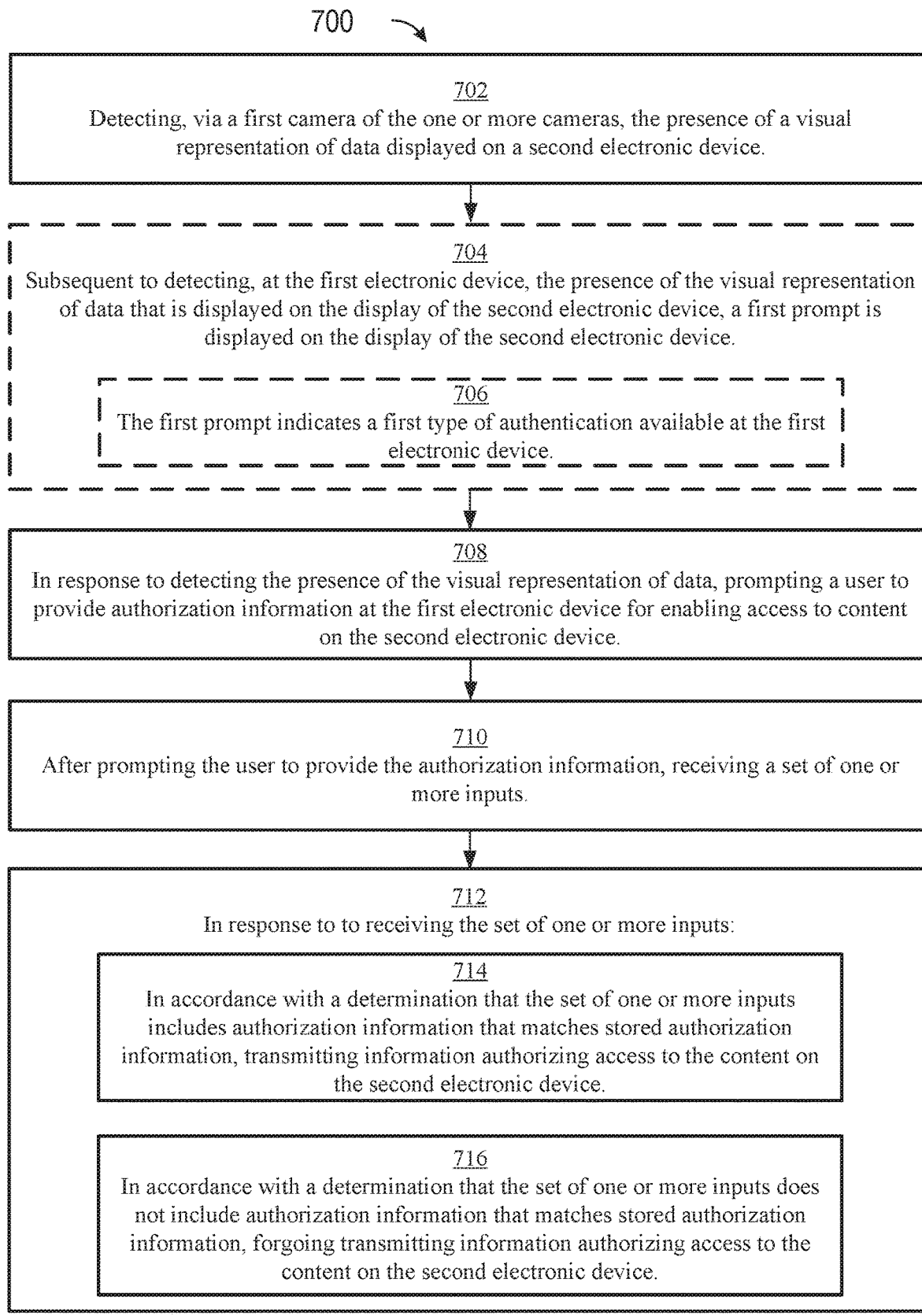
FIG. 7 is a flow diagram illustrating methods of managing secure login with authentication using a visual representation of data (e.g., a unique code).

Below, FIGS. 1A-1B, 2, 3, 4A-4B, and 5A-5H provide a description of exemplary devices for performing the techniques for managing event notifications. FIGS. 6A-6U illustrate exemplary user interfaces for managing secure login with authentication while viewing using a visual representation of data (e.g., a unique code). FIGS. 7 and 8 are flow diagrams illustrating methods of managing secure login with authentication using a visual representation of data (e.g., a unique code).

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
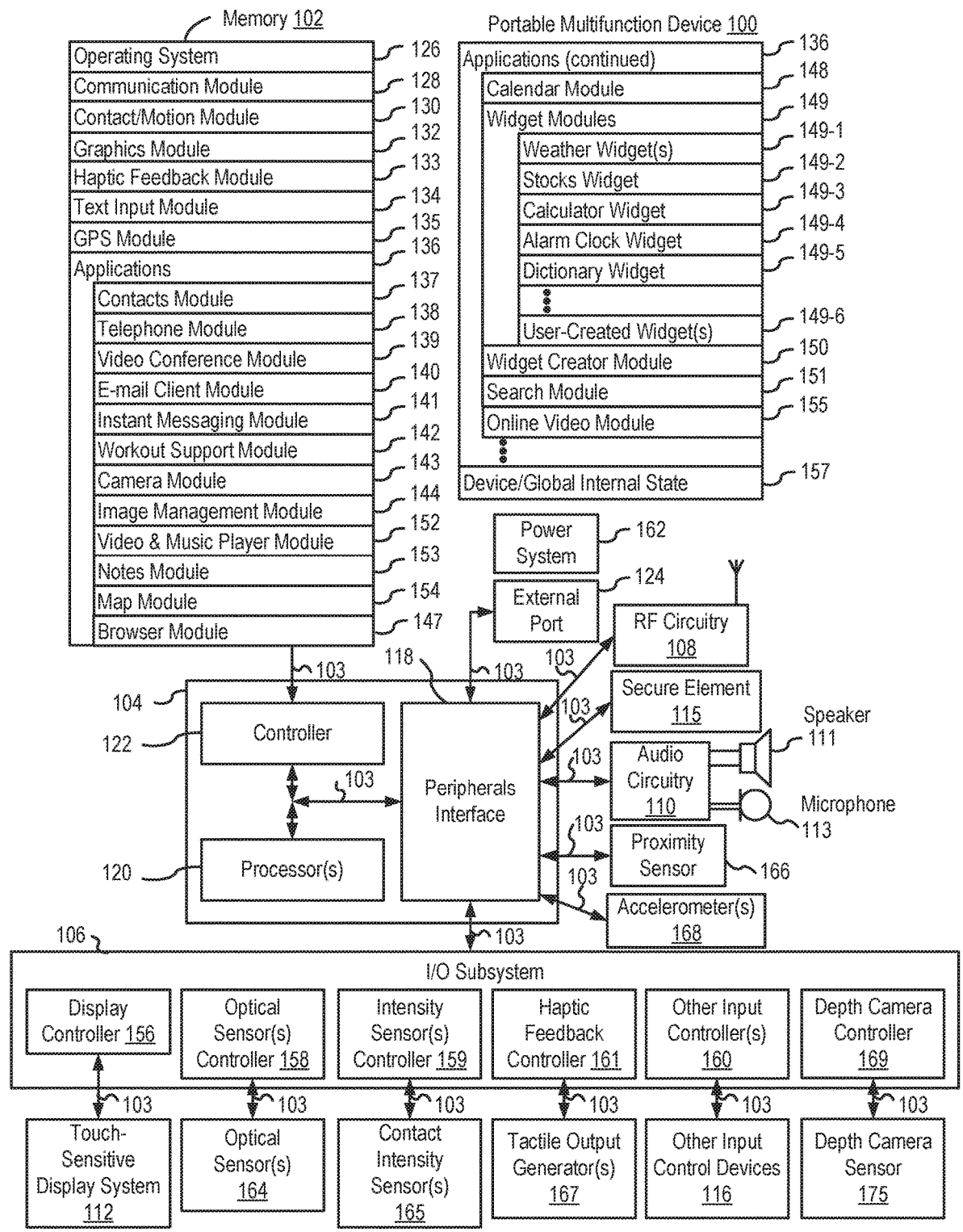
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, secure element 115, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that is, in some circumstances, otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, depth camera controller 169, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Device 100 optionally also includes one or more depth camera sensors 175. FIG. 1A shows a depth camera sensor coupled to depth camera controller 169 in I/O subsystem 106. Depth camera sensor 175 receives data from the environment, projected through a sensor. In conjunction with imaging module 143 (also called a camera module), depth camera sensor 175 camera is optionally used to determine a depth map of different portions of an image captured by the imaging module 143. In some embodiments, a depth camera sensor is located on the front of device 100 so that the user's image with depth information is available for use by different functions of the device such as video conferencing capturing selfies with depth map data, and authenticating a user of the device. In some embodiments, the position of depth camera sensors 175 can be changed by the user (e.g., by rotating the lens and the sensor in the device housing) so that a depth camera sensors 175 is used along with the touch screen display for both video conferencing and still and/or video image acquisition.

Figure 3:
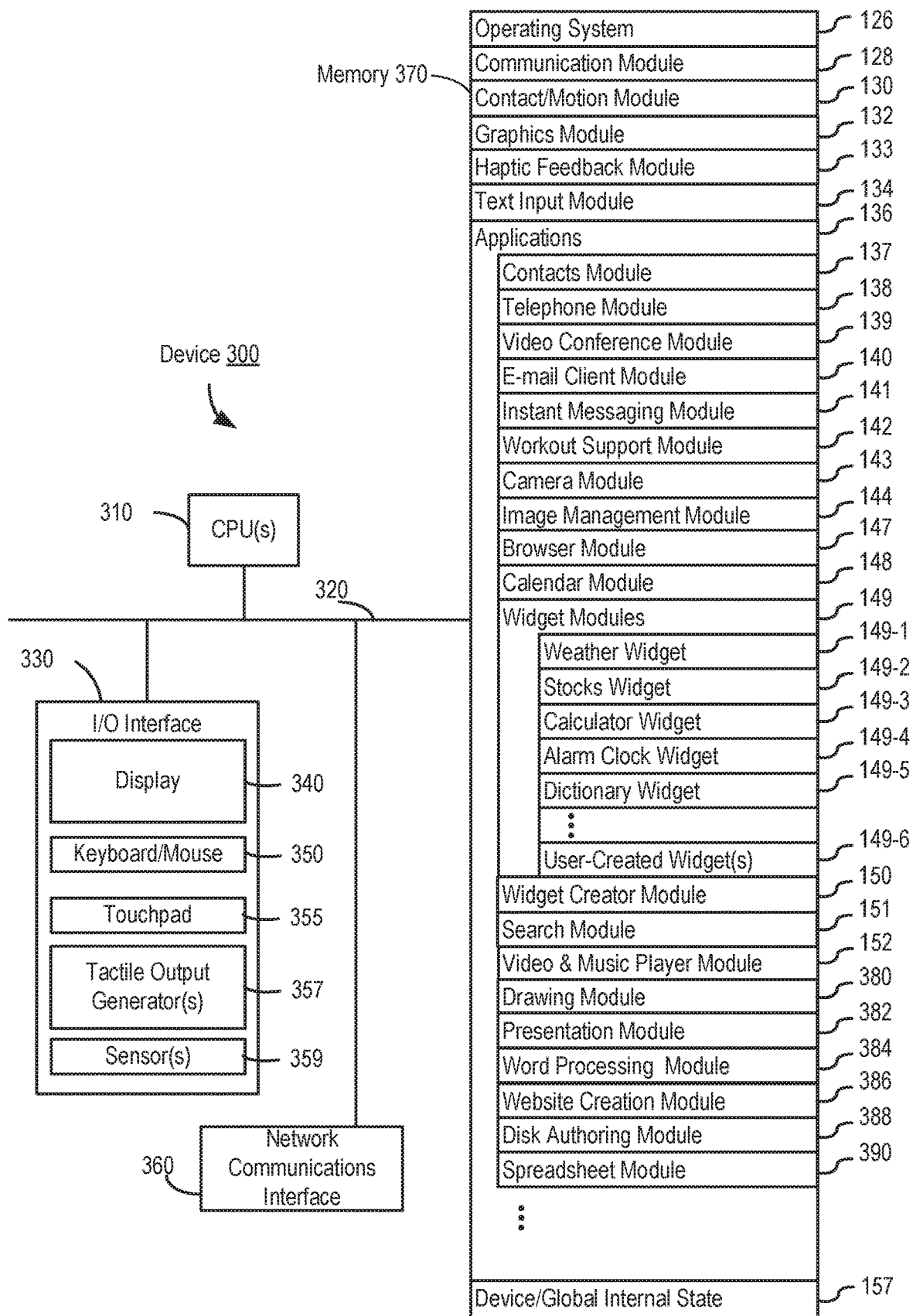
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XIVIPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
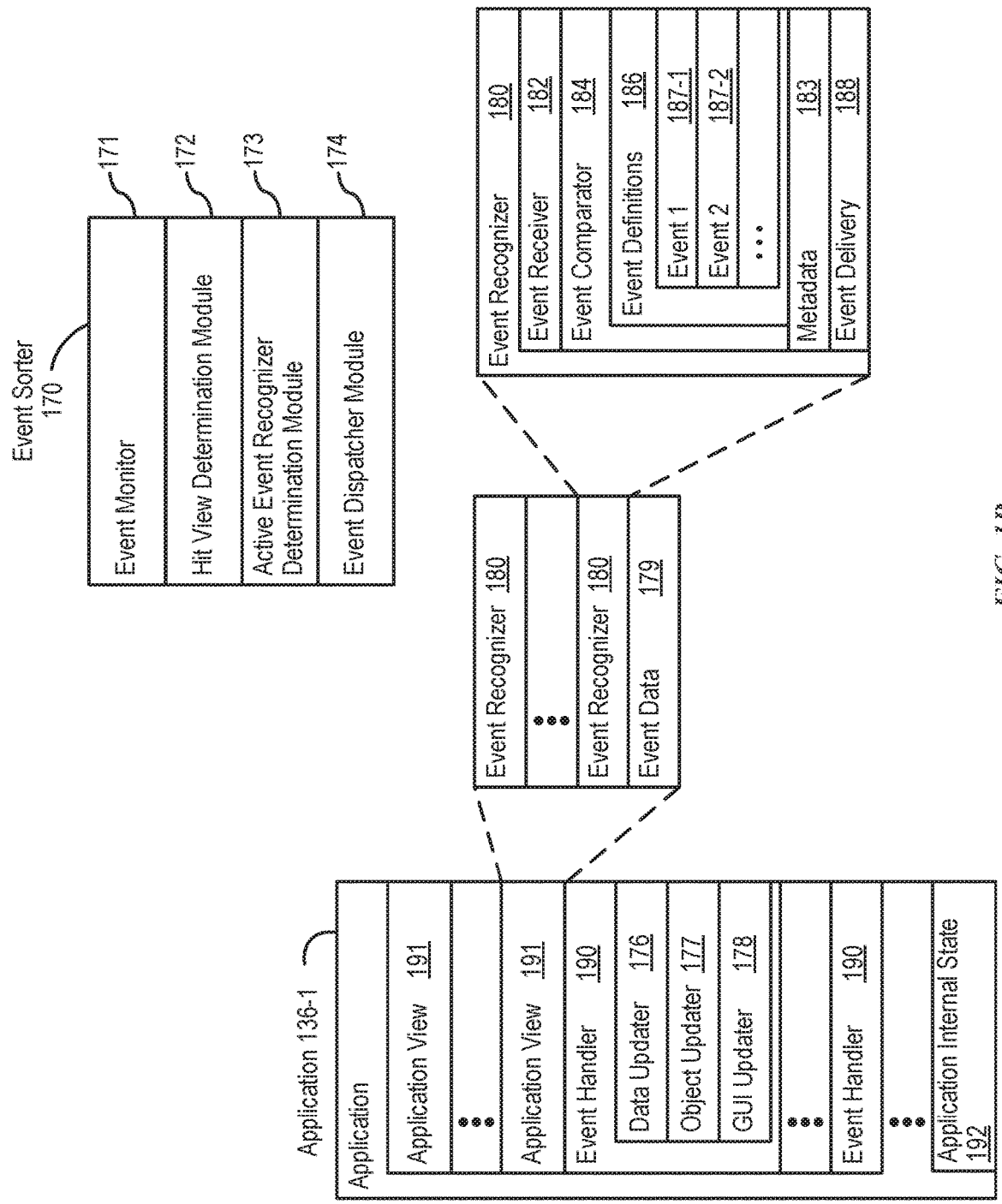
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
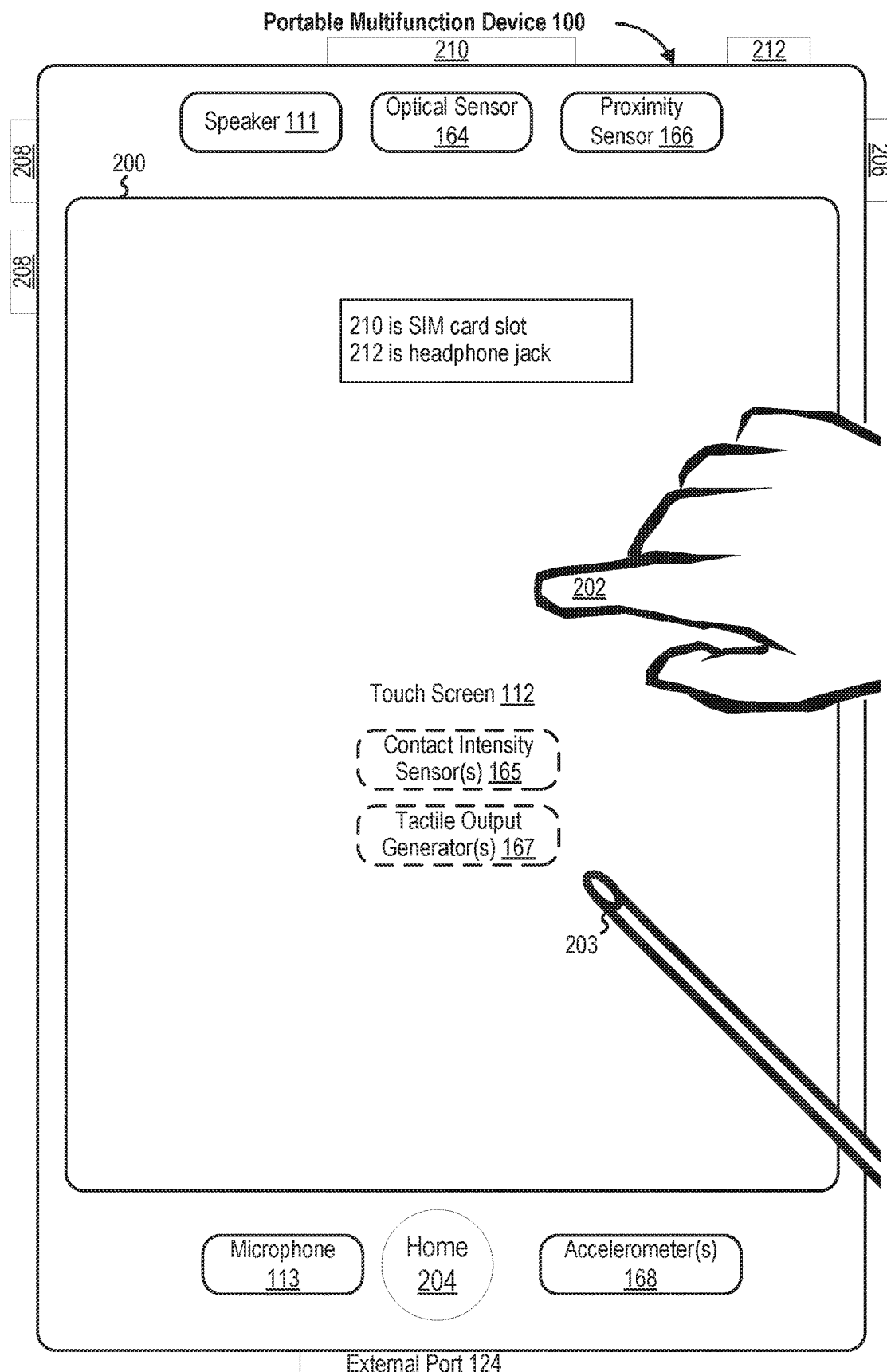
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
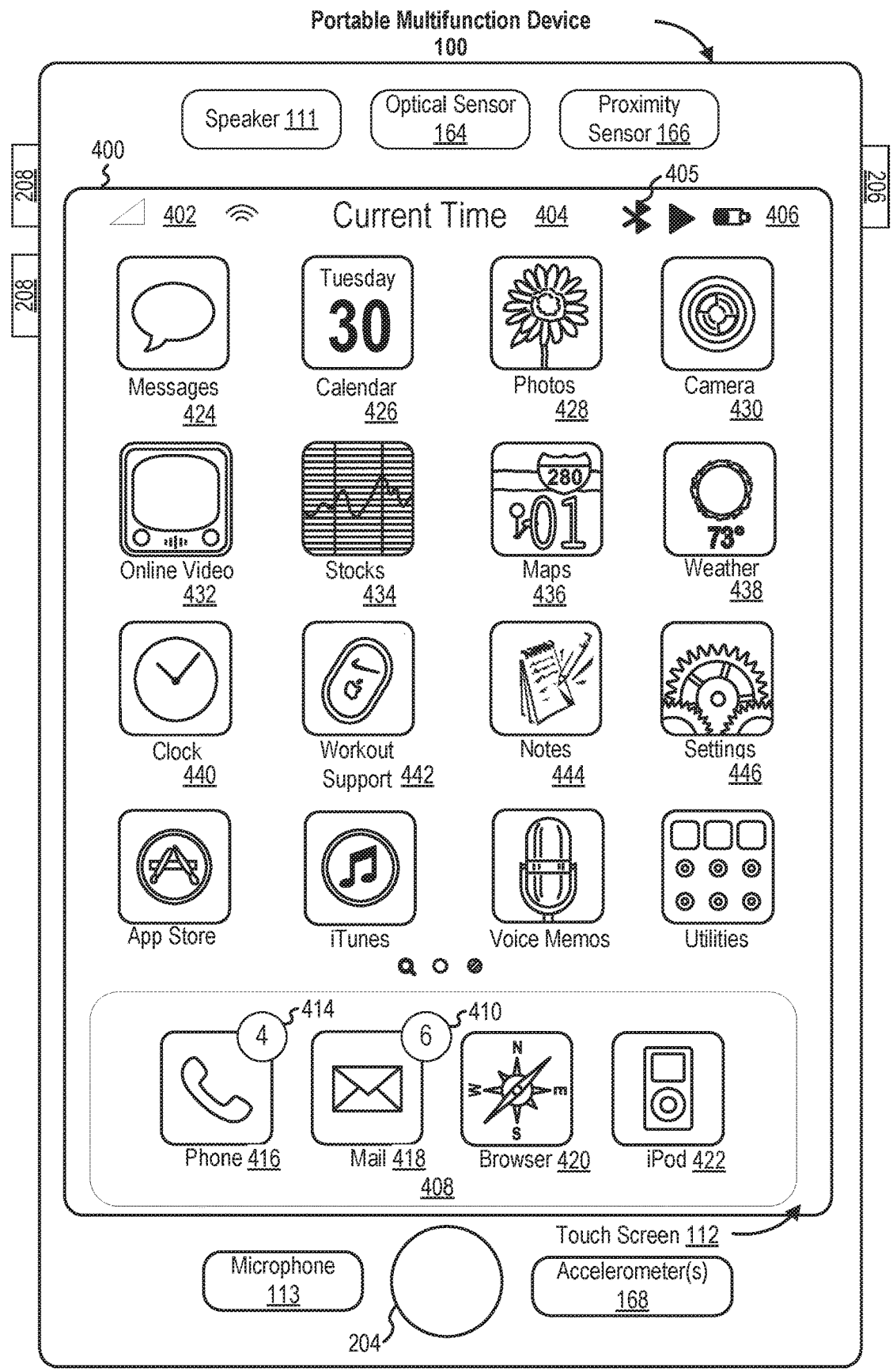
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
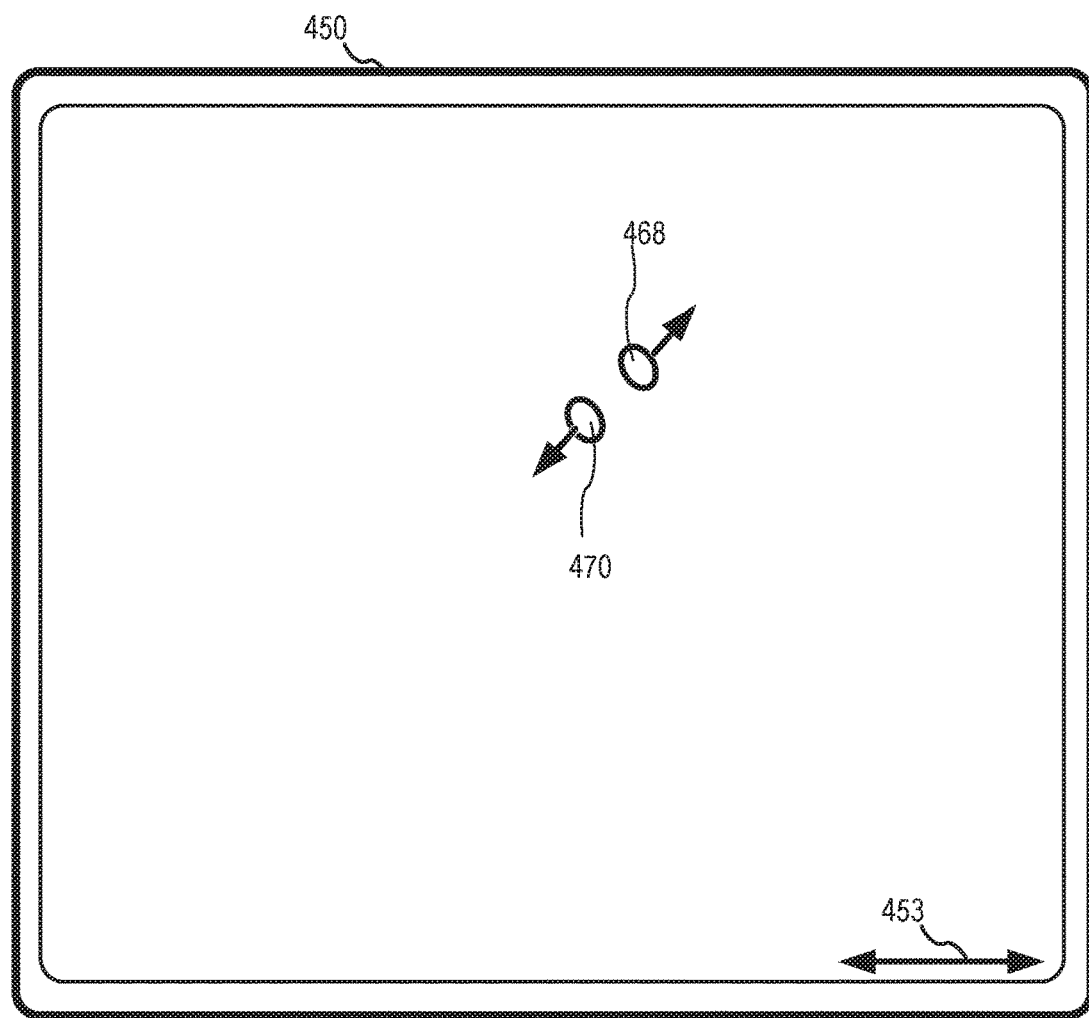
FIG. 4B illustrates an exemplary user interface for a multifunction device with a touch-sensitive surface that is separate from the display in accordance with some embodiments.
Figure 4B:
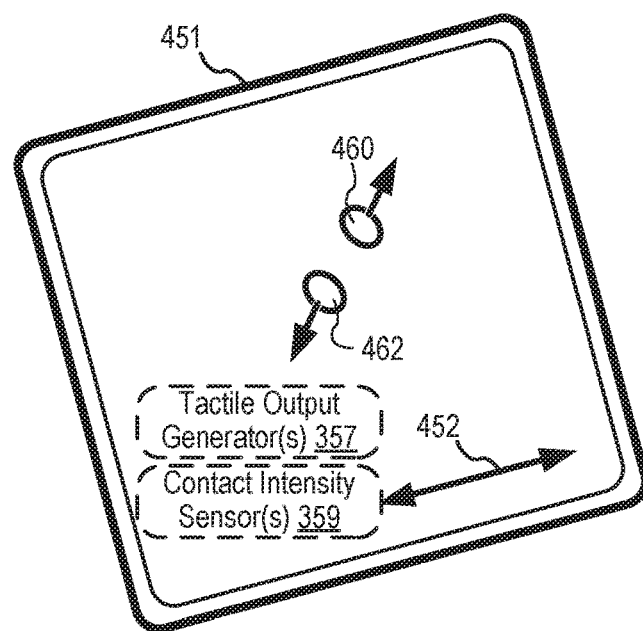

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
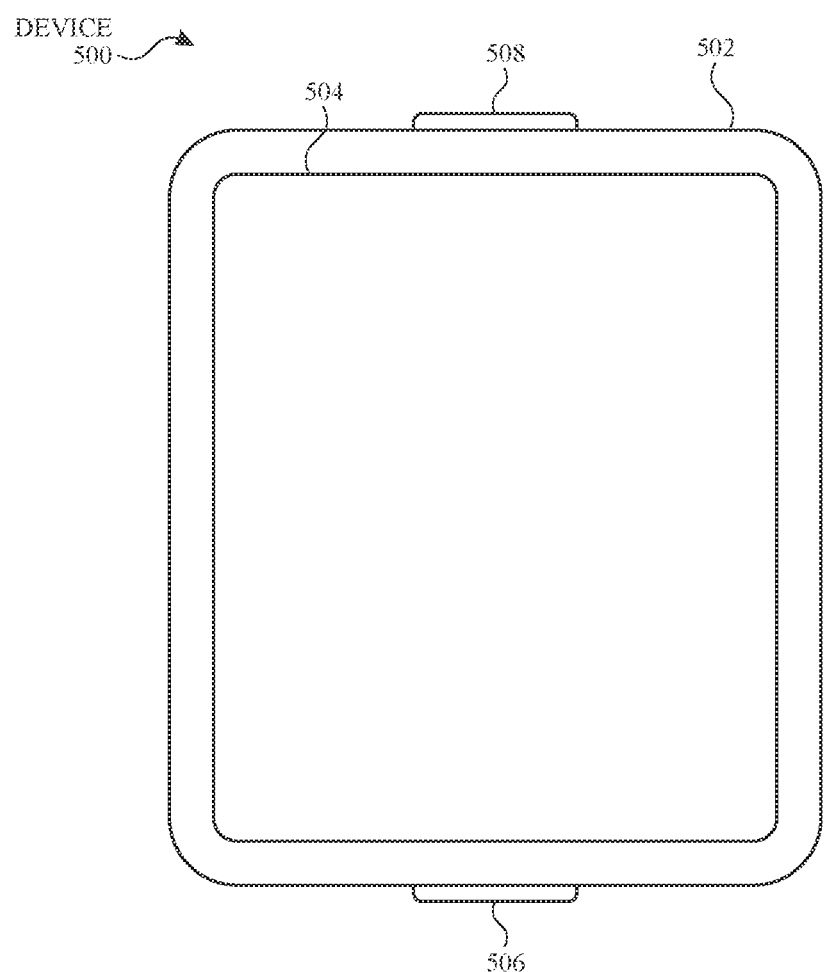
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
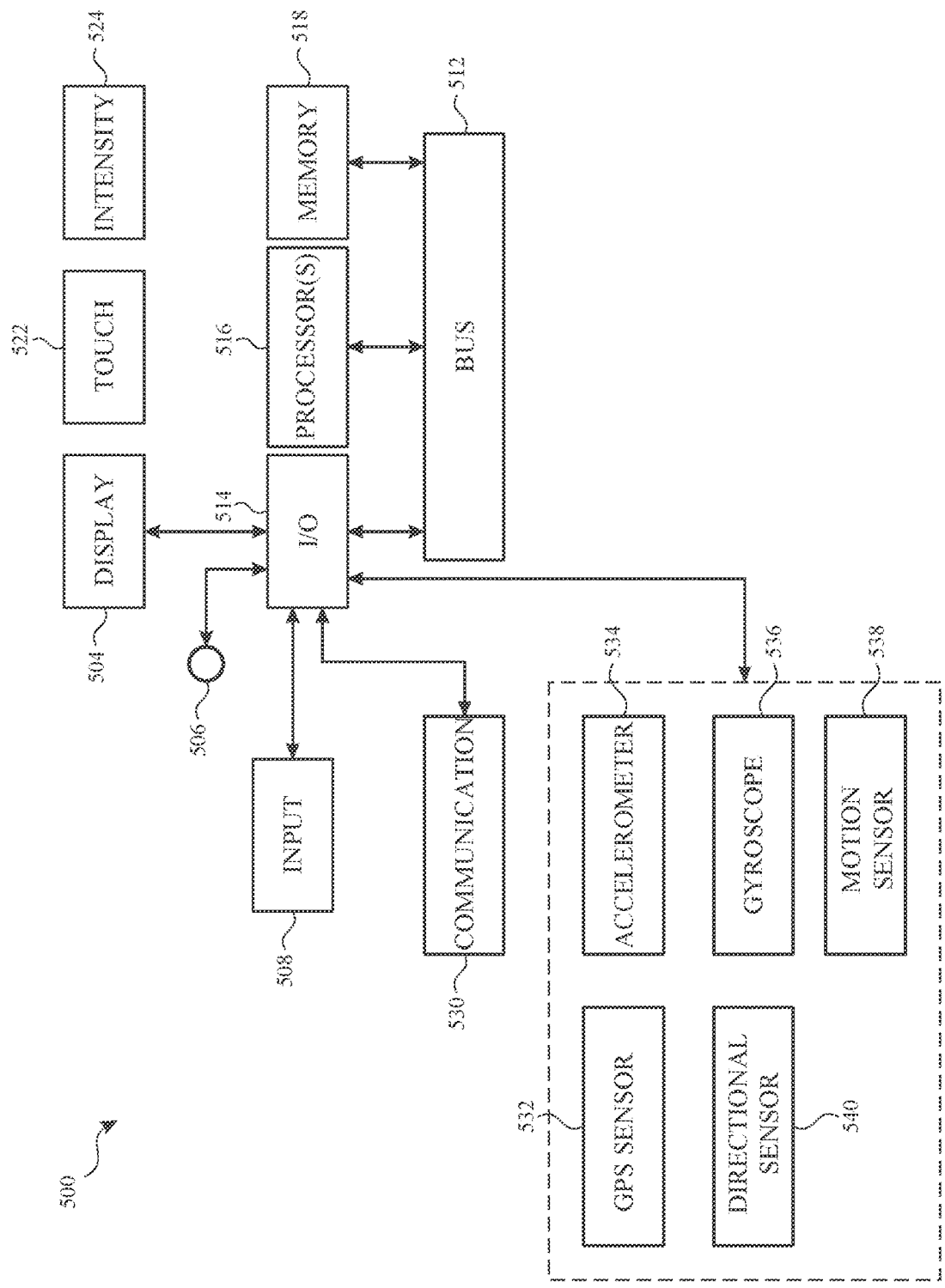
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
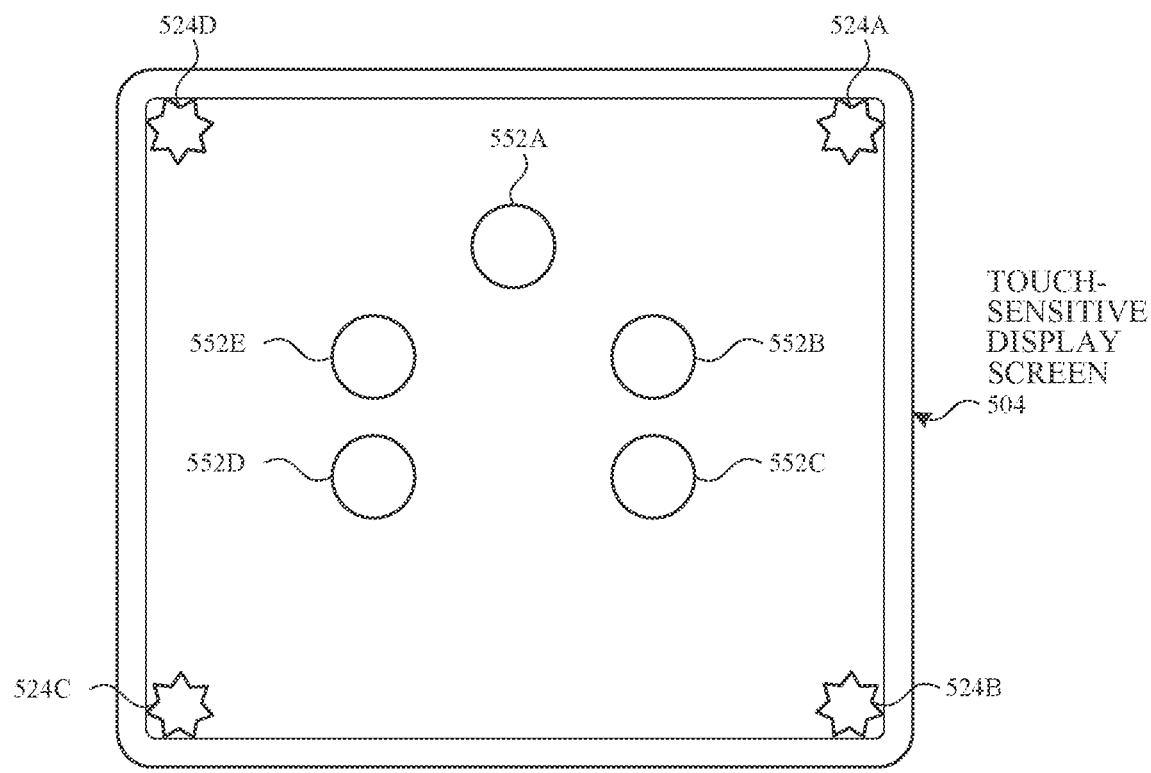
FIGS. 5C-5D illustrate exemplary components of a personal electronic device having a touch-sensitive display and intensity sensors in accordance with some embodiments.
Figure 5C:
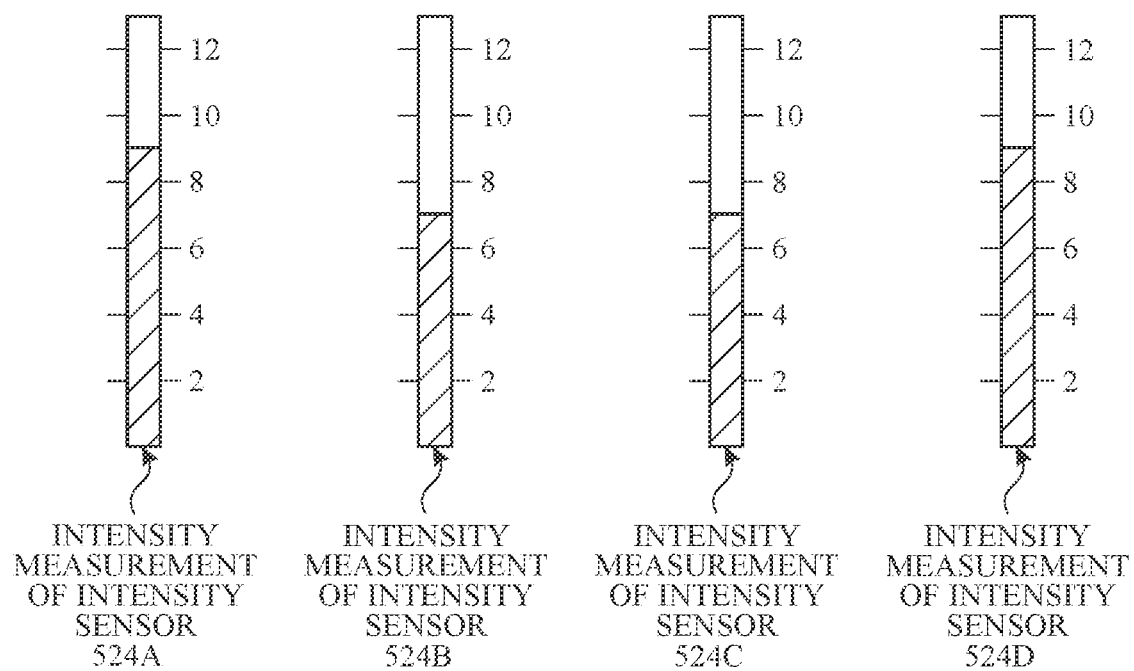
Figure 5D:
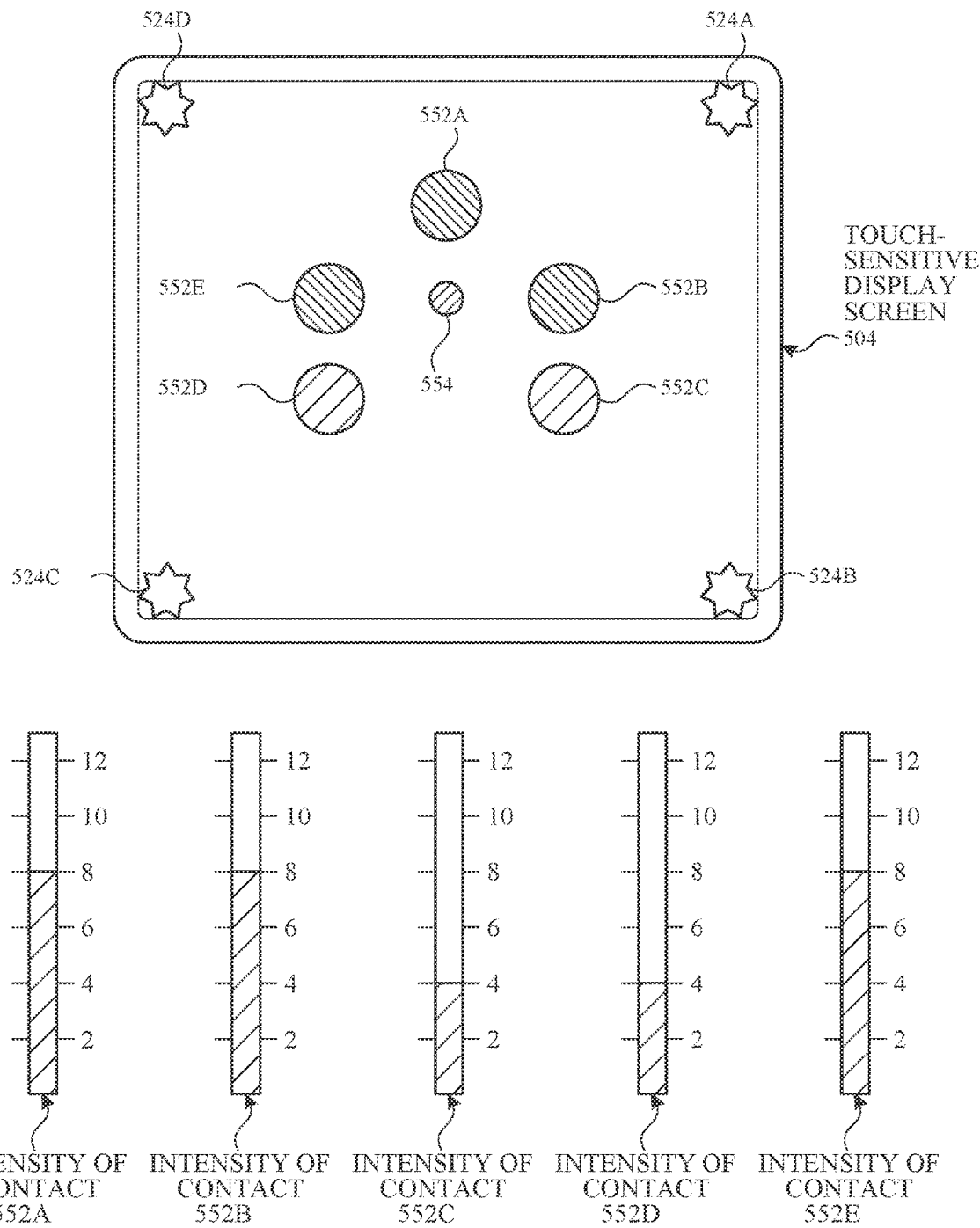

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
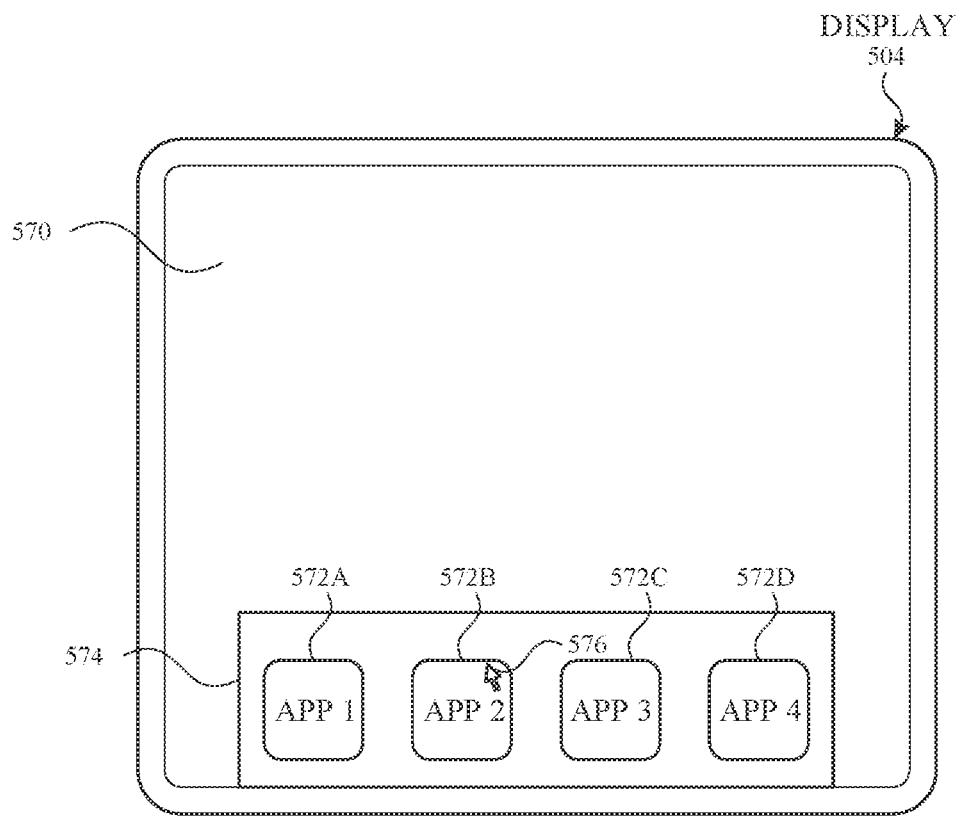
FIGS. 5E-5H illustrate exemplary components and user interfaces of a personal electronic device in accordance with some embodiments.
Figure 5E:
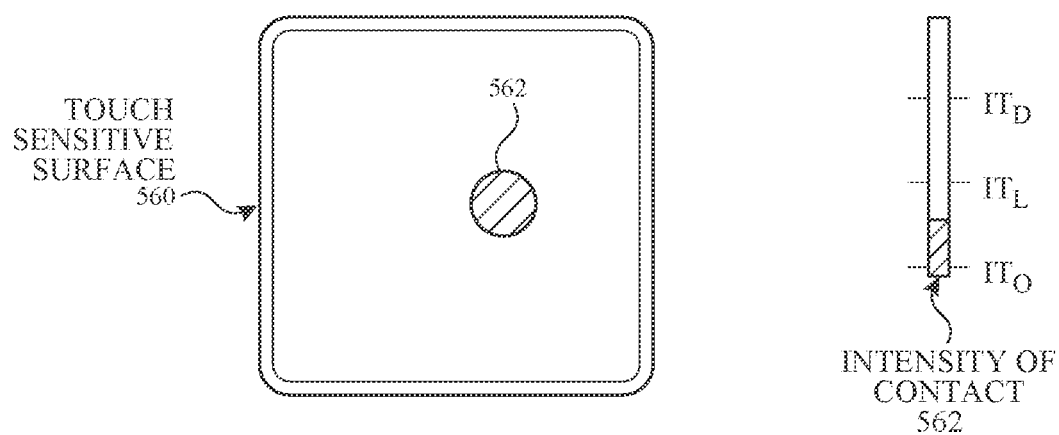
Figure 5F:
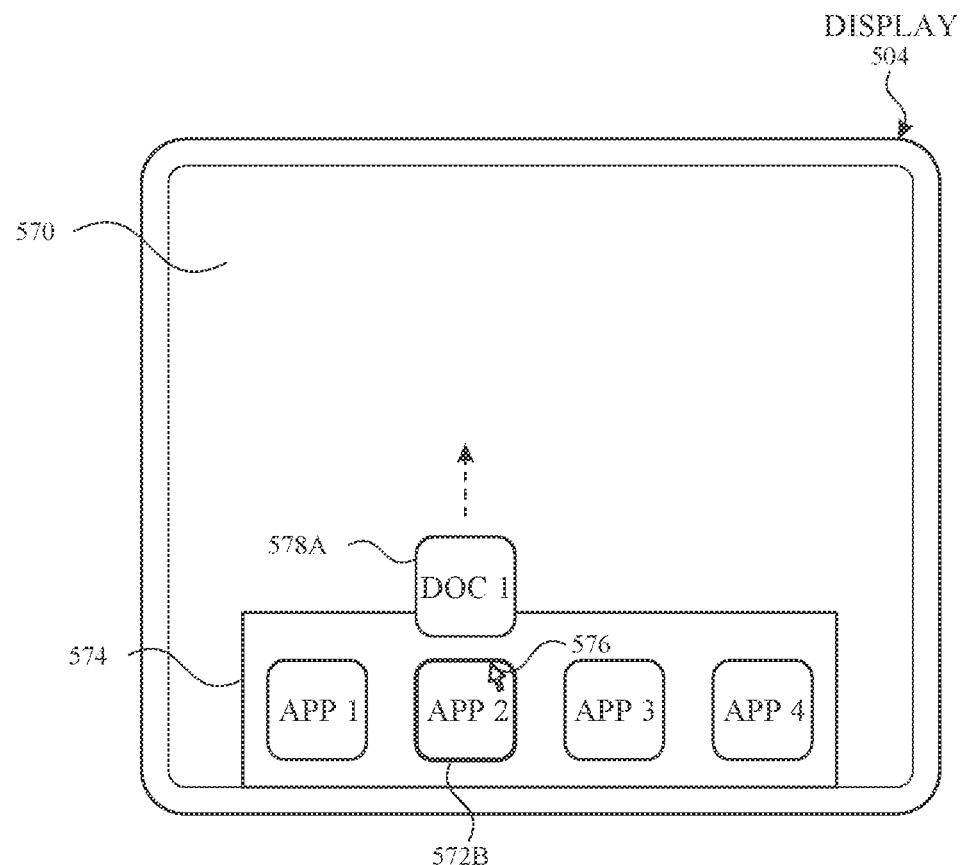
Figure 5F:
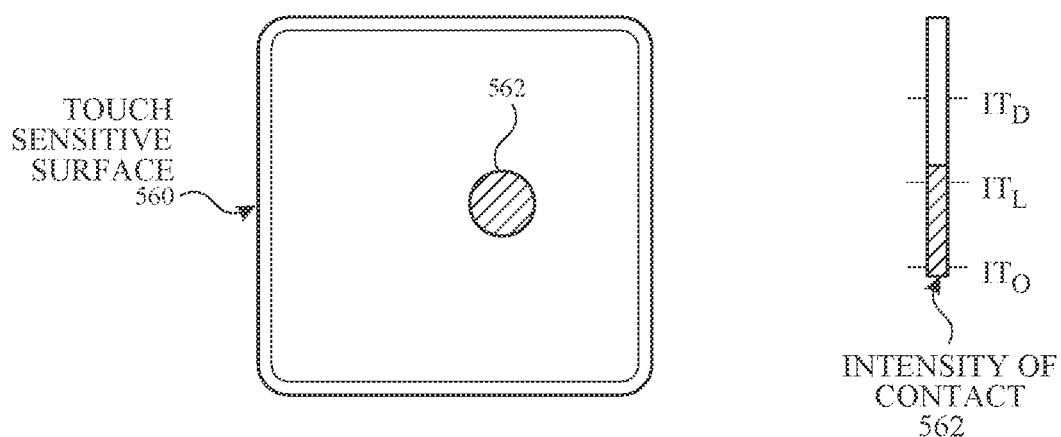
Figure 5G:
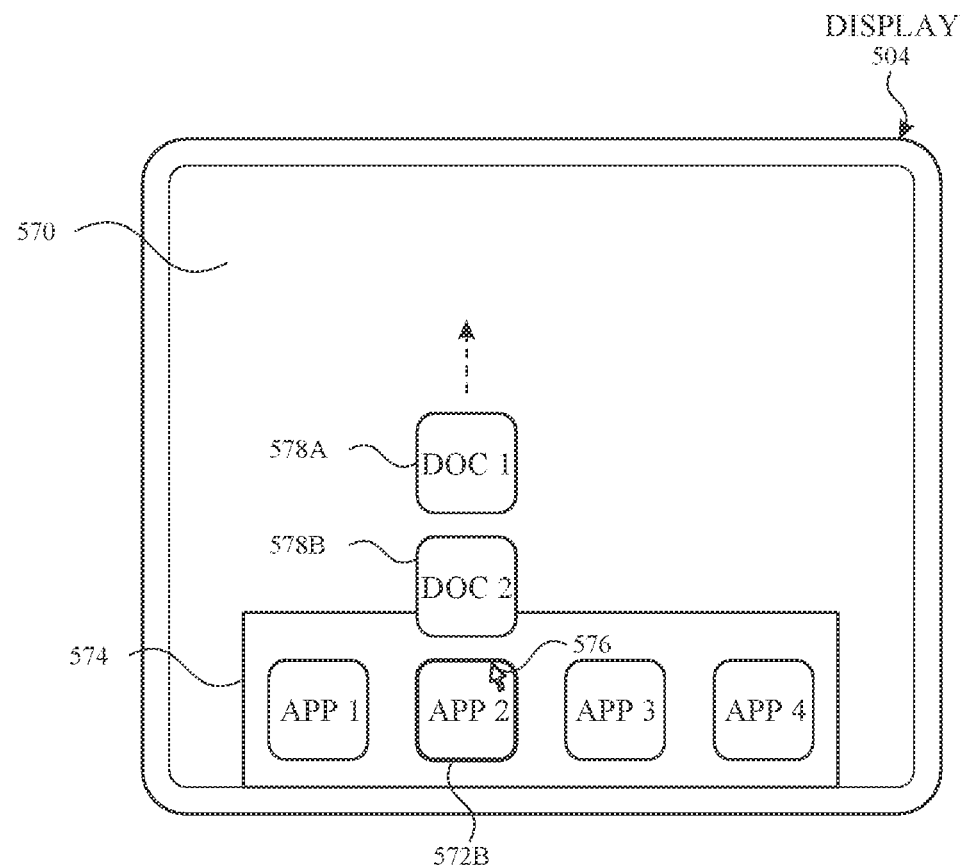
Figure 5G:
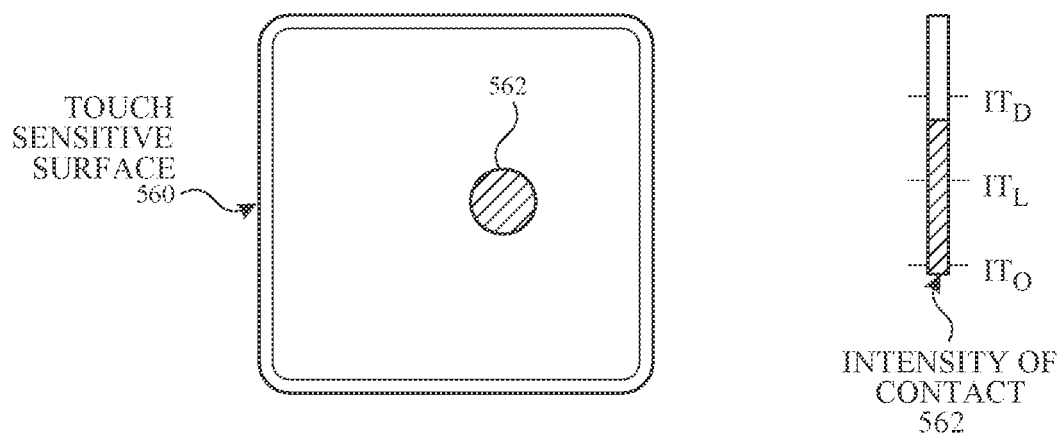
Figure 5H:
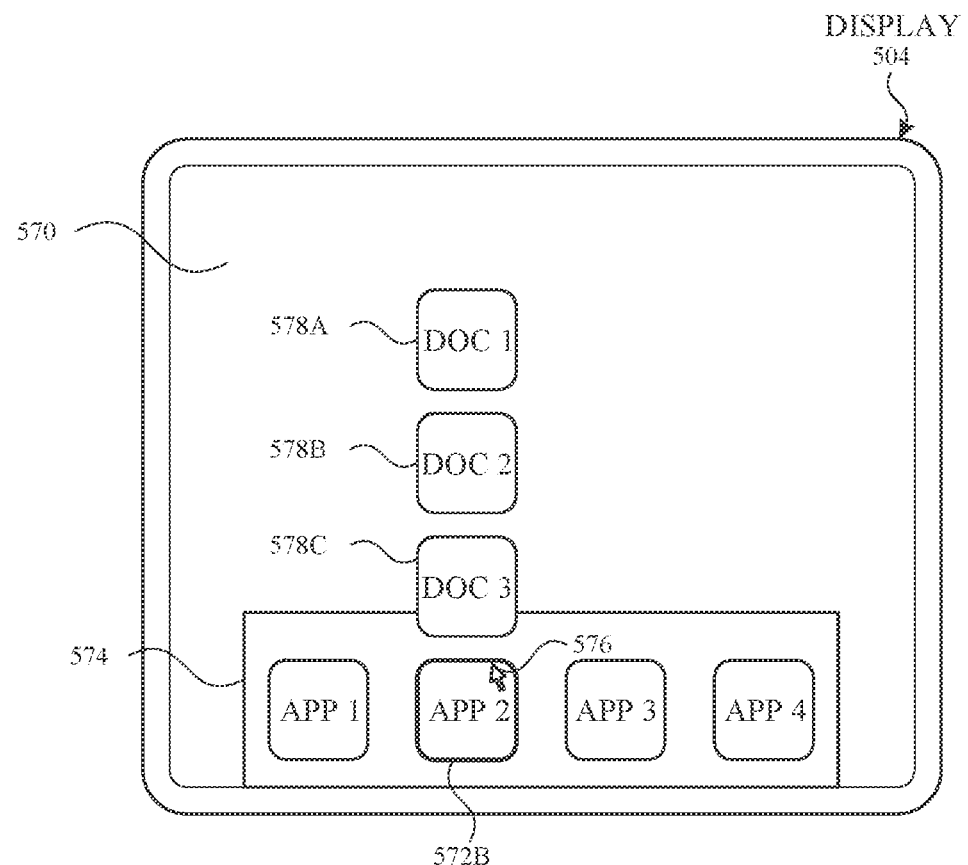
Figure 5H:
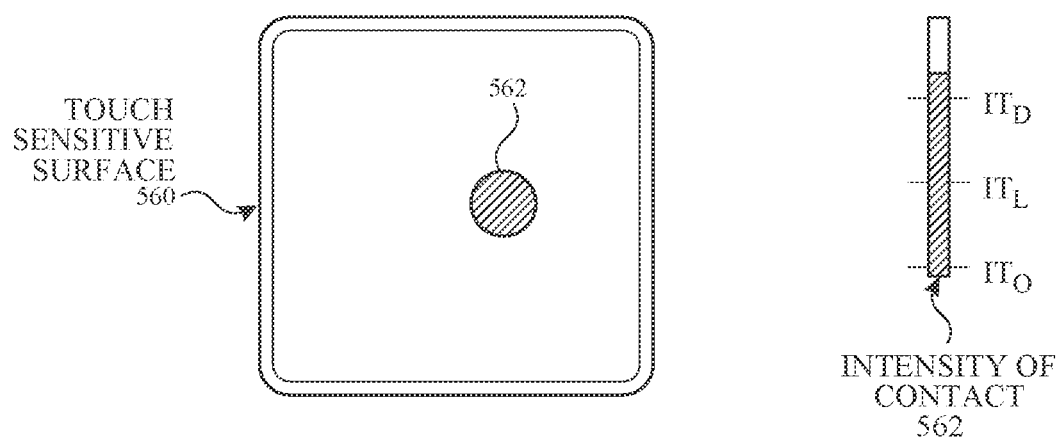

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

Attention is now directed towards embodiments of user interfaces ("UI") and associated processes that are implemented on an electronic device, such as portable multifunction device 100, device 300, or device 500.

FIGS. 6A-6U illustrate exemplary user interfaces for managing secure login with authentication using a visual representation of data (e.g., a unique code), in accordance with some embodiments. The user interfaces in these figures are used to illustrate the processes described below, including the processes in FIGS. 7-8.

FIG. 6A illustrates authenticating device 600 (e.g., device 100, device 300, or device 500) and requesting device 602 (e.g., device 100, device 300, or device 500). In the non-limiting exemplary embodiments illustrated in FIGS. 6A-6U, authenticating device 600 is a smartphone and requesting device 602 is a personal laptop. In some examples, authenticating device 600 and/or requesting device 602 can be different types of electronic devices, such as a wearable device (e.g., a smartwatch). Authenticating device 600 includes a touchscreen display 601 and one or more input devices (e.g., touch component of display 601, hardware button 607, and one or more biometric sensors (e.g., facial recognition sensor 603 or fingerprint sensor 611)). In some examples, facial recognition sensor 603 can include a camera, such as an infrared camera, a thermographic camera, or an combination thereof. In some examples, authenticating device 600 further includes a light-emitting device (e.g., light projector), such as an IR flood light, a structured light projector, or a combination thereof. The light-emitting device is, optionally, used to illuminate a biometric feature (e.g., a face) during capture of biometric data of biometric features by the one or more biometric sensors. In some examples, fingerprint sensor 611 is integrated into a physical button (e.g., a home button of authenticating device 600). Requesting device 602 includes display 605 and one or more input devices (e.g., a keyboard).

At FIG. 6A, a user of device 602 wishes to access content associated with the website, CLOUD.COM, which requires authentication before providing access to the content. Requesting device 602 displays, on display 605, login webpage 606 with username field 608 and password field 610 for logging in to the website (e.g., CLOUD.COM). A user can login to the website by inputting (e.g., via a keyboard) valid credentials into username field 608 and password field 610. Requesting device 602 displays, on display 605, affordance 614, which, when activated, results in a transition from displaying login webpage 606 to displaying alternative login webpage 618 of FIG. 6B. Requesting device 602 receives input 612 (e.g., a mouse click event) at the location of affordance 614. In some examples, a user selects affordance 614 via a tap gesture on display 605 (e.g., a touchscreen display).

In some examples, upon activation of affordance 614, requesting device 602 receives data (e.g., cookie) from the website. The data indicates to a web browser to load alternative login webpage 618 when a user attempts to login to the same website at a later time. In some examples, after receiving the data from the website, requesting device 602 displays, on display 605, alternative login webpage 618 upon receiving a request to login to the website. In some examples, displaying alternative login webpage 618 occurs without displaying login webpage 606.

As illustrated in FIG. 6A, authenticating device 600 displays, on display 601, home screen 604, including camera icon 616. Camera icon 616, when activated, results in authenticating device 600 transitioning from displaying home screen 604 to launching a camera application. As depicted in FIG. 6A, authenticating device 600 is not being used to access (or request access) to content associated with the website, CLOUD.COM.

Figure 6B:
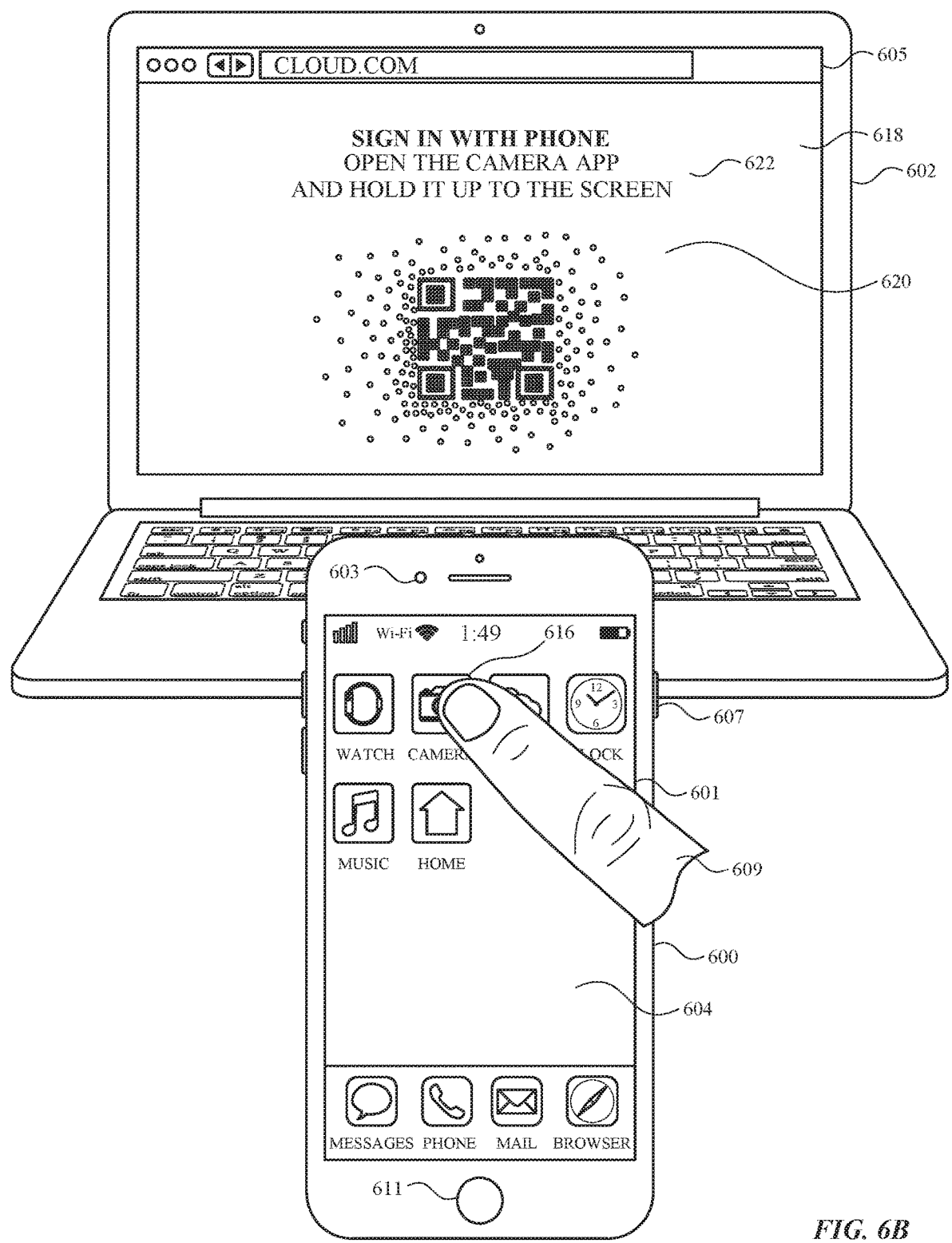

At FIG. 6B, upon activation of affordance 614 of FIG. 6A, requesting device 602 displays, on display 605, alternative login webpage 618 for logging into the website. Alternative login webpage 618 enables a user to login to the website at requesting device 602 by authenticating the user at authenticating device 600. A user can login to the website without manual entry of user credentials into text fields (e.g., username field 608 and/or password field 610). Displaying alternative login webpage 618 includes displaying a computer readable representation of data such as a QR (quick response) code 620 and/or user instruction 622. QR code 620 is a non-textual code that represents machine-readable data by encoding the machine-readable data in two dimensions (e.g., along a horizontal direction and a vertical direction). As illustrated in FIG. 6B, QR code 620 is composed of many small visual dots that are arranged in a specific configuration to form QR code 620. In some examples, QR code 620 includes encoded information representing or associated with one or more of a Uniform Resource Locator (URL), a session identifier (ID), and a secret key (e.g., a shared secret). Authenticating device 600 can use the URL and/or session ID to identify the web browser session and/or the website at requesting device 602 that the user wishes to login to. Authenticating device 600 optionally uses the secret key as a shared secret between authenticating device 600 and the web browser of requesting device 602. In some examples, the shared secret enables authenticating device 600 and requesting device 602 to communicate data (directly or indirectly) without intermediate devices (e.g., a server) being able to recognize the data being communicated. User instruction 622 includes text that prompts the user to take an action at authenticating device 600.

At FIG. 6B, while displaying home screen 604, authenticating device 600 receives input 609 (e.g., tap gesture) via a touchscreen of display 601 at the location of camera icon 616. Input 609 at the location of camera icon 616 results in activation (or selection) of camera icon 616.

Figure 6C:
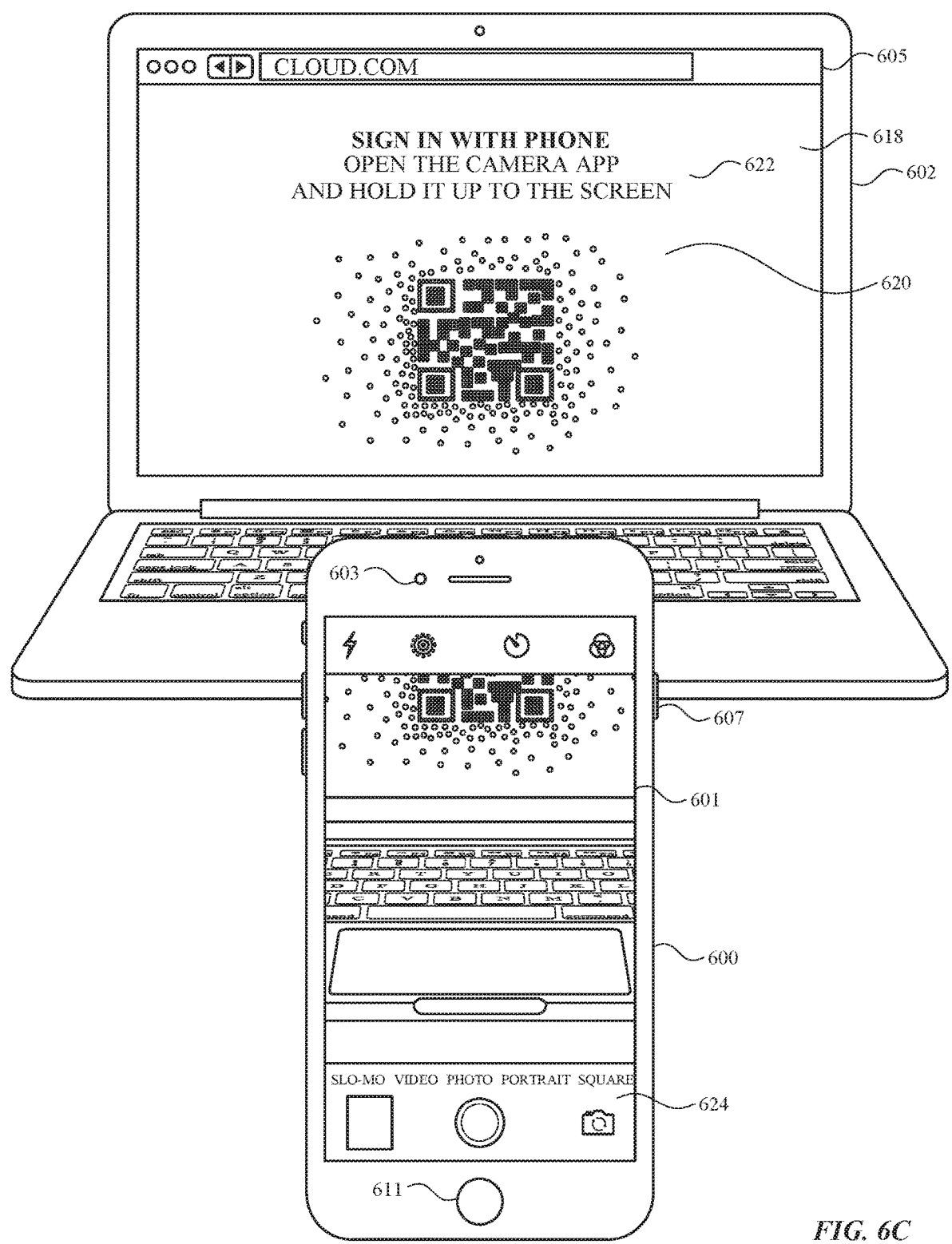

At FIG. 6C, upon detecting activation of camera icon 616, authenticating device 600 launches a camera application. Launching the camera application includes ceasing displaying home screen 604 and transitioning to displaying, on display 601, user interface 624 of the camera application. Displaying user interface 624 of the camera application includes displaying a representation of at least a portion of the data captured by one or more cameras of authenticating device 600. Authenticating device 600 is initially oriented such that the one or more cameras of authenticating device 600 is not fully pointing at QR code 620. In this orientation, authenticating device 600 is unable to recognize QR code 620 because a significant portion of QR code 620 is not captured via the one or more cameras of authenticating device 600. In some examples, if QR code 620 is below a threshold size the device also does not recognize the QR code or does not react as if it recognizes the QR code to avoid accidentally prompting the user to perform operations associated with the QR code if it is not clear that the user is pointing the camera toward the QR code (e.g., by placing the QR code in view of the camera at greater than the threshold size).

Figure 6D:
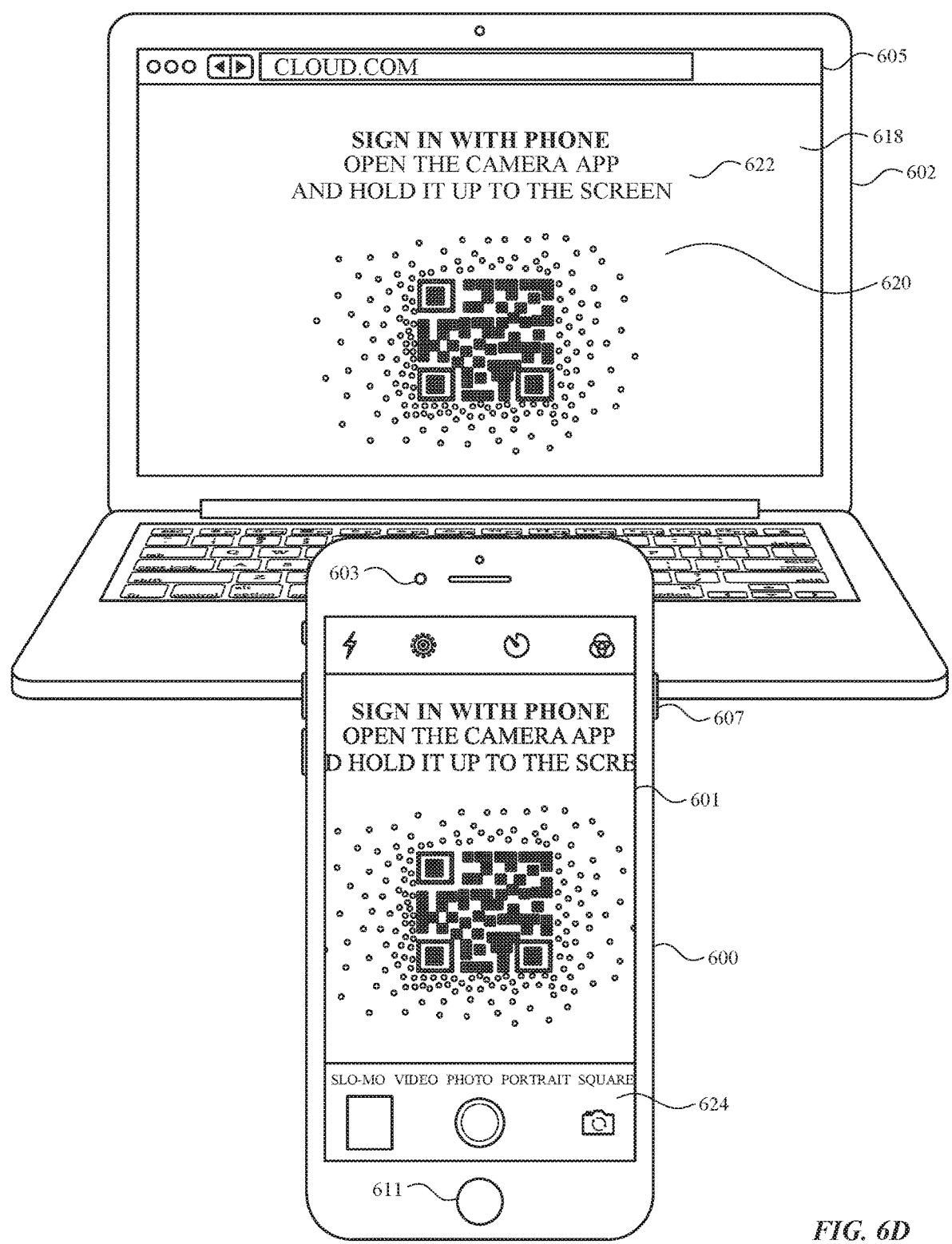

At FIG. 6D, a user re-orients authenticating device 600 such that QR code 620 is fully in the field of view of the one or more cameras of authenticating device 600. In this new orientation, authenticating device 100 detects (or recognizes) QR code 620 that is displayed on display 605 of requesting device 602. Detecting QR code 620 includes capturing, via the one or cameras of authenticating device 600, the data represented by QR code 620. Detecting QR code 620 optionally includes interpreting the data represented by QR code 620. As depicted in FIGS. 6A-6U, in response to detecting QR code 620, authenticating device 600 proceeds to display a banner 626 of FIG. 6E. In some examples, upon detecting QR code 620, authenticating device 600 proceeds to displaying biometric authentication interface 634 of FIG. 6H without displaying banner 626 of FIG. 6E.

Figure 6E:
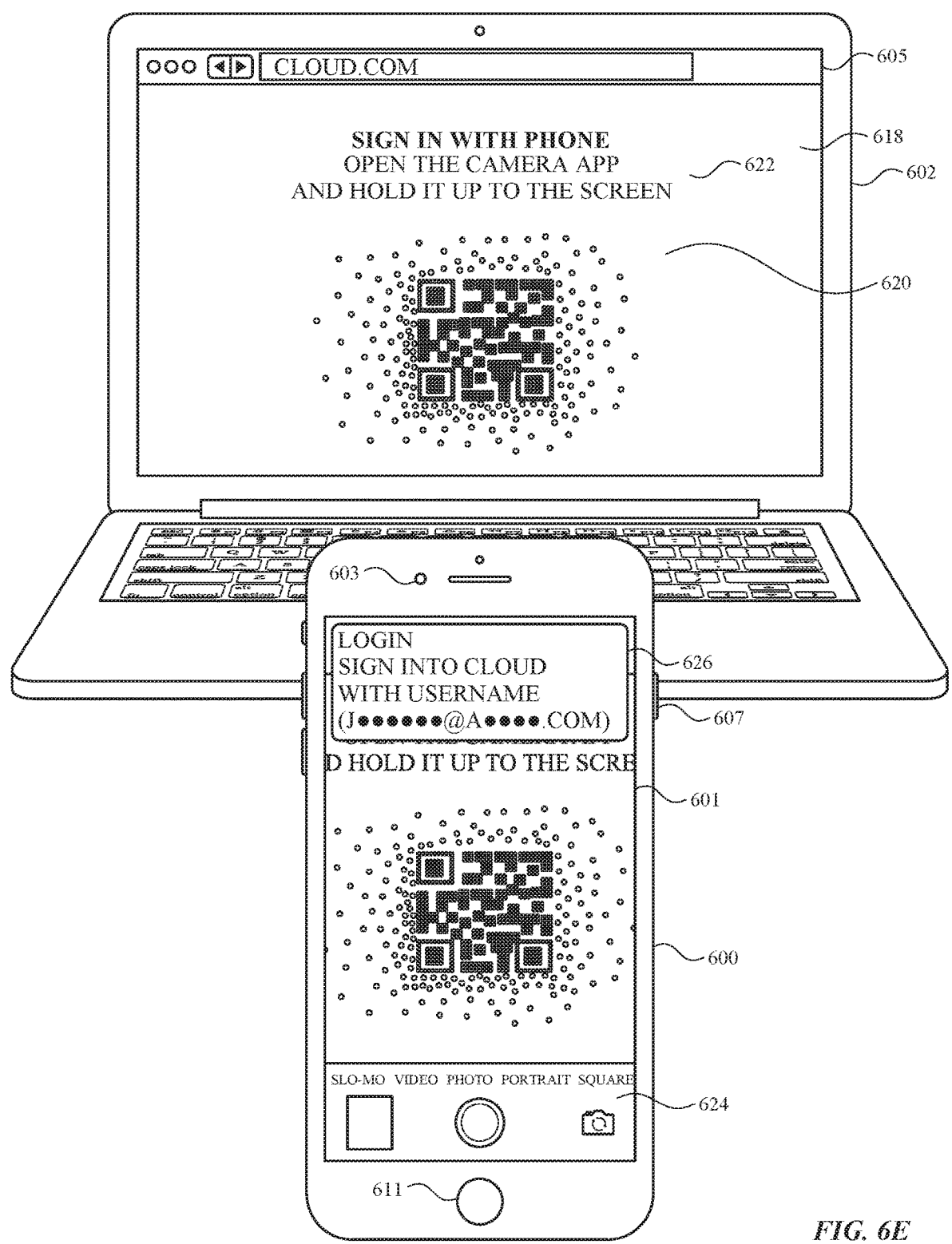

At FIG. 6E, upon detecting QR code 620, authenticating device 600 displays, on display 601, banner 626 (e.g., a user interface element). In some examples, displaying banner 626 includes displaying an animation of banner 626 such that banner 626 slides into display (e.g., into view on the display) from the top edge of display 601 of authenticating device 600. Banner 626 includes text prompting the user to login to a user account associated with the user. In some examples, banner 626 includes a plurality of characters that replaces (or obscures) text associated with a user account of the user, as illustrated in FIG. 6E. In some examples, authenticating device 600 ceases displaying banner 626 after a predetermined amount of time of inactivity (e.g., authenticating device 600 receives no input (e.g., tap gesture) for a predetermined amount of time).

Figure 6F:
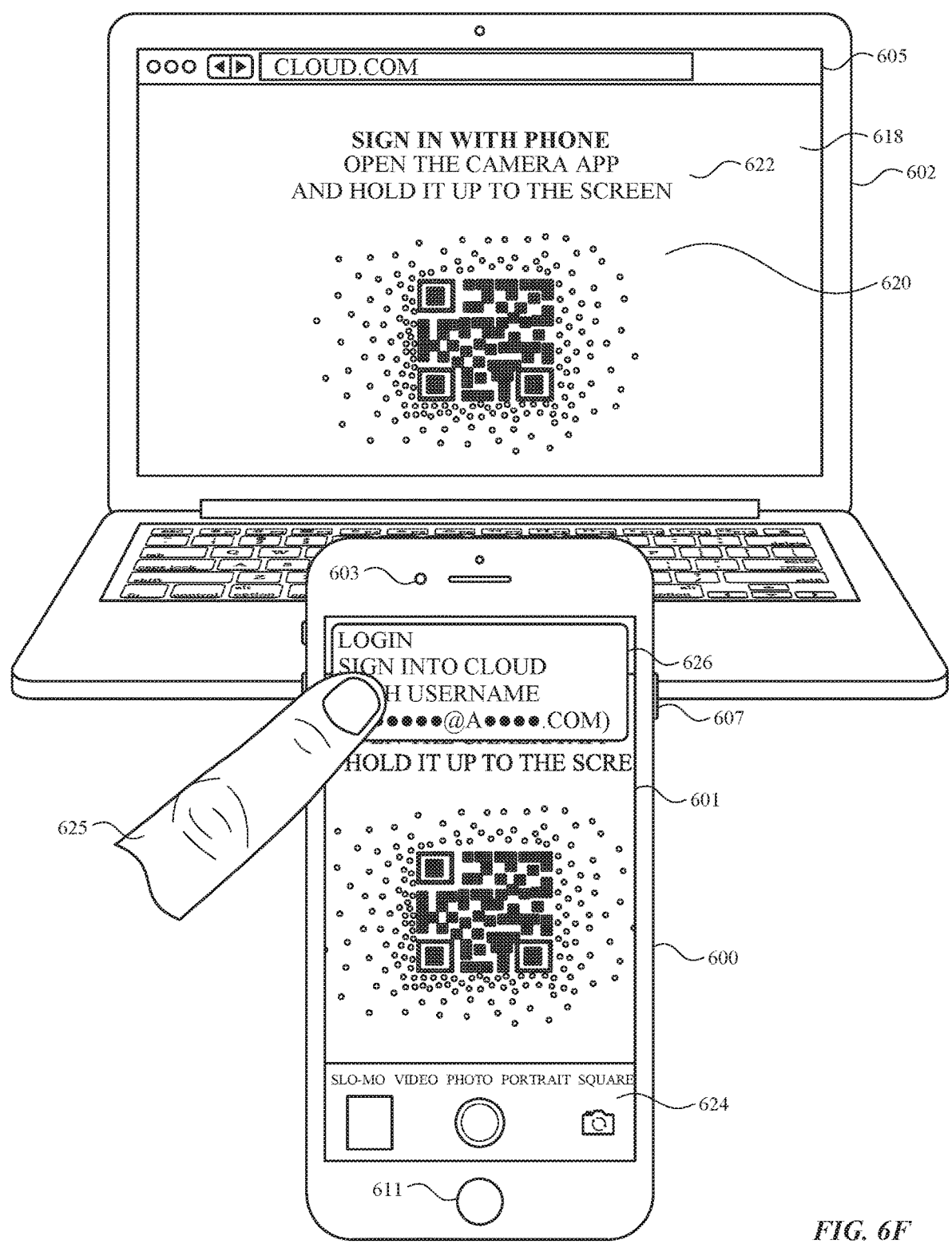

At FIG. 6F, authenticating device 600 receives input 625 (e.g., tap gesture) via the touchscreen of display 601 at the location of banner 626.

Figure 6G:
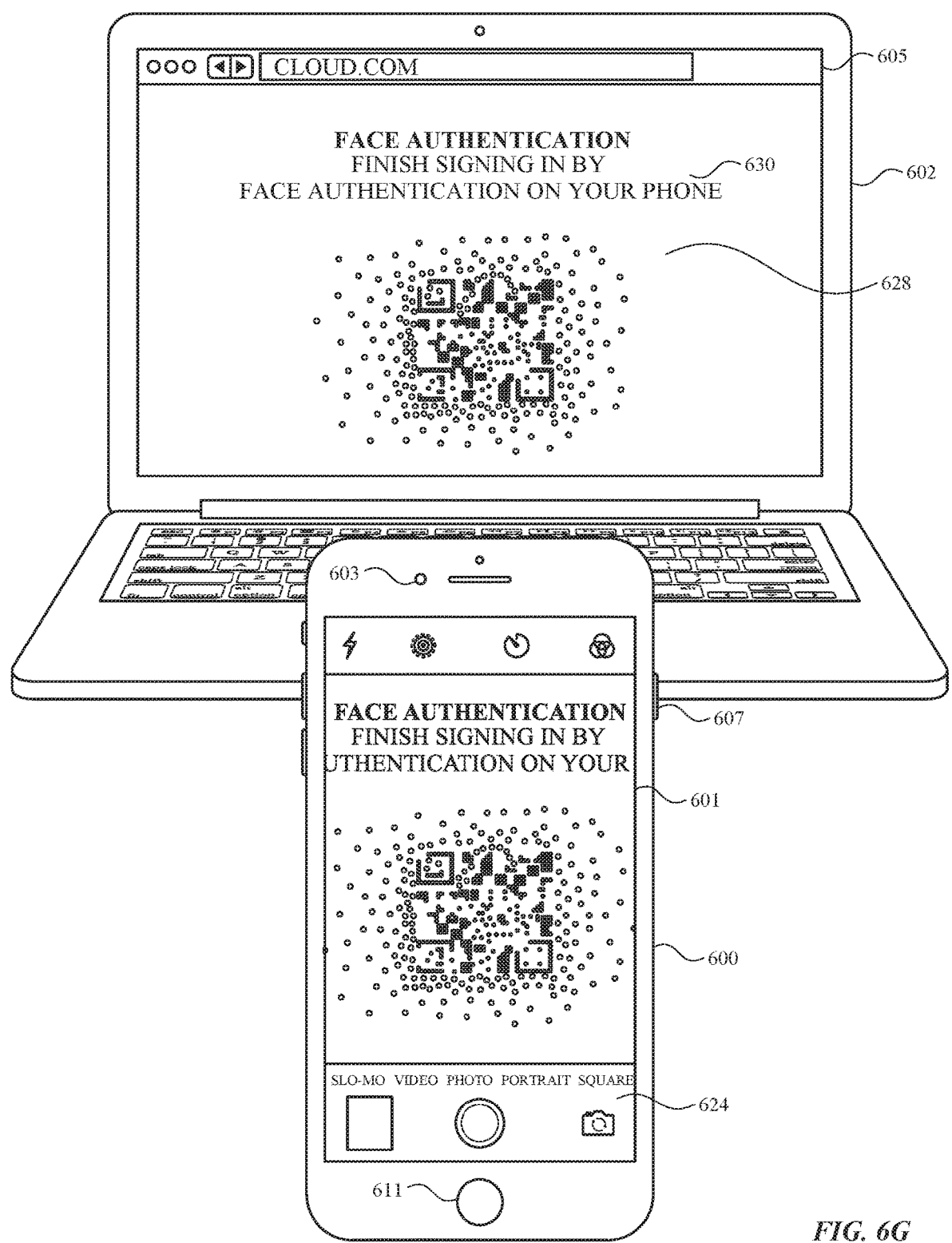

At FIG. 6G, upon receiving selection of banner 626, authenticating device 600 ceases displaying banner 626. Further upon receiving selection of banner 626, authenticating device 600 transmits data to a remote device (e.g., requesting device 602 or a server that is in communication with requesting device 602). The data includes data about the type of authentication available to a user to authenticate the user at authenticating device 600. For example, some types of authentication include biometric authentication via a biometric sensor (e.g., facial recognition sensor 603 or fingerprint sensor 611) or non-biometric authentication (e.g., password, passcode, or gesture entry) via a displayed character input interface (e.g., a virtual keyboard or virtual numeric keypad). In some examples, the data includes data indicating that authenticating device 600 has detected QR code 620. In some examples, the data includes data indicating that authenticating device 600 has received selection of banner 626.

In response to authenticating device 600 transmitting data to the remote device, requesting device 602 receives data about the type of authentication available to a user to authenticate the user at authenticating device 600. Upon receiving the data about the type of authentication (or upon authenticating device 600 receiving selection of banner 626), requesting device 602 displays animation 628 that shows a transition from QR code 620 of FIG. 6F to icon 632 of FIG. 6H. Animation 628 shown in FIGS. 6F-6H includes rearranging the dots that comprise QR code 620 into a new configuration. As illustrated in FIG. 6G, animation 628 has begun, and the dots that comprise QR code 620 are being rearranged. Further upon receiving the data about the type of authentication, requesting device 602 displays, on display 605, user instruction 630. User instruction 630 includes text that prompts the user to take an action at authenticating device 600. In some examples, requesting device 602 displays animation 628 in response to authenticating device 600 detecting QR code 620.

In some examples, requesting device 602 receives the data directly from authenticating device 600. In some examples, requesting device 602 receives the data from an intermediate server that is in communication with authenticating device 600.

Figure 6H:
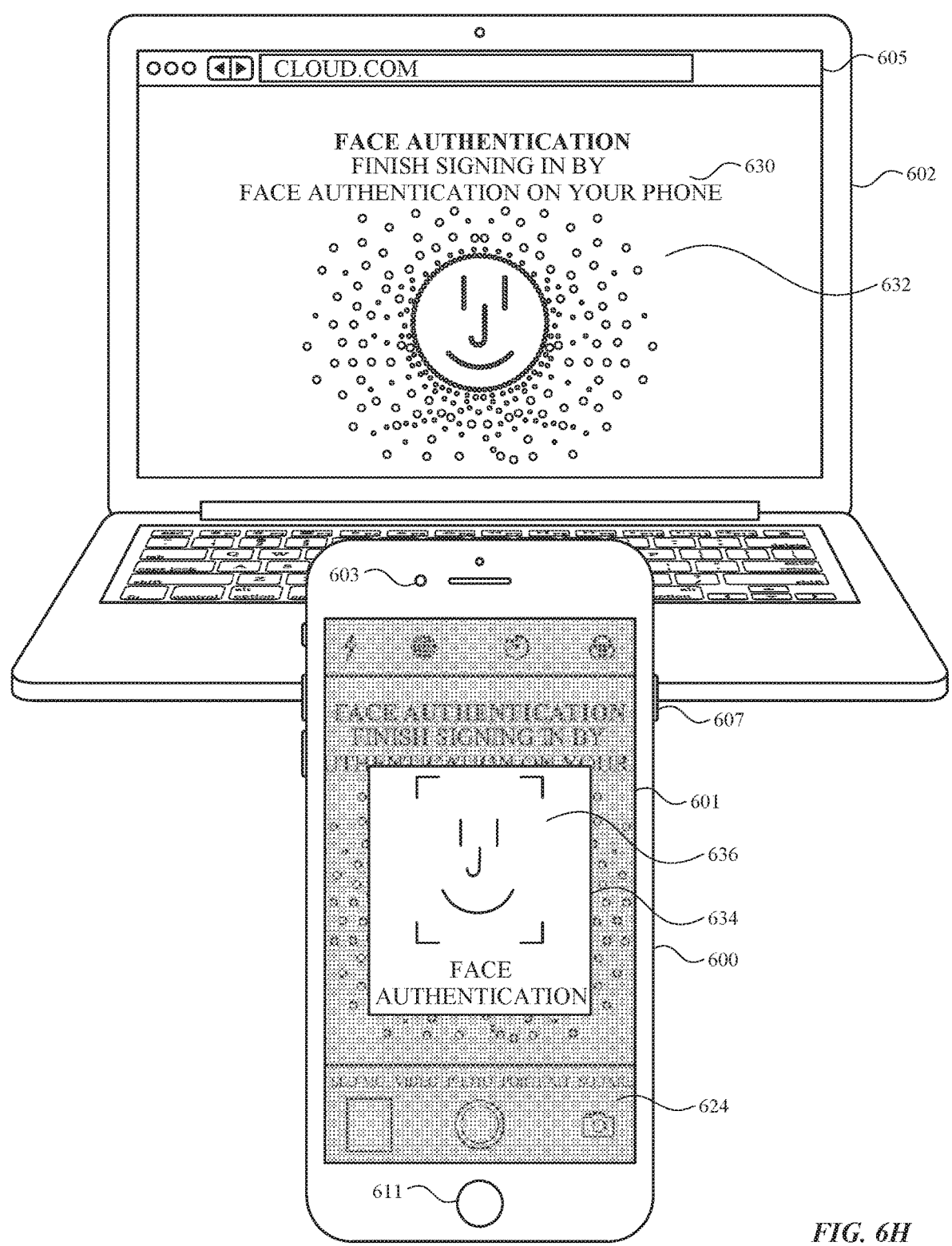

At FIG. 6H, the animation 628 has completed at requesting device 602. The dots have been rearranged into a new configuration. Requesting device 602 displays, on display 605, the new configuration as icon 632. Icon 632 is associated with facial recognition authentication. Icon 632 indicates to the user that the user can authenticate at authenticating device 600 using facial recognition authentication. In some examples, icon 632 is associated with fingerprint authentication or non-biometric (e.g., passcode, password, or gesture) authentication.

As illustrated in FIG. 6H, authenticating device 600 initiates biometric authentication upon receiving selection of banner 626 of FIG. 6F. Authenticating device 600 uses a biometric sensor (e.g., facial recognition sensor 603) to determine whether certain biometric authentication criteria have been met.

Initiating biometric authentication includes displaying, on display 601, biometric authentication interface 634 having biometric authentication glyph 636. Biometric authentication glyph 636 is a simulation of a representation of a biometric feature (e.g., a face). Biometric authentication interface 634 is overlaid on at least a portion of user interface 624 of the camera application. In some examples, displaying biometric authentication interface 634 includes blurring at least a portion of user interface 624 of the camera application. A user presents their face for biometric authentication. Authenticating device 600 captures and process (e.g., analyzes) the biometric data associated with the user's face from the biometric sensor (e.g., facial recognition sensor 603). Facial recognition sensor 603 is contactless such that the sensor is configured to perform biometric authentication without physical input from the user (e.g., without any additional gestures after input 625). As a result, authenticating device 600 initiates biometric authentication using facial recognition sensor 603 without needing to receive an explicit request from a user to initiate biometric authentication. In some examples, authenticating device 600 requires an explicit request (e.g., single press or double press) from the user via one or more input devices (e.g., hardware button 607) to initiate biometric authentication. In some examples, authenticating device 600 ceases displaying biometric authentication interface 634 after a predetermined amount of time of inactivity (e.g., authenticating device 600 receives no input (e.g., tap gesture) for a predetermined amount of time).

Figure 6I:
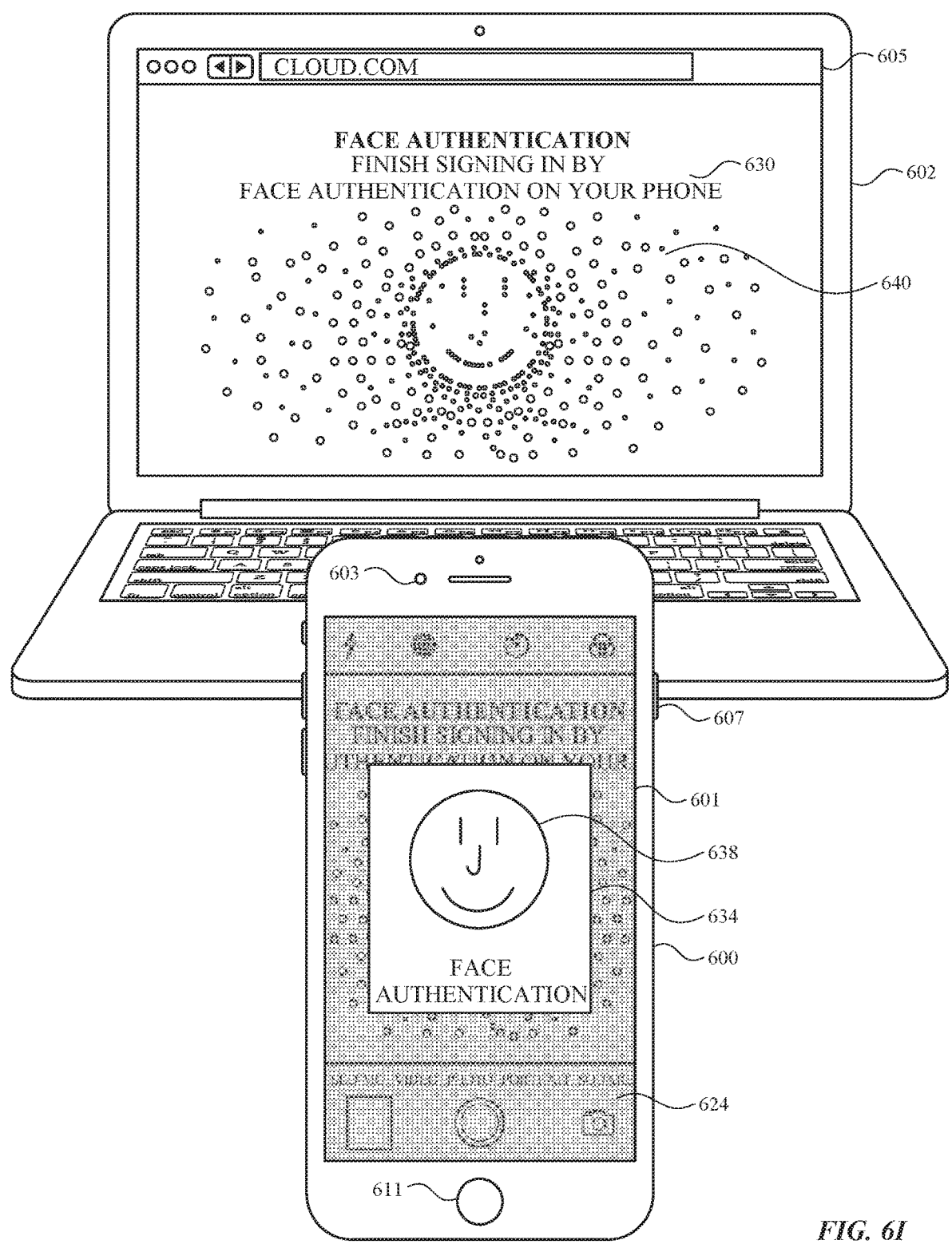

At FIG. 6I, authenticating device 600 determines that the captured biometric data satisfies certain biometric authentication criteria. As a result of successful user authentication, authenticating device 600 displays biometric authentication interface 634 having successful biometric authentication glyph 638. Successful biometric authentication glyph 638 indicates that a user has successfully authenticated at authenticating device 600. Further in response to determining that the captured biometric data satisfies certain biometric authentication criteria, authenticating device 600 transmits data to a remote device (e.g., requesting device 602 or a server that is in communication with requesting device 602). The data indicates that a user has successfully authenticated at authenticating device 600.

Further at FIG. 6I, in response to authenticating device 600 determining that the captured biometric data satisfies certain biometric authentication criteria, requesting device 602 receives data indicating that a user has successfully authenticated at authenticating device 600. In response to receiving this indication of successful authentication, requesting device 602 displays, on display 605, animation 640 where the dots comprising icon 632 disperse such that icon 632 ceases to be displayed as a result of the animation. In some examples, animation 640 shows the dots comprising icon 632 moving outwardly prior to ceasing to be displayed.

Figure 6J:
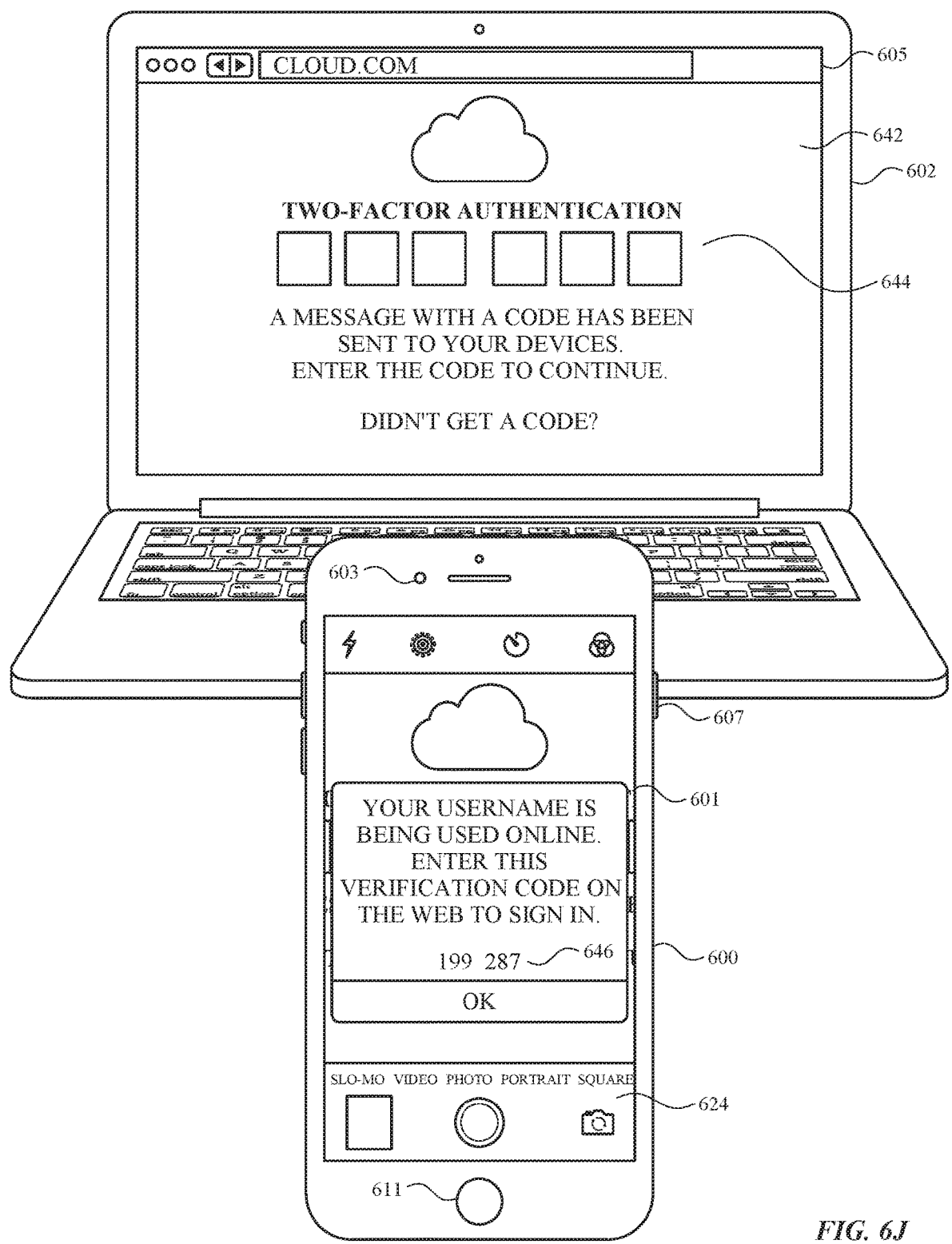

At FIG. 6J, further in response to receiving data indicating that a user has successfully authenticated at authenticating device 600, requesting device 602 prompts the user for additional authentication information prior to logging in the user. Requesting device 602 prompts the user for additional authentication because the website requires two-factor authentication to login the user. Prompting the user for additional authentication information includes displaying, on display 605, user interface 642 with prompt 644. Prompt 644 includes input fields for receiving input via one or more input devices (e.g., a keyboard). Prompt 644 optionally indicates to the user that an authentication code (e.g., authentication code 646) has been sent to one of the user's devices (e.g., a device that is already associated with a user account of the user).

As illustrated in FIG. 6J, authenticating device 600 displays authentication code 646, which can be used to successfully complete two-factor authentication. In some examples, all devices that are associated with a user account of the user (e.g., a trusted device) are capable of displaying authentication code 646. In some examples, prior to displaying authentication code 646, a trusted device (e.g., authenticating device 600, requesting device 602, or a third device) displays a map with a location of the device (e.g., requesting device 602) being used to login to the website or service. Displaying the map includes displaying an affordance for allowing the trusted device to proceed to displaying an authentication code (e.g., authentication code 646) for completing two-factor authorization at requesting device 602. If the trusted device receives an input selecting the affordance, the trusted device displays the authentication code.

In some examples, two-factor authentication is not required. When two-factor authentication is not required, requesting device 602 proceeds to displaying user interface 648 of FIG. 6L or user interface 654 of FIG. 6M without prompting the user for additional authentication information.

Figure 6K:
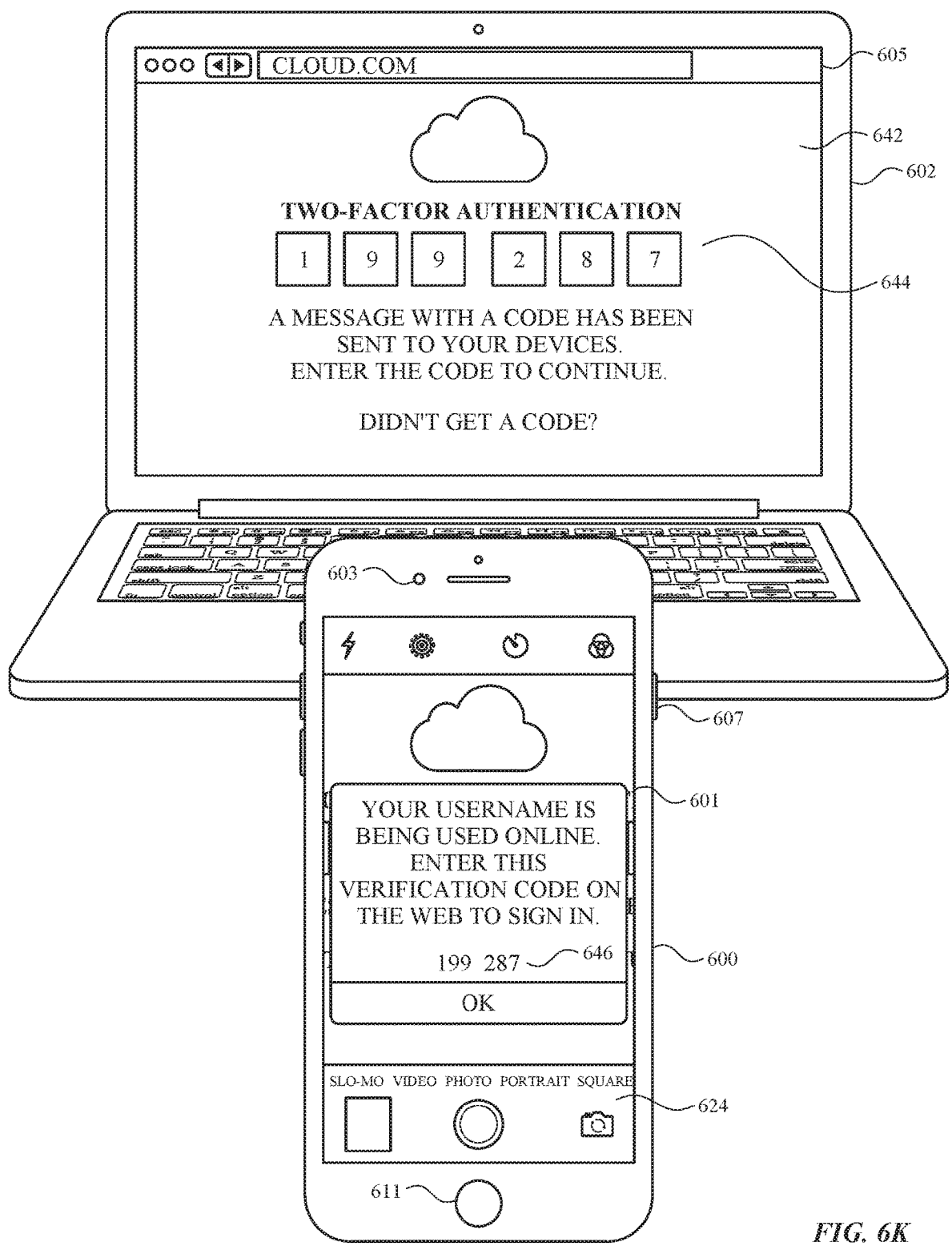

At FIG. 6K, requesting device 602 receives input via an input device (e.g., a keyboard). Requesting device 602 determines whether the received input is a valid authentication code. If requesting device 602 determines that the received input is a valid authentication code, requesting device 602 proceeds to login the user. In some examples, if requesting device 602 determines that the received input is not a valid authentication code, requesting device 602 forgoes proceeding to login the user.

Figure 6L:
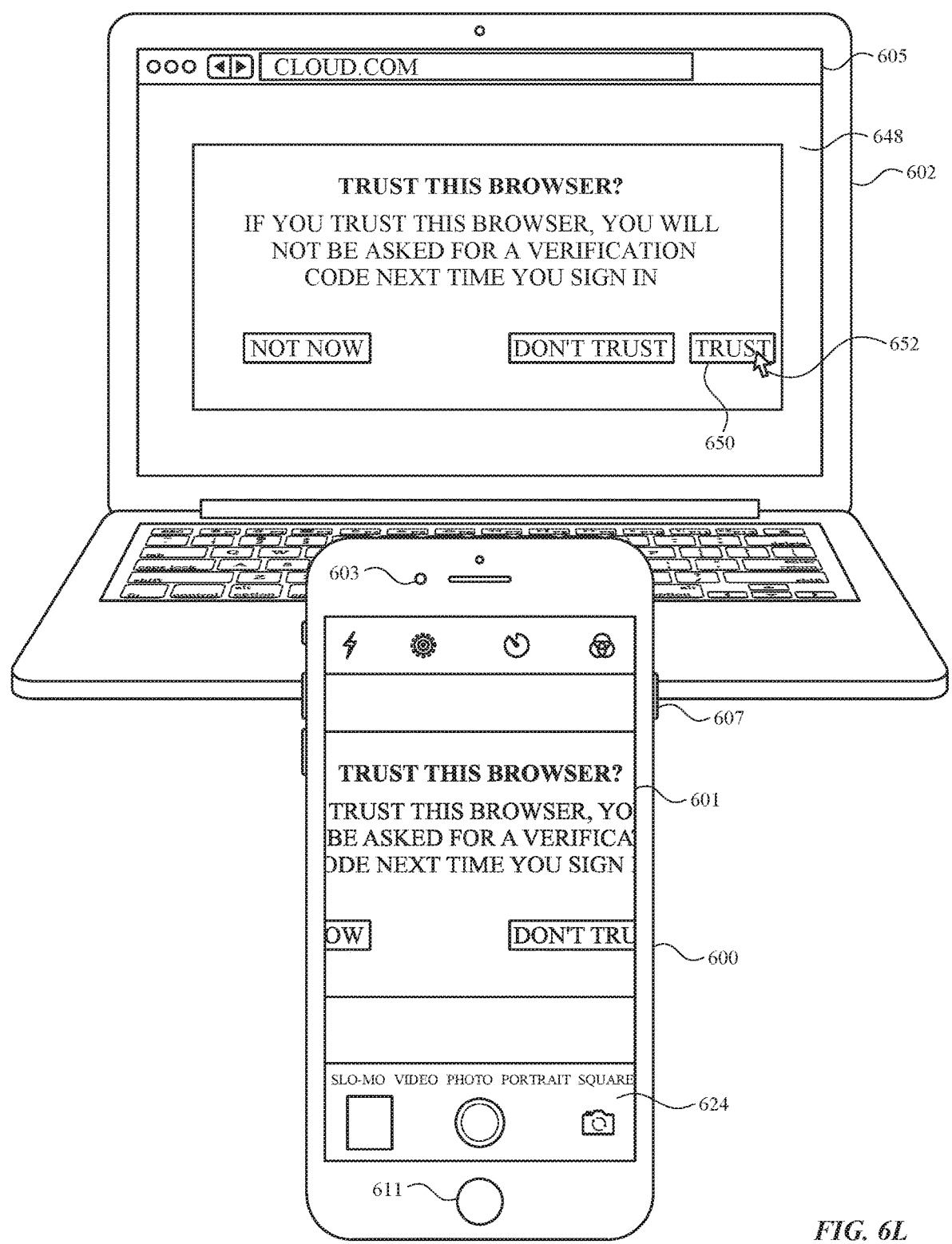

At FIG. 6L, upon determining that the received input is a valid authentication code, requesting device 602 displays user interface 648, including trust affordance 650. Requesting device 602 receives input 652 (e.g., mouse click event) at the location of trust affordance 650. Trust affordance 650 provides a user the option to trust the web browser (e.g., Safari) for a predetermined amount of time (e.g., 30 days). Trusting the web browser obviates the need for two-factor authentication when a future login is attempted within the predetermined amount of time. As a result, when a user later attempts to login to the website using the same web browser within the predetermined amount of time, a user is not required to provide additional authentication information (e.g., authentication code 646). In some examples, upon determining that the received input is a valid authentication code, requesting device 602 proceeds to displaying user interface 654 of FIG. 6M without displaying user interface 648.

Figure 6M:
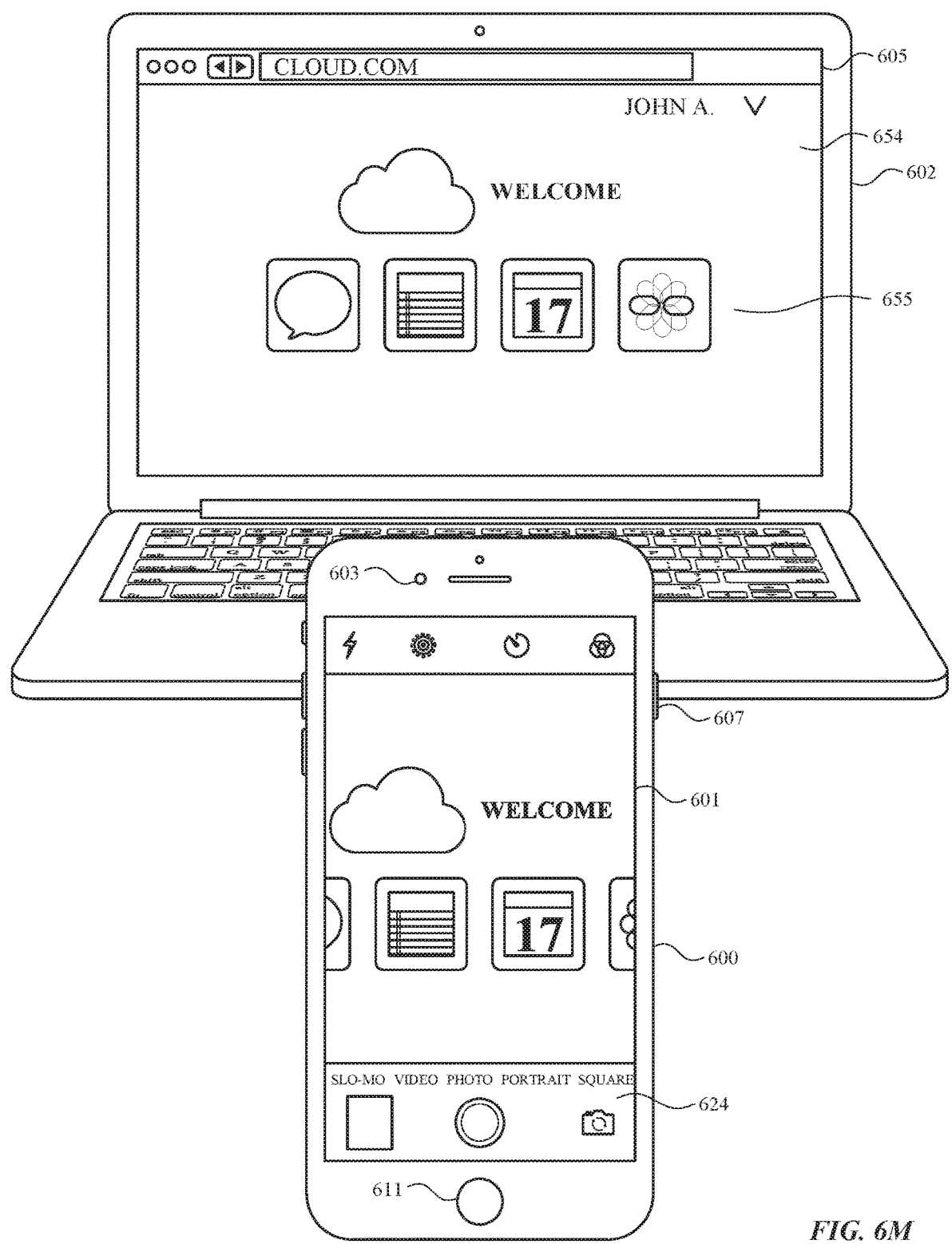

At FIG. 6M, requesting device 602 displays user account webpage 654 upon receiving input 652 at the location of trust affordance 650. The user has successfully logged in to the website. In some examples, user account webpage 654 includes content 655. Content 655 can be restricted content (e.g., content that requires authentication to access it). In some examples, content 655 is remote content (e.g., content that is received from a remote device).

Figure 6N:
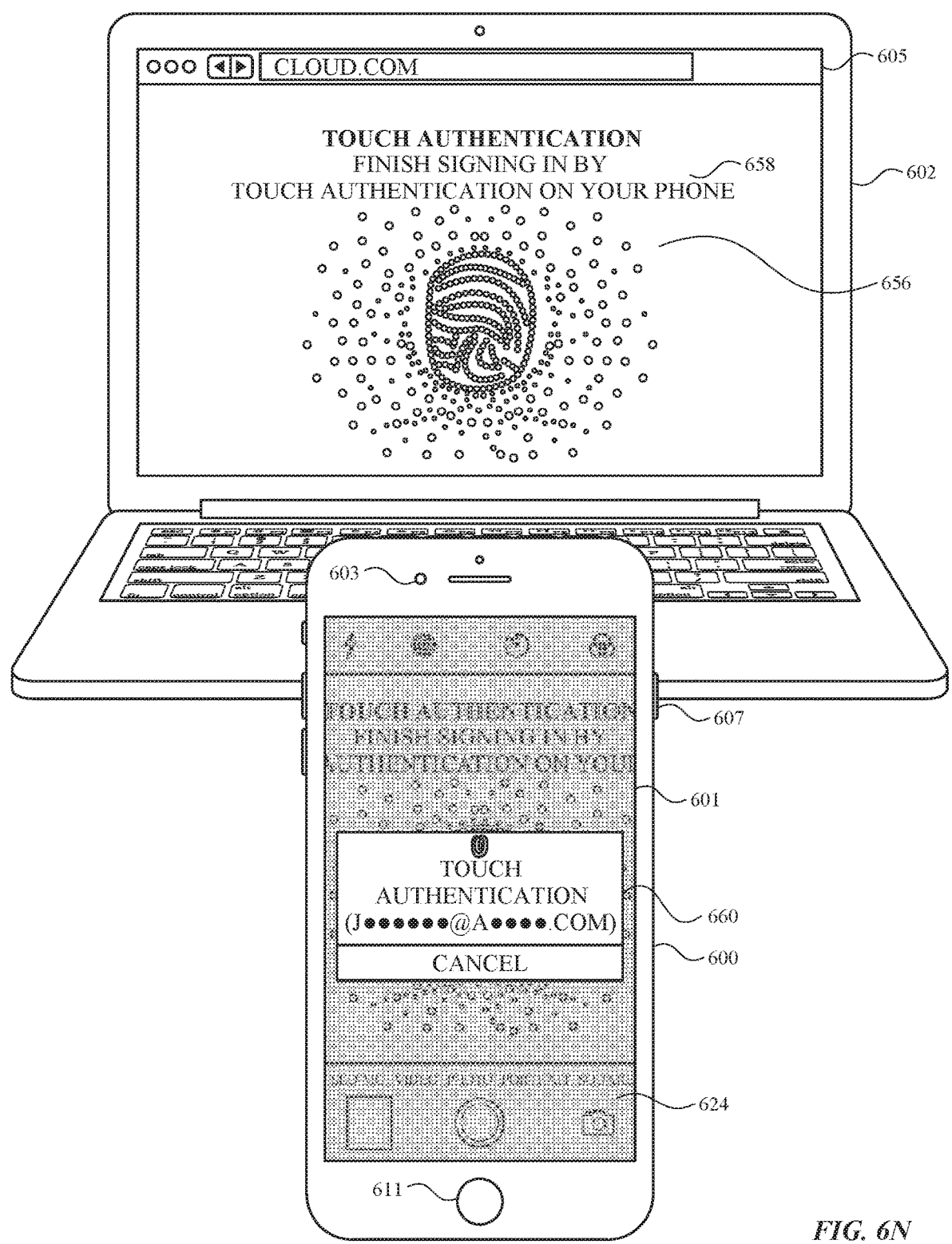

In some examples, instead of animation 628 transitioning to displaying icon 632 as illustrated in FIGS. 6G-6H, animation 628 transitions to displaying icon 656 as illustrated in FIG. 6N. At FIG. 6N, animation 628 has completed at requesting device 602. Similar to FIG. 6H, the dots comprising QR code 620 have been rearranged into a new configuration. Requesting device 602 displays, on display 605, the new configuration of dots as icon 656. Icon 656 indicates to the user that the user can authenticate at authenticating device 600 using fingerprint authentication. (e.g., via fingerprint sensor 611). Similar to FIG. 6G, upon receiving the data about the type of authentication, requesting device 602 displays, on display 605, user instruction 658. User instruction 658 includes text that prompts the user to take an action at authenticating device 600.

In some examples, instead of facial recognition authentication, as illustrated in FIG. 6H, authenticating device 600 uses fingerprint authentication (e.g., via fingerprint sensor 611) to authenticate the user. Authenticating device 600 displays biometric authentication interface 660 instead of biometric authentication interface 634 of FIG. 6H. Biometric authentication interface 660 indicates to the user that the user can perform fingerprint authentication via fingerprint sensor 611. When the user places their finger on fingerprint sensor 611, authenticating device 600 performs fingerprint authentication. Authenticating device 600 receives (or captures) biometric data corresponding to the finger of the user via fingerprint sensor 611.

Figure 6O:
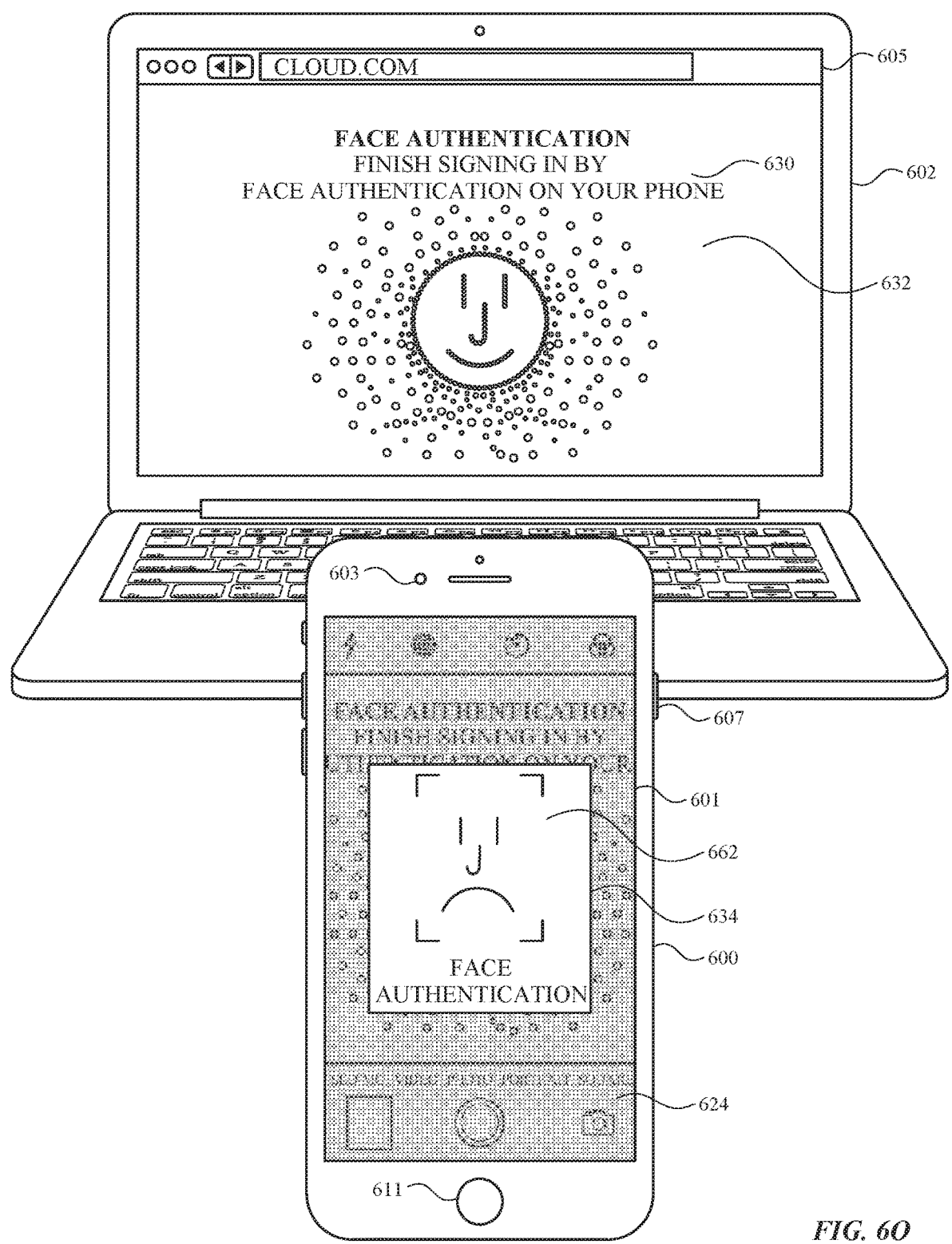

In some examples, instead of successful biometric authentication, as illustrated in FIG. 6I, authenticating device 600 determines that biometric authentication (e.g., via facial recognition sensor 603) has failed, as illustrated in FIG. 6O. In some examples, authenticating device 600 determines that biometric authentication via fingerprint sensor 611 has failed. Determining that biometric authentication has failed includes determining that captured biometric data does not satisfy certain biometric authentication criteria. In some examples, authenticating device 600 displays biometric authentication interface 634 having failed biometric authentication glyph 662 as a result of failed biometric authentication. Failed biometric authentication glyph 662 indicates that has a user has failed to authenticate at authenticating device 600.

Figure 6P:
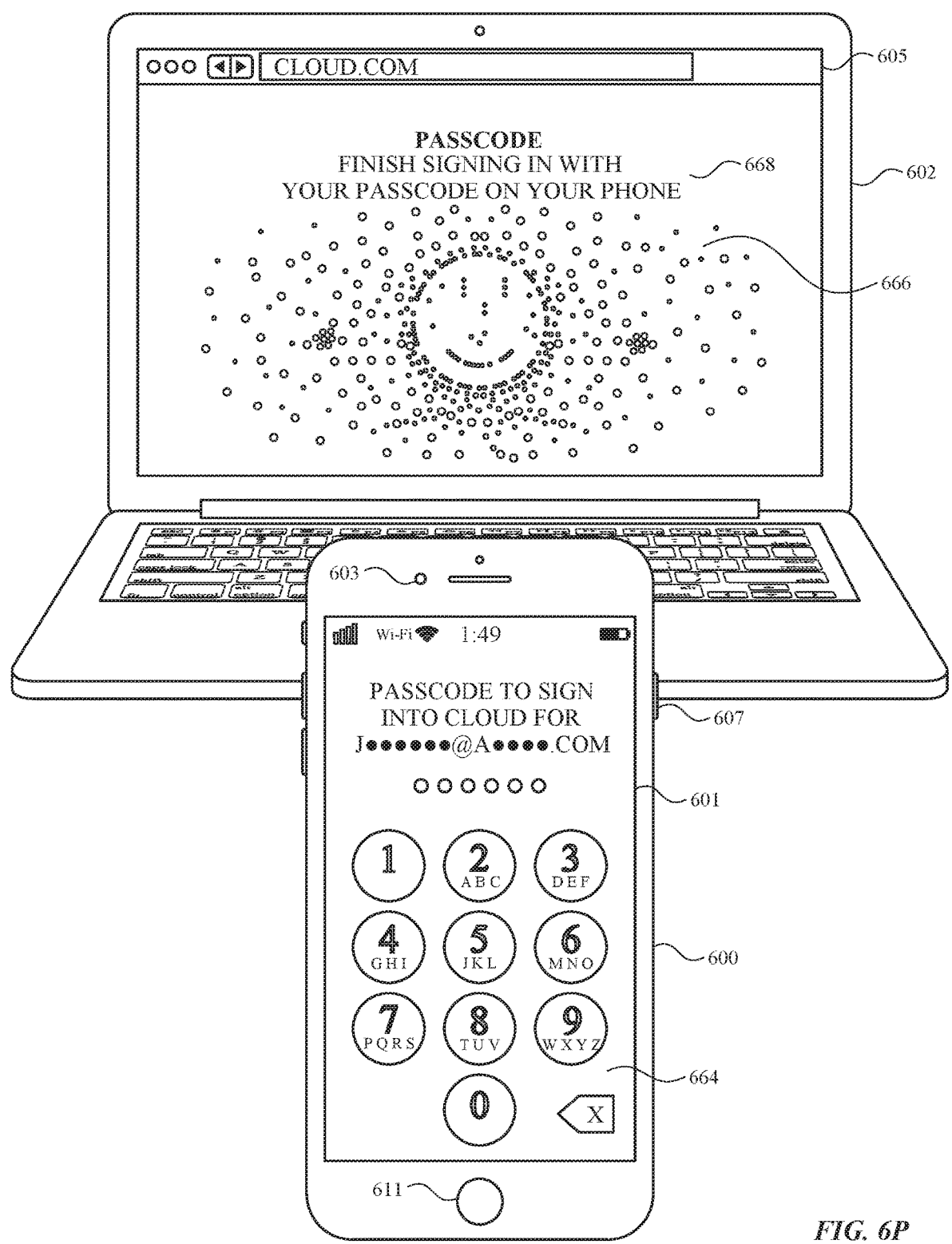

In some examples, as illustrated in FIG. 6P, upon determining that biometric authentication has failed, authenticating device 600 displays alternative authentication interface 664. In some examples, determining that biometric authentication has failed includes determining that biometric authentication is not available at authenticating device 100. For example, biometric authentication can be unavailable due to repeated failed biometric authentication attempts, due to the device having been recently power cycled (e.g., turned off and then turned on again), or due to the device having been in a locked state for a predetermined amount of time. Alternative authentication interface 664 enables a user to authenticate by inputting a passcode (or password) via one or more input devices (e.g., touchscreen of display 601). Further upon determining that biometric authentication has failed, authenticating device 600 transmits data to a remote device (e.g., requesting device 602 or a server in communication with requesting device 602). The data indicates a new type of authentication (e.g., non-biometric authentication) that is available to authenticate the user at authenticating device 600.

Figure 6Q:
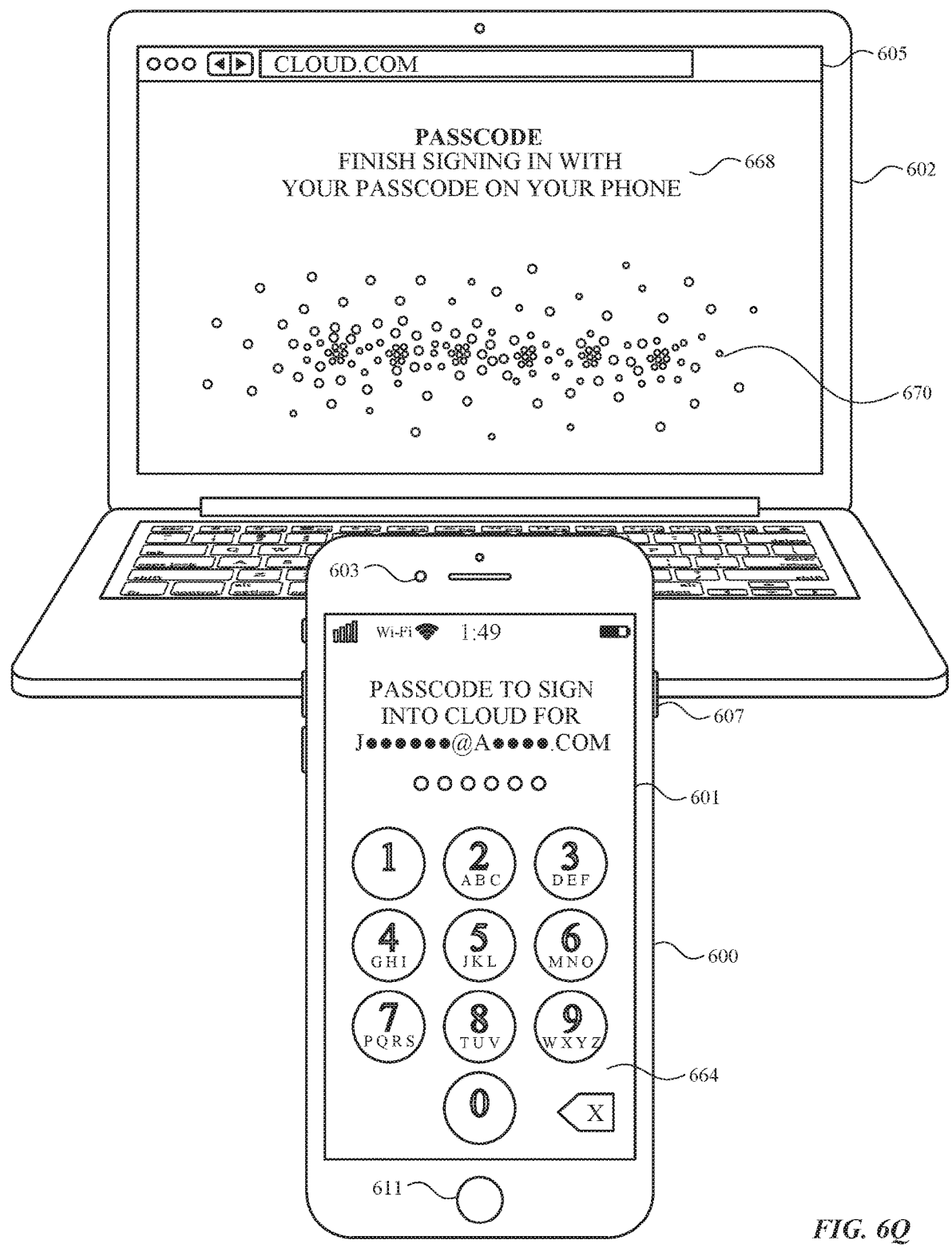

In some examples, upon receiving data indicating the new type of authentication, requesting device 602 displays animation 666 that transitions from displaying icon 632 to a new icon representing passcode (or password) authentication (e.g., icon 670 of FIG. 6Q). The animation includes rearranging the dots that comprise icon 670 into a new configuration. As illustrated in FIG. 6P, the animation has begun, and the dots are being rearranged. Further upon receiving data indicating the new type of authentication, requesting device 602 displays, on display 605, user instruction 668. User instruction 668 includes text that prompts the user to take an action at authenticating device 600. In some examples, requesting device 602 receives the data directly from authenticating device 600. In some examples, requesting device 602 receives the data from a server that is in communication with authenticating device 600.

In some examples, as illustrated in FIG. 6Q, animation 666 has completed at requesting device 602. The dots comprising icon 632 have been rearranged into a new configuration. Requesting device 602 displays, on display 105, the new configuration of dots as icon 670. Icon 670 indicates to the user that the user can authenticate at authenticating device 600 using passcode (or password) authentication.

In some examples, instead of animation 628 transitioning to displaying icon 632 as illustrated in FIGS. 6G-6H, animation 628 transitions to displaying icon 670 as illustrated in FIG. 6Q. At FIG. 6Q, animation 628 has completed at requesting device 602. Similar to FIG. 6H, the dots comprising QR code 620 have been rearranged into a new configuration. Requesting device 602 displays, on display 605, the new configuration of dots as icon 670. Icon 670 indicates to the user that the user can authenticate at authenticating device 600 using passcode (or password) authentication. Similar to FIG. 6G, upon receiving the data about the type of authentication, requesting device 602 displays, on display 605, user instruction 668.

In some examples, instead of facial recognition authentication, as illustrated in FIG. 6H, authenticating device 600 uses passcode (or password) authentication to authenticate the user. Authenticating device 600 displays alternative authentication interface 664 instead of biometric authentication interface 634 of FIG. 6H.

Figure 6R:
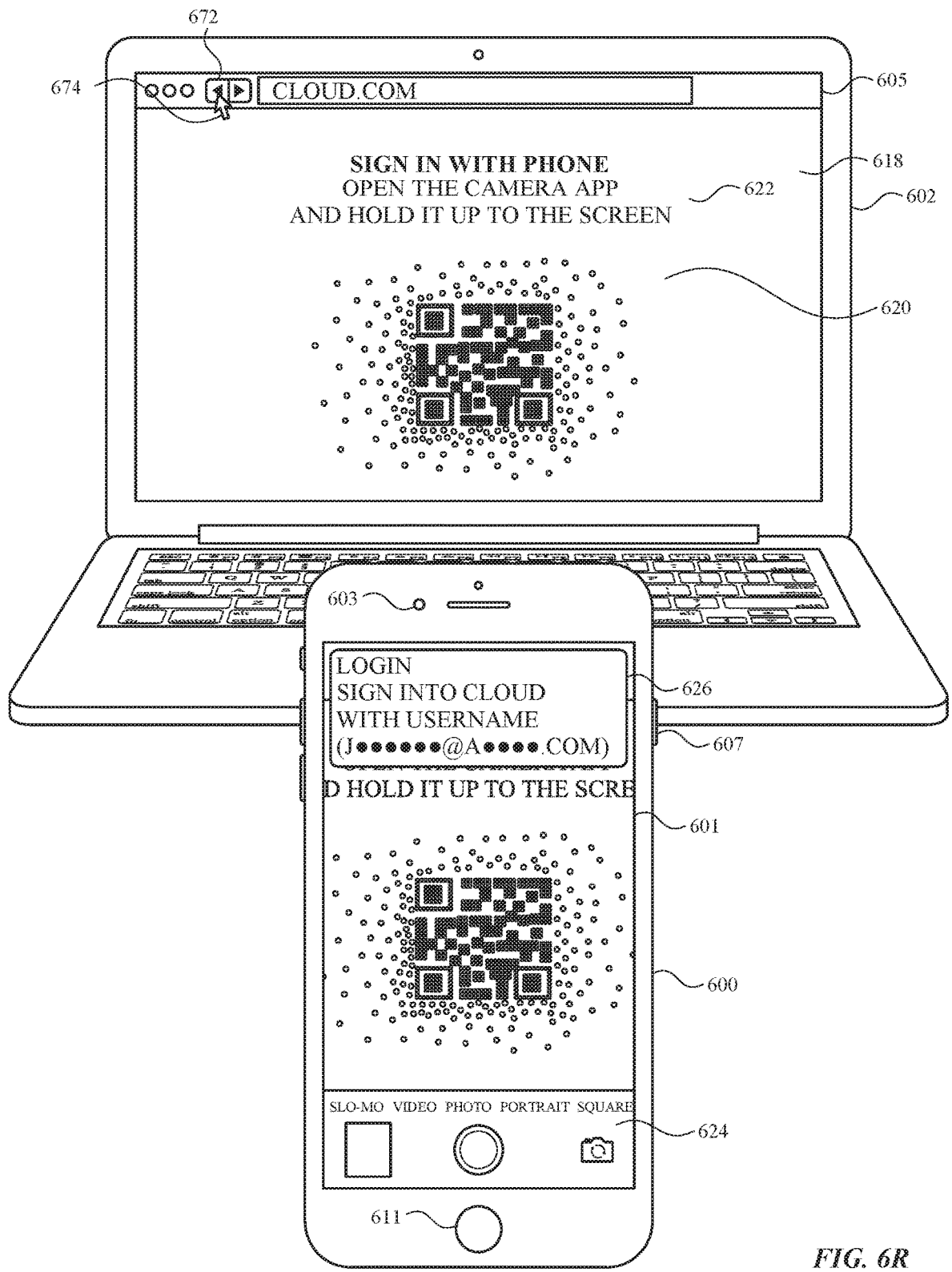
Figure 6S:
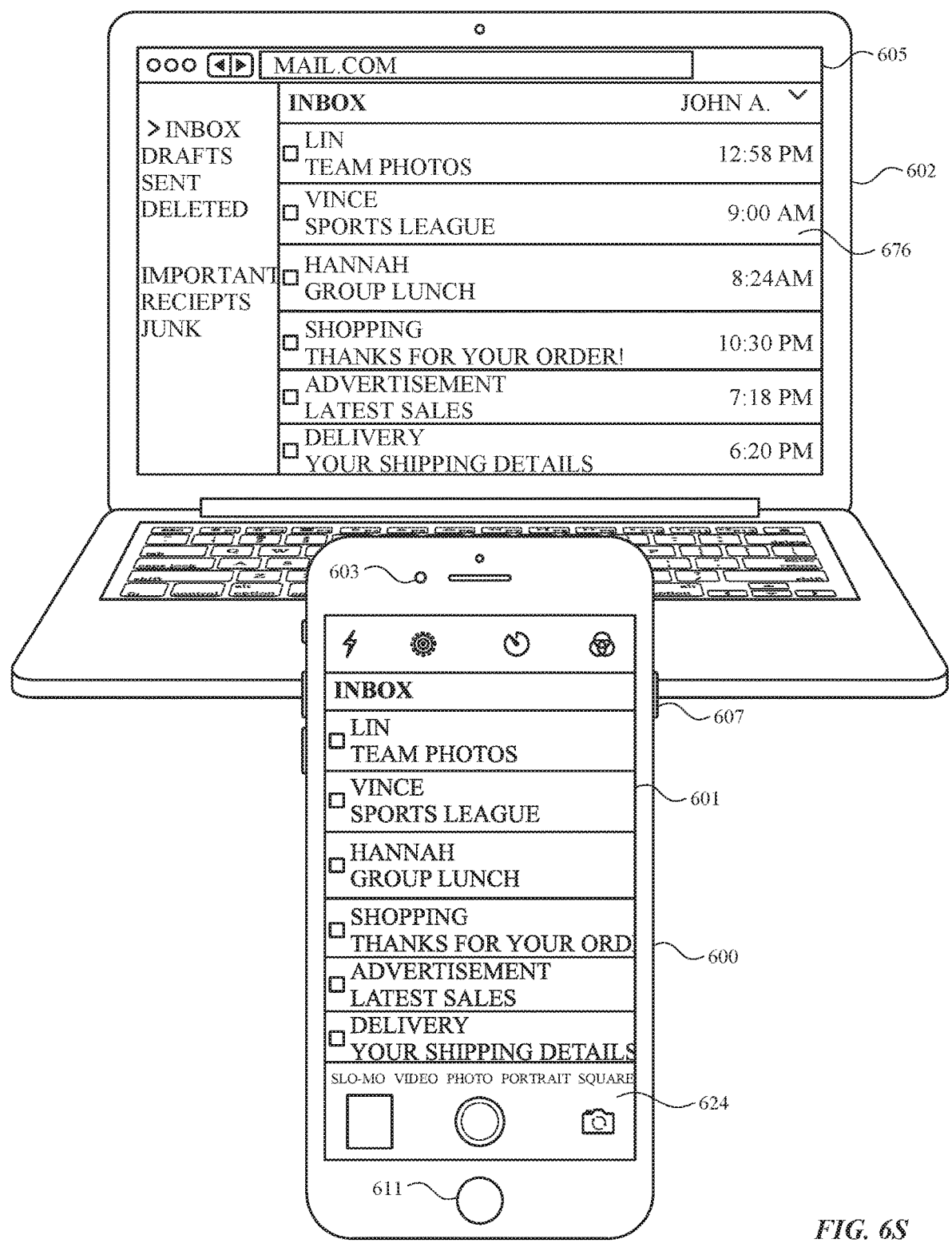

In some examples, similar to FIG. 6E, requesting device 602, displays, on display 605, alternative login webpage 618, as illustrated in FIG. 6R. In some examples, requesting device 602 receives input 674 (e.g., mouse click event) at the location of previous page affordance 674. In some examples, upon receiving input 674 at the location of previous page affordance 672, requesting device 602 transitions to displaying, on display 605, previous webpage 676, as illustrated in FIG. 6S. As a result, requesting device 602 transmits data to a remote device (e.g., authenticating device 600 or a server in communication with authenticating device 600). The data indicates that a user has navigated away from alternative login webpage 618.

Figure 6T:
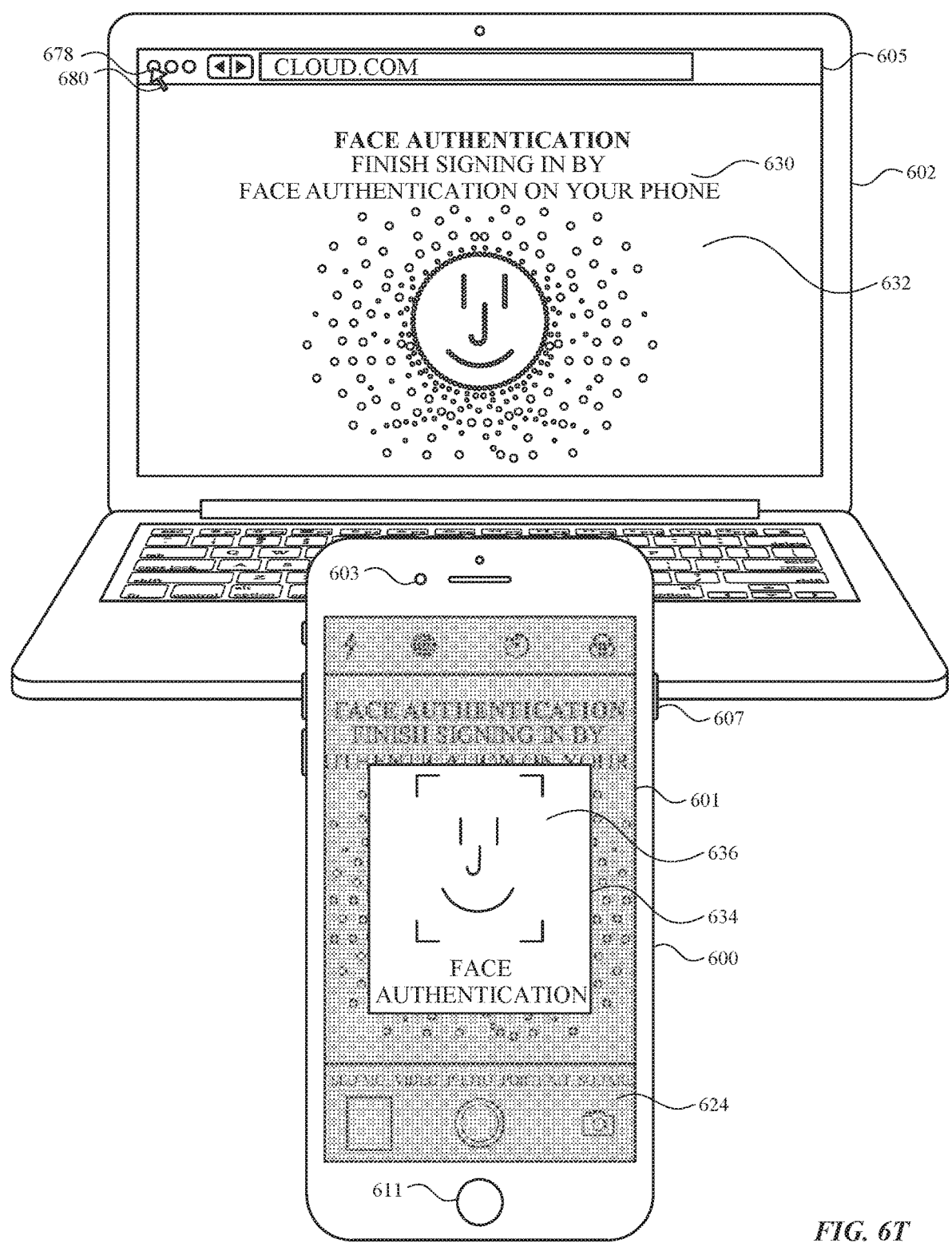

In some examples, similar to FIG. 6E, authenticating device 600 displays, on display 601, banner 626 (e.g., a user interface element), as illustrated in FIG. 6R. In some examples, authenticating device 600, upon receiving data indicating that the user has navigated away from alternative login webpage 618, ceases displaying banner 626, as illustrated in FIG. 6S. By ceasing to display banner 626, authenticating device 600 ceases to provide an option for the user to login to the website via authentication (e.g., biometric or non-biometric authentication) at authenticating device 600. In some examples, authenticating device 600, upon receiving the data indicating that the user has navigated away from alternative login webpage 618, ceases to display biometric authentication interface 634, as illustrated in FIGS. 6T-6U, or biometric authentication interface 660. In some examples, the above techniques illustrated in FIGS. 6R-6S can similarly be performed with respect to fingerprint authentication and passcode (or password) authentication.

In some examples, similar to FIG. 6H, requesting device 602 displays, on display 605, a user interface with icon 632 and/or user instruction 630, as illustrated in FIG. 6T. In some examples, requesting device 602 receives input 680 (e.g., mouse click event) at the location of quit affordance 678. Upon receiving input 680, requesting device 602 ceases to display the web browser (e.g., Safari) and proceeds to display, on display 605, desktop 682, as illustrated in FIG. 6U. As a result, requesting device 602 transmits data indicating that a user has navigated away from the user interface with icon 632 and/or user instruction 630. This user interface is associated with a technique for logging in to a website via authentication at authenticating device 600.

In some examples, upon receiving the data indicating that the user has navigated away from the user interface with icon 632 and/or user instruction 630, authenticating device 600 ceases displaying biometric authentication interface 634, as illustrated in FIG. 6U. Ceasing to display biometric authentication interface 634 includes ceasing to perform biometric authentication (e.g., via facial recognition sensor 603). In some examples, upon receiving the data indicating that the user has navigated away from the user interface with icon 632 and/or user instruction 630, authenticating device 600 ceases to display banner 626, as illustrated in FIGS. 6R-6S. In some examples, the above techniques illustrated in FIGS. 6T-6U can similarly be performed with respect to fingerprint authentication and passcode (or password) authentication.

In some examples, the above techniques for managing secure login with authentication using a visual representation of data (e.g., a unique code) can be used with respect to websites and/or services such as iCloud, Apple Business Manager, and Apple School Manager.

FIG. 7 is a flow diagram illustrating a method for authorizing access to content on a second electronic device (e.g., a requesting device, 602)) using an electronic device (e.g., a first electronic device that authorizes, 600) in accordance with some embodiments. Method 700 is performed at a first electronic device (e.g., 100, 300, 500, 600) with a display, one or more cameras, and one or more input devices. Some operations in method 700 are, optionally, combined, the orders of some operations are, optionally, changed, and some operations are, optionally, omitted.

As described below, method 700 provides an intuitive way for authorizing access to content on a second electronic device (e.g., a requesting device, 602) using an electronic device (e.g., a first electronic device that authorizes, 600). The method reduces the cognitive burden on a user for authorizing access to content, thereby creating a more efficient human-machine interface. For battery-operated computing devices, enabling a user to authorize content faster and more efficiently conserves power and increases the time between battery charges.

The first electronic device (e.g., the authenticating device, 600) detects (702), via a first camera of the one or more cameras, the presence of a visual representation of data (e.g., 620, a QR code, a bar code, or other visual representation of information that identifies the second electronic device (e.g., a requesting device, 602), a server associated with the second electronic device (e.g., a requesting device, 602), a session associated with the second electronic device (e.g., a requesting device, 602)) displayed on a second electronic device (e.g., a requesting device, 602).

In some examples, subsequent to detecting (704), at the first electronic device (e.g., the authenticating device, 600), the presence of the visual representation of data (e.g., 620) that is displayed on the display (e.g., 605) of the second electronic device (e.g., the requesting device, 602), a first prompt (e.g., 632, 630, an image with accompanying text instructing the user to authenticate at the authenticating device via a certain type of authentication) is displayed on the display (e.g., 605) of the second electronic device (e.g., the requesting device, 602). The first prompt (e.g., 632, 630) indicates (706) a first type of authentication (e.g., biometric authentication (e.g., fingerprint or facial recognition, password authentication) available at the first electronic device (e.g., the authenticating device, 600). In some examples, the first prompt is selected from a plurality of different prompts based on the type of authentication available at the first electronic device (e.g., an authenticating device, 600) (e.g., if the first electronic device (e.g., an authenticating device, 600) is enabled to use face authentication, the second electronic device (e.g., a requesting device, 602) displays a visual indication that face authentication is enabled on the first electronic device (e.g., an authenticating device, 600). In some examples, if the first electronic device (e.g., an authenticating device, 600) is enabled to use fingerprint authentication, the second electronic device (e.g., a requesting device, 602) displays a different visual indication (e.g., 656, 658) that fingerprint authentication is enabled on the first electronic device (e.g., an authenticating device, 600). In some examples, if the first electronic device (e.g., an authenticating device, 600) is enabled to use passcode or password authentication, the second electronic device (e.g., a requesting device, 602) displays a visual indication (e.g., 670, 668) that passcode or password authentication is enabled on the first electronic device (e.g., an authenticating device, 600). Providing a prompt on the second electronic device (e.g., a requesting device, 602) (e.g., the device requesting access to content) that indicates the type of authentication available at the first electronic device (e.g., the authenticating device, 600) provides the user with feedback as to the status of both the second electronic device (e.g., a requesting device, 602) (e.g., that it is awaiting authorization before content can be accessed) and the first electronic device (e.g., an authenticating device, 600) (e.g., that is awaiting authorizing inputs of a certain type). Additionally, doing so gives the user further feedback on the next step that is needed to perform the operation (e.g., present a biometric feature (e.g., a face or fingerprint) for biometric authentication on the first electronic device). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first type of authentication is biometric authentication via a facial recognition sensor (e.g., 603, a thermal, optical, and/or depth based facial recognition sensor) and the first prompt (e.g., 632, 630) displayed on the display (e.g., 605) of the second electronic device (e.g., a requesting device, 602) indicates that biometric authentication via the facial recognition sensor is available at the first electronic device (e.g., an authenticating device, 600).

In some examples, the first type of authentication is biometric authentication via a fingerprint sensor (e.g., 611) and the first prompt (e.g., 656, 658) displayed on the display of the second electronic device (e.g., a requesting device, 602) indicates that biometric authentication via the fingerprint sensor is available at the first electronic device (e.g., an authenticating device, 600).

In some examples, the first type of authentication is non-biometric authentication via a character input interface (e.g., 664, a keypad or keyboard that includes character entry keys for entering a password or passcode) and the first prompt (e.g., 670, 668) displayed on the display of the second electronic device (e.g., a requesting device, 602) indicates that non-biometric authentication is available at the first electronic device (e.g., an authenticating device, 600).

In some examples, after the first prompt (e.g., 632, 630, 656, 658, 668, 670) is displayed on the display of the second electronic device (e.g., a requesting device, 602), the first electronic device (e.g., the authenticating device, 600) detects a change in availability of the first type of authentication at the first electronic device (e.g., an authenticating device, 600) (e.g., biometric authentication is locked out so a passcode/password is required after more than a predetermined number of biometric authentication failures or after the device is restarted). In some such examples, in response to detecting the change in availability of the first type of authentication at the first electronic device (e.g., an authenticating device, 600), the first electronic device (e.g., the authenticating device, 600) provides (e.g., to the requesting device, 602 or to a server that is in communication with the requesting device, 602)) information indicating that the first type of authentication is no longer available at the first electronic device (e.g., an authenticating device, 600), which causes the first prompt that is displayed on the display of the second electronic device (e.g., a requesting device, 602) to be replaced with a fourth prompt (e.g., 632, 630, 656, 658, 668, 670) displayed on the display of the second electronic device (e.g., a requesting device, 602). The fourth prompt indicates a second type of authentication available at the first electronic device (e.g., an authenticating device, 600) that is different from the first type of authentication available at the first electronic device (e.g., an authenticating device, 600). Providing a prompt on the second electronic device (e.g., a requesting device, 602) (e.g., the device requesting access to content) that changes based on a change in type of the authentication available at the first electronic device (e.g., the authenticating device, 600) provides the user with feedback as to the status of both the second electronic device (e.g., a requesting device, 602) (e.g., that it is awaiting authorization before content can be accessed) and the first electronic device (e.g., an authenticating device, 600). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, replacing the first prompt that is displayed on the display of the second electronic device (e.g., a requesting device, 602) with the fourth prompt displayed on the display of the second electronic device (e.g., a requesting device, 602) includes animating (e.g., 666) a transition from the first prompt to the fourth prompt. In some examples, the first prompt (e.g., a prompt to provide authentication via a facial recognition sensor) includes a plurality of visual elements (e.g., dots) that are re-arranged to form the fourth prompt (e.g., a prompt to provide authentication via a password entry interface). Animating a transition between prompts displayed on the second device draws the user's attention to the changed authentication requirements on the first electronic device, which improves the user-device interface and reduces the risk of error and user confusion. Improving the user-device interface and reducing error enhances the operability of the device and makes the user-device interface more efficient (e.g., by helping the user to be aware of the state of the device and provide proper input, reducing user mistakes when operating/interacting with the device) which, additionally, reduces power usage and improves battery life of the device by enabling the user to use the device more quickly and efficiently.

In some examples, detecting the presence of the visual representation of data occurs while a camera application is active on the first electronic device (e.g., an authenticating device, 600) and while the camera application is operating in a restricted mode (e.g., a mode wherein one or more functions (e.g., accessing certain media) of the camera application that are available while the camera is operating in a non-restricted mode are not available). In some examples, the QR code is detected via a dedicated camera application of the device. In some examples, the QR code is detected via a dedicated camera application of the device while the device is in a locked state (e.g., while in a restricted camera mode).

The first electronic device (e.g., the authenticating device, 600), in response to detecting the presence of the visual representation of data, prompts (708) (e.g., displaying a visual prompt, a generating a tactile output, an generating an audio output) a user to provide authorization information at the first electronic device (e.g., the authenticating device, 600) for enabling access to content on the second electronic device (e.g., the requesting device, 602); (ISE, further in response to detecting the presence of the visual representation of data (e.g., a QR code), the first electronic device (e.g., the authenticating device, 600) transmits information.) (ISE, the information indicates that the visual representation of data was detected by the first electronic device (e.g., an authenticating device, 600)) (ISE, the information indicates the type of authentication (e.g., biometric authentication, passcode/password entry) available at the first electronic device (e.g., an authenticating device, 600).) (ISE, the first electronic device (e.g., an authenticating device, 600) transmits to a remote device (e.g., a server, the second electronic device (e.g., the requesting device, 602).) In some examples, prompting the user includes displaying a banner (e.g., 626) that prompts the user to login to a service or website. In some examples, in response to selecting the banner via an input device (e.g., tap gesture (e.g., 625) on a touch-sensitive display (e.g., 601)), the first device (e.g., authenticating device, 600) transmits information. In some examples, the information indicates that the visual representation of data was detected by the first electronic device (e.g., an authenticating device, 600). In some examples, the information indicates the type of authentication (e.g., biometric authentication, passcode/password entry) available at the first electronic device (e.g., an authenticating device, 600). In some examples, the information indicates that the first device received input at the banner. In some examples, the information includes data corresponding to and/or associated with an indication. Prompting a user to provide authorization at a first electronic device (e.g., an authenticating device, 600) to enable access to content at a separate, second electronic device (e.g., a requesting device, 602) in response to detecting data on the second electronic device (e.g., a requesting device, 602), enables the user to utilize authorization hardware and software available on the first electronic device (e.g., an authenticating device, 600) (e.g., that may not be available on the second electronic device (e.g., a requesting device, 602) and that can be more secure) for authorization and security functions while utilizing the hardware and software of the second electronic device (e.g., a requesting device, 602) (e.g., that may not be available on the first electronic device (e.g., an authenticating device, 600)) to access the content. Additionally, doing so provides for two-factor authentication with a trusted device (e.g., the first electronic device) and provides the user with clear guidance as to what operations need to be performed to access the content. Expanding hardware and software availability to users and increasing security enhances the operability of the device and makes the user-device interface more efficient (e.g., by providing enhanced capabilities that reduce the burden of interacting with the device) which, additionally, reduces power usage and improves battery life of the device by enabling the user to use the device more quickly and efficiently.

In some examples, the one or more input devices includes a biometric sensor (e.g., a fingerprint sensor (e.g., 611) or facial recognition sensor (e.g., 603)) and a non-biometric input device (e.g., 664, a touch panel, a physical keyboard, or a virtual keyboard). In some such examples, prompting (e.g., a visual prompt, a haptic prompt, an audio prompt) the user to provide authorization information at the first electronic device (e.g., the authenticating device, 600) for enabling access to content on the second electronic device (e.g., the requesting device, 602) includes one or more of the following. In accordance with a determination that biometric authentication is available at the first electronic device (e.g., an authenticating device, 600), generating, at the first electronic device (e.g., an authenticating device, 600), a prompt (e.g., visual output, tactile output, audio output) prompting the user to provide authorization information at the first electronic device (e.g., an authenticating device, 600) via the biometric sensor (e.g., facial recognition sensor or fingerprint sensor). In accordance with a determination that biometric authentication is not available at the first electronic device (e.g., due to repeated failures, power cycling the device, the device having been locked for more than a predetermined period of time), generating, at the first electronic device (e.g., an authenticating device, 600), a prompt (e.g., visual output, tactile output, audio output) prompting the user to provide authorization information at the first electronic device (e.g., an authenticating device, 600) via the non-biometric input device. Prompting the user to provide authorization via a biometric sensor (e.g., facial recognition sensor or fingerprint sensor) when biometric authentication is available and prompting the user to provide authorization via a non-biometric input device when biometric authentication is not available provides the user with the capability to authenticate via the typically more secure and convenient (e.g., requiring less inputs) biometric option when it is available and an alternative option when the biometric option is not available. Additionally, doing so provides the user with feedback as to the state of the device. Improving security, reducing the number of inputs needed to perform and operation, and providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, further in accordance with the determination that biometric authentication is available at the first electronic device (e.g., an authenticating device, 600), a second prompt is displayed on the display of the second electronic device (e.g., a requesting device, 602) that prompts the user to provide authorization information at the first electronic device (e.g., an authenticating device, 600) via the biometric sensor (e.g., facial recognition sensor or fingerprint sensor). In some such examples, further in accordance with the determination that biometric authentication is not available at the first electronic device (e.g., an authenticating device, 600), a third prompt (e.g., 668, 670) is displayed on the display (e.g., 605) of the second electronic device (e.g., a requesting device, 602) that prompts the user to provide authorization information at the first electronic device (e.g., an authenticating device, 600) via the non-biometric input device. Providing a prompt on the second electronic device (e.g., a requesting device, 602) (e.g., the device requesting access to content) that is based on the type of authentication available at the first electronic device (e.g., the authenticating device, 600) provides the user with feedback as to the status of both the second electronic device (e.g., a requesting device, 602) (e.g., that it is awaiting authorization before content can be accessed) and the first electronic device (e.g., an authenticating device, 600) (e.g., that is awaiting authorizing inputs of a certain type). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The first electronic device (e.g., the authenticating device, 600), after prompting the user to provide the authorization information, receives (710) a set of one or more inputs.

In some examples, the one or more input devices includes a physical input mechanism (e.g., 607, a hardware (e.g., non-virtual, e.g., physical) button) and the set of one or more inputs includes one or more inputs received via the physical input mechanism (e.g., one or more presses of the hardware button). In some examples, the one or more presses initiate biometric authentication (e.g., authentication via a facial recognition sensor (e.g., 603)). Authorizing access to content based on inputs that include inputs via physical input mechanism (e.g., a button) improves security by utilizing a more explicit input, which can be useful if one or more inputs of the sets of inputs includes a less explicit input (e.g., inputs receiving via facial recognition sensor) that may not have been intentionally provided by the user, thereby enhancing security by avoiding unintentional authorization inputs. Enhancing security enhances the operability of the device and makes the user-device interface more efficient (e.g., by reducing the occurrence of unauthorized input) which, additionally, reduces power usage and improves battery life of the device by enabling the user to use the device more quickly and efficiently.

In some examples, the one or more input devices includes a biometric sensor (e.g., facial recognition sensor (e.g., 603) or fingerprint sensor (e.g., 611)) and the set of one or more inputs further includes an input (e.g., presenting a biometric feature (e.g., face) for biometric authentication) received via the biometric sensor (e.g., facial recognition sensor or fingerprint sensor). In some examples, prompting the user to provide authorization information at the first electronic device (e.g., an authenticating device, 600) includes prompting the user to provide authorization information via the biometric sensor (e.g., facial recognition sensor or fingerprint sensor).

The first electronic device (e.g., the authenticating device, 600), in response to receiving (712) the set of one or more inputs and in accordance with a determination that the set of one or more inputs includes authorization information that matches stored authorization information, transmits (714) information (e.g., transmitting the information to the second electronic device (e.g., a requesting device, 602) or to a server associated with the second electronic device (e.g., a requesting device, 602)) authorizing access to the content (e.g., 644) on the second electronic device (e.g., the requesting device, 602). Transmitting information authorizing content (e.g., 655) at the second electronic device (e.g., a requesting device, 602) based on a set of inputs at the first electronic device (e.g., an authenticating device, 600) matching authorization information enables the user to utilize the hardware and software of the first electronic device (e.g., an authenticating device, 600) for providing authorization and security functions while utilizing the hardware and software of the second electronic device (e.g., a requesting device, 602) (e.g., that may not be available on the first electronic device (e.g., an authenticating device, 600)) to access the content. Additionally, doing so avoids the need to store the authorization information on the second electronic device (e.g., a requesting device, 602) (which may be less secure than the first electronic device (e.g., an authenticating device, 600)). Expanding hardware and software availability to users and increasing security the operability of the device and makes the user-device interface more efficient (e.g., by providing enhanced capabilities that reduce the burden of interacting with the device) which, additionally, reduces power usage and improves battery life of the device by enabling the user to use the device more quickly and efficiently.

The first electronic device (e.g., the authenticating device, 600), in response to receiving the set of one or more inputs and in accordance with a determination that the set of one or more inputs does not include authorization information that matches stored authorization information, forgoes transmitting (716) information authorizing access to the content on the second electronic device (e.g., the requesting device, 602).

In some examples, prior to detecting the presence of a visual representation of data, the first electronic device (e.g., the authenticating device, 600) displays, on the display, a preview of image data captured via the one or more cameras. In some such examples, prompting the user to provide authorization information at the first electronic device (e.g., an authenticating device, 600) includes visually obscuring (e.g., blurring, darkening, desaturating, reducing contrast) at least a portion of the preview of image data (e.g., 624). Visually obscuring at least a portion of the preview of image data from the camera when prompting the user to provide authorization at the first electronic device (e.g., the authenticating device, 600) in response to detecting the presence of the visual representation of data provides the user with additional feedback about what the electronic device has detected via its one or more cameras and draws the user's attention to the prompt. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first electronic device (e.g., the authenticating device, 600) receives an indication that the visual representation of data has ceased to display on the second electronic device (e.g., a requesting device, 602) (e.g., closing web browser (e.g., 680), closing web browser window, closing application, navigating back in the application (e.g., 674), navigating to a new page). In some such examples, in response to receiving the indication, the first electronic device (e.g., the authenticating device, 600) ceases prompting the user to provide authorization information at the first electronic device (e.g., an authenticating device, 600). In some such examples, the authenticating device ceases to display a banner (e.g., 626) that prompts the user to authenticate. In some such examples, the authenticating device ceases to display a prompt (e.g., 634, 636) that prompts the user to authenticate via a specific type of authentication.) Ceasing to prompt the user (at the first electronic device, e.g., the authenticating device, 600) to provide authorization at the first electronic device (e.g., an authenticating device, 600) when the visual representation of data is no longer displayed on the second electronic device (e.g., the requesting device, 602) provides the user with feedback as to the status of both the second electronic device (e.g., a requesting device, 602) (e.g., that it is no longer attempting to access the content requiring authorization) and the first electronic device (e.g., an authenticating device, 600) (e.g., that it is no awaiting authorizing inputs of a certain type). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7) are also applicable in an analogous manner to the methods described below/above. For example, method 800 optionally includes one or more of the characteristics of the various methods described above with reference to method 700. For example, the second electronic device (an authenticating device, 600) of method 800 can be the first electronic device (e.g., an authenticating device, 600) of method 700. For another example, the first electronic device (e.g., a requesting device, 602) of method 800 can be the second electronic device (e.g., a requesting device, 602) of method 700. For brevity, these details are not repeated below.

FIG. 8 is a flow diagram illustrating a method for authorizing access to content on an electronic device (e.g., a first electronic device that is a requesting device, 602) using a second electronic device (e.g., an authorizing device) in accordance with some embodiments. Method 800 is performed at a first electronic device (e.g., 100, 300, 500) with a display. Some operations in method 800 are, optionally, combined, the orders of some operations are, optionally, changed, and some operations are, optionally, omitted.

As described below, method 800 provides an intuitive way for authorizing access to content on an electronic device (e.g., a first electronic device that is a requesting device, 602) using a second electronic device (e.g., an authorizing device). The method reduces the cognitive burden on a user for authorizing access to content, thereby creating a more efficient human-machine interface. For battery-operated computing devices, enabling a user to authorize content faster and more efficiently conserves power and increases the time between battery charges.

The first electronic device (e.g., the requesting device, 602) displays (802), on the display of the first electronic device (e.g., the requesting device, 602), a visual representation of data (e.g., 620).

In some examples, the visual representation of data (e.g., 620) is a two-dimensional computer readable pattern (e.g., a QR code, a non-textual code that encodes data along two dimensions (e.g., two dimensions that are orthogonal to one another)).

In some examples, the visual representation of data includes one or more of: a uniform resource locator (URL), a session identifier (ID), and a secret key.

The first electronic device (e.g., the requesting device, 602) receives (804) first information that the visual representation of data (e.g., a QR code, a bar code, or other visual representation of information that identifies the second electronic device (e.g., an authenticating device, 600), a server associated with the second electronic device (e.g., an authenticating device, 600), a session associated with the second electronic device (e.g., an authenticating device, 600)) has been detected by a second electronic device (e.g., an authenticating device, 600).

In some examples, the first information indicates (806) a first type of authentication available at the second electronic device (e.g., an authenticating device, 600). In some such examples, the first type of authentication is biometric authentication via a facial recognition sensor (e.g., 603). In some such examples, the first type of authentication is biometric authentication via a fingerprint sensor (e.g., 611). In some such examples, the first type of authentication is non-biometric authentication (e.g., a passcode, password, or pattern input via a character input interface (e.g., 664) or touch-sensitive surface (e.g., 601)).

In some examples, after displaying, on the display (e.g., 605) of the first electronic device (e.g., a requesting device, 602), the first prompt (e.g., 632, 630, 656, 658, 668, 670) and after a change in availability of the first type of authentication at the second electronic device (e.g., an authenticating device, 600) (e.g., biometric authentication is locked out so a passcode/password or gesture is required), the first electronic device (e.g., the requesting device, 602) replaces the first prompt that is displayed on the display of the first electronic device (e.g., a requesting device, 602) (e.g., the prompt for biometric authentication) with a second prompt (e.g., 632, 630, 656, 658, 668, 670) displayed on the display (e.g., 605) of the first electronic device (e.g., a requesting device, 602) (e.g., the prompt for passcode/password or gesture authentication). In some such examples, the second prompt indicates a fourth type of authentication available at the second electronic device (e.g., an authenticating device, 600) that is different from the first type of authentication available at the second electronic device (e.g., an authenticating device, 600). Providing a prompt on the first electronic device (e.g., a requesting device, 602) (e.g., the device requesting access to content) that updates based on a change in type of the authentication available at the second electronic device (e.g., the authenticating device, 600) provides the user with feedback as to the status of both the first electronic device (e.g., a requesting device, 602) (e.g., that it is awaiting authorization before content can be accessed) and the second electronic device (e.g., an authenticating device, 600). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, replacing the first prompt that is displayed on the display of the first electronic device (e.g., a requesting device, 602) with a second prompt displayed on the display of the first electronic device (e.g., a requesting device, 602) includes the first electronic device (e.g., the requesting device, 602) animating a transition (e.g., 666) from the first prompt to the second prompt. In some examples, the first prompt (e.g., a prompt to provide authentication via a facial recognition sensor) includes a plurality of visual elements (e.g., dots) that are re-arranged to form the second prompt (e.g., a prompt to provide authentication via a password entry interface). Animating a transition between prompts displayed on the first device draws the user's attention to the changed authentication requirements on the first electronic device, which improves the user-device interface and reduces the risk of error and user confusion. Improving the user-device interface and reducing error enhances the operability of the device and makes the user-device interface more efficient (e.g., by helping the user to be more aware of the state of the device and provide proper inputs, while also reducing user mistakes when operating/interacting with the device) which, additionally, reduces power usage and improves battery life of the device by enabling the user to use the device more quickly and efficiently.

The first electronic device (e.g., the requesting device, 602), in response to receiving the first information (e.g., information that includes the type of authentication that is available at the authenticating device, 600), displays (808), on the display of the first electronic device (e.g., the requesting device, 602), a first prompt (e.g., 632, 630, 656, 658, 668, 670, an image with accompanying text instructing the user to authenticate at the authenticating device via a certain type of authentication) prompting a user to provide authentication information at the second electronic device (e.g., an authenticating device, 600) for enabling access to restricted content on the first electronic device (e.g., the requesting device, 602). Displaying a prompt, at the first electronic device (e.g., the requesting device, 602) to provide authentication at a second electronic device (e.g., the authenticating device, 600) in response to that second electronic device (e.g., an authenticating device, 600) detecting the visual representation of data displayed at the first electronic device (e.g., the requesting device, 602) provides the user with feedback as to the status of both the first electronic device (e.g., a requesting device, 602) (e.g., that it has received an indication of activity the second electronic device (e.g., an authenticating device, 600)) and the second electronic device (e.g., an authenticating device, 600) (e.g., that is awaiting authorizing inputs). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, displaying, on the display (e.g., 605) of the first electronic device (e.g., the requesting device, 602), the first prompt includes one or more of the following. In accordance with a determination that the first information indicates that a second type of authentication (e.g., authentication via a facial recognition sensor (e.g., 603), a fingerprint sensor (e.g., 611), or passcode/password entry via a character input interface (e.g., 664)) is available at the second electronic device (e.g., the authenticating device, 600), the first electronic device (e.g., the requesting device, 602) displays, on the display of the first electronic device (e.g., a requesting device, 602), a first type of prompt (e.g., an image with accompanying text instructing the user to authenticate at the second electronic device (e.g., authenticating device, 600) via a certain type of authentication). In accordance with a determination that the first information indicates that a third type of authentication is available at the second electronic device (e.g., an authenticating device, 600), the first electronic device (e.g., the requesting device, 602) displays, on the display of the first electronic device (e.g., a requesting device, 602), a second type of prompt. Providing a prompt on that varies based on the type of authentication available at the second electronic device (e.g., an authenticating device, 600) provides the user with feedback as to state of the second electronic device (e.g., an authenticating device, 600) (e.g., what input devices are available for authorization at the second electronic device (e.g., an authenticating device, 600) and that the second electronic device (e.g., an authenticating device, 600) is awaiting authorization inputs). Additionally, doing so gives the user guidance as to how to proceed with performing the operation (e.g., accessing the content). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some such examples, the second type of authentication is different from the third type of authentication. In some such examples, the first type of prompt is different from the second type of prompt.

In some examples, the first type of prompt indicates the second type of authentication available at the second electronic device (e.g., the authenticating device, 600). In some such examples, the second type of prompt indicates the third type of authentication available at the second electronic device (e.g., the authenticating device, 600). Providing a prompt on that indicates the type of authentication available at the second electronic device (e.g., an authenticating device, 600) provides the user with feedback as to state of the second electronic device (e.g., an authenticating device, 600) (e.g., what input devices are available for authorization at the second electronic device (e.g., an authenticating device, 600) and that the second electronic device (e.g., an authenticating device, 600) is awaiting authorization inputs). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the restricted content (e.g., 655) includes content stored remotely (e.g., content not stored at the first electronic device (e.g., a requesting device, 602)).

In some examples, the restricted content includes a webpage that requires authentication to access the webpage.

The first electronic device (e.g., the requesting device, 602), receives (810) second information (e.g., receiving information from a second electronic device (e.g., an authenticating device, 600) or a server associated with the second electronic device (e.g., an authenticating device, 600)) authorizing access to the restricted content on the first electronic device (e.g., the requesting device, 602).

In some examples, the second information includes authentication information input (e.g., via character entry keys) at the first electronic device (e.g., the requesting device, 602). In some such examples, the second information includes data (e.g., received from the second electronic device (e.g., authenticating device, 600) or a device in communication with the second electronic device (e.g., an authentication server) indicating that successful authentication at the second electronic device (e.g., an authenticating device, 600) has occurred. In some such examples, the second information is a set of information that includes the data indicating successful authentication at the authenticating device in addition to a passcode/password inputted via character entry keys at the first electronic device (e.g., requesting device, 602) for the purpose of completing two-factor authentication. In some such examples, the authentication information corresponds to a plurality of characters (e.g., 646) displayed on a display of a third device and the third device is associated with a user account of the user. In some such examples, The third device is selected from the group consisting of: the first electronic device (e.g., a requesting device, 602), the second electronic device (e.g., an authenticating device, 600), and a device that is different from the first and second electronic devices.

The first electronic device (e.g., the requesting device, 602), in response to receiving the second information, provides (812) access to the restricted content on the first electronic device (e.g., a requesting device, 602).

In some examples, prior to displaying, on the display of the first electronic device (e.g., the requesting device, 602), the visual representation of data, the first electronic device displays, on the display of the first electronic device (e.g., the requesting device, 602), a user interface (e.g., 606) including first affordance (e.g., 614) for accessing content via the visual representation of data. The first electronic device also receives, at an input device of the first electronic device (e.g., the requesting device, 602), a user input (e.g., 612) corresponding to selection of the first affordance. In some such examples, the visual representation of data is displayed in response receiving the user input. In some such examples, the user interface includes one or more fillable fields (e.g., 608, 610) for inputting credentials (e.g., fillable via character entry keys).

In some examples, access to the restricted data is granted when the electronic device receives, via the one or more fillable fields, credential information that satisfies authorization criteria. In some such examples, while displaying, on the display of the first electronic device (e.g., the requesting device, 602), the visual representation of data, the first electronic device concurrently displays, on the display of the first electronic device (e.g., the requesting device, 602), a second affordance for navigating to the user interface that includes the first affordance. In some such examples, in response to receiving a user input corresponding to selection of the second affordance, the first electronic device (e.g., a requesting device, 602) ceases to display the visual representation of data and displays the user interface (e.g., 606) that includes the first affordance. Displaying an affordance for accessing a user interface for providing alternative means of authentication gives additional input options to the user and provides an indication of the steps that the user can take to perform the operation if the second electronic device (e.g., the authenticating device, 600) is not available to the user. Providing the user with alternative authorization means enhances the operability of the device and makes the user-device interface more efficient (e.g., by helping the user to provide proper inputs and reducing user mistakes and frustration when operating/interacting with the device) which, additionally, reduces power usage and improves battery life of the device by enabling the user to use the device more quickly and efficiently.

In some examples, in response to receiving the first information, the first electronic device (e.g., the requesting device, 602) replaces the visual representation of data that is displayed on the display of the first electronic device (e.g., the requesting device, 602) with the first prompt that is displayed on the display of the first electronic device (e.g., the requesting device, 602), wherein replacing the visual representation of data with the first prompt includes displaying an animated transition (e.g., 628) from the visual representation of data to the first prompt. In some such examples, the visual representation of data (e.g., a QR code) includes a plurality of visual elements (e.g., dots) that are re-arranged to form the first prompt (e.g., a prompt to provide authentication via a facial recognition sensor). Animating a transition between the visual representation of data and the prompt displayed on the first electronic device (e.g., requesting device, 602) draws the user's attention to the changed authentication requirements on the first electronic device, which improves the user-device interface and reduces the risk of error and user confusion. Improving the user-device interface and reducing error enhances the operability of the device and makes the user-device interface more efficient (e.g., by helping the user to be aware of the changing state of the device and to provide proper inputs, thereby reducing user mistakes when operating/interacting with the device) which, additionally, reduces power usage and improves battery life of the device by enabling the user to use the device more quickly and efficiently.

Note that details of the processes described above with respect to method 800 (e.g., FIG. 8) are also applicable in an analogous manner to the methods described above. For example, method 700 optionally includes one or more of the characteristics of the various methods described above with reference to method 800. For example, second electronic device (e.g., a requesting device, 602) of method 700 can be the first electronic device (e.g., a requesting device, 602) of method 800. For example, first electronic device (e.g., an authenticating device, 600) of method 700 can be the second electronic device (e.g., an authenticating device, 600) of method 800. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A first electronic device, comprising:
a display;
one or more cameras;
one or more input devices one or more processors; and
memory storing one or more programs configured to be executed by the one or more processors, the one or more programs including instructions for:
    detecting, via a first camera of the one or more cameras, the presence of a visual representation of data displayed on a second electronic device;
    in response to detecting the presence of the visual representation of data, prompting a user to provide authorization information at the first electronic device for enabling access to content on the second electronic device;
    after prompting the user to provide the authorization information, receiving a set of one or more inputs; and
    in response to receiving the set of one or more inputs:
        in accordance with a determination that the set of one or more inputs includes authorization information that matches stored authorization information, transmitting information authorizing access to the content on the second electronic device; and
        in accordance with a determination that the set of one or more inputs does not include authorization information that matches stored authorization information, forgoing transmitting information authorizing access to the content on the second electronic device.

2. The first electronic device of claim 1, wherein:
subsequent to detecting, at the first electronic device, the presence of the visual representation of data that is displayed on the display of the second electronic device, a first prompt is displayed on the display of the second electronic device, and
the first prompt indicates a first type of authentication available at the first electronic device.

3. The first electronic device of claim 2, wherein the first type of authentication is biometric authentication via a facial recognition sensor and the first prompt displayed on the display of the second electronic device indicates that biometric authentication via the facial recognition sensor is available at the first electronic device.

4. The first electronic device of claim 2, wherein the first type of authentication is biometric authentication via a fingerprint sensor and the first prompt displayed on the display of the second electronic device indicates that biometric authentication via the fingerprint sensor is available at the first electronic device.

5. The first electronic device of claim 2, wherein the first type of authentication is non-biometric authentication via a character input interface and the first prompt displayed on the display of the second electronic device indicates that non-biometric authentication is available at the first electronic device.

6. The first electronic device of claim 1, wherein:
the one or more input devices includes a biometric sensor and a non-biometric input device; and
prompting the user to provide authorization information at the first electronic device for enabling access to content on the second electronic device includes:
    in accordance with a determination that biometric authentication is available at the first electronic device, generating, at the first electronic device, a prompt prompting the user to provide authorization information at the first electronic device via the biometric sensor; and
    in accordance with a determination that biometric authentication is not available at the first electronic device, generating, at the first electronic device, a prompt prompting the user to provide authorization information at the first electronic device via the non-biometric input device.

7. The first electronic device of claim 6, wherein:
further in accordance with the determination that biometric authentication is available at the first electronic device, a second prompt displayed on the display of the second electronic device prompts the user to provide authorization information at the first electronic device via the biometric sensor; and further in accordance with the determination that biometric authentication is not available at the first electronic device, a third prompt displayed on the display of the second electronic device prompts the user to provide authorization information at the first electronic device via the non-biometric input device.

8. The first electronic device of claim 2, the one or more programs further including instructions for:

after the first prompt is displayed on the display of the second electronic device, detecting a change in availability of the first type of authentication at the first electronic device, and in response to detecting the change in availability of the first type of authentication at the first electronic device, providing information indicating that the first type of authentication is no longer available at the first electronic device which causes the first prompt that is displayed on the display of the second electronic device to be replaced with a fourth prompt displayed on the display of the second electronic device, wherein the fourth prompt indicates a second type of authentication available at the first electronic device that is different from the first type of authentication available at the first electronic device.

9. The first electronic device of claim 8, wherein replacing the first prompt that is displayed on the display of the second electronic device with a fourth prompt displayed on the display of the second electronic device includes animating a transition from the first prompt to the fourth prompt.

10. The first electronic device of claim 1, wherein the one or more input devices includes a physical input mechanism and wherein the set of one or more inputs includes one or more inputs received via the physical input mechanism.

11. The first electronic device of claim 1, wherein the one or more input devices includes a biometric sensor and wherein the set of one or more inputs further includes an input received via the biometric sensor.

12. The first electronic device of claim 11, wherein prompting the user to provide authorization information at the first electronic device includes prompting the user to provide authorization information via the biometric sensor.

13. The first electronic device of claim 1, wherein detecting the presence of the visual representation of data occurs while a camera application is active on the first electronic device and while the camera application is operating in a restricted mode.

14. The first electronic device of claim 1, the one or more programs further including instructions for:

prior to detecting the presence of a visual representation of data, displaying, on the display, a preview of image data captured via the one or more cameras, wherein prompting the user to provide authorization information at the first electronic device includes visually obscuring at least a portion of the preview of image data.

15. The first electronic device of claim 1, the one or more programs further including instructions for:

receiving an indication that the visual representation of data has ceased to display on the second electronic device; and in response to receiving the indication, ceasing prompting the user to provide authorization information at the first electronic device.

16. A non-transitory computer-readable storage medium storing one or more programs configured to be executed by one or more processors of a first electronic device with a display, one or more cameras, and one or more input devices, the one or more programs including instructions for:

detecting, via a first camera of the one or more cameras, the presence of a visual representation of data displayed on a second electronic device;

in response to detecting the presence of the visual representation of data, prompting a user to provide authorization information at the first electronic device for enabling access to content on the second electronic device;

after prompting the user to provide the authorization information, receiving a set of one or more inputs; and in response to receiving the set of one or more inputs:

in accordance with a determination that the set of one or more inputs includes authorization information that matches stored authorization information, transmitting information authorizing access to the content on the second electronic device; and in accordance with a determination that the set of one or more inputs does not include authorization information that matches stored authorization information, forgoing transmitting information authorizing access to the content on the second electronic device.

17. A method, comprising:

at a first electronic device with a display, one or more cameras, and one or more input devices:

detecting, via a first camera of the one or more cameras, the presence of a visual representation of data displayed on a second electronic device;

in response to detecting the presence of the visual representation of data, prompting a user to provide authorization information at the first electronic device for enabling access to content on the second electronic device;

after prompting the user to provide the authorization information, receiving a set of one or more inputs; and in response to receiving the set of one or more inputs:

in accordance with a determination that the set of one or more inputs includes authorization information that matches stored authorization information, transmitting information authorizing access to the content on the second electronic device; and in accordance with a determination that the set of one or more inputs does not include authorization information that matches stored authorization information, forgoing transmitting information authorizing access to the content on the second electronic device.

18. The non-transitory computer-readable storage medium of claim 16, wherein:

subsequent to detecting, at the first electronic device, the presence of the visual representation of data that is displayed on the display of the second electronic device, a first prompt is displayed on the display of the second electronic device, and the first prompt indicates a first type of authentication available at the first electronic device.

19. The non-transitory computer-readable storage medium of claim 18, wherein the first type of authentication is biometric authentication via a facial recognition sensor and the first prompt displayed on the display of the second electronic device indicates that biometric authentication via the facial recognition sensor is available at the first electronic device.

20. The non-transitory computer-readable storage medium of claim 18, wherein the first type of authentication is biometric authentication via a fingerprint sensor and the first prompt displayed on the display of the second electronic device indicates that biometric authentication via the fingerprint sensor is available at the first electronic device.

21. The non-transitory computer-readable storage medium of claim 18, wherein the first type of authentication is non-biometric authentication via a character input interface and the first prompt displayed on the display of the second electronic device indicates that non-biometric authentication is available at the first electronic device.

22. The non-transitory computer-readable storage medium of claim 16, wherein:
the one or more input devices includes a biometric sensor and a non-biometric input device; and
prompting the user to provide authorization information at the first electronic device for enabling access to content on the second electronic device includes:
in accordance with a determination that biometric authentication is available at the first electronic device, generating, at the first electronic device, a prompt prompting the user to provide authorization information at the first electronic device via the biometric sensor; and
in accordance with a determination that biometric authentication is not available at the first electronic device, generating, at the first electronic device, a prompt prompting the user to provide authorization information at the first electronic device via the non-biometric input device.

23. The non-transitory computer-readable storage medium of claim 22, wherein:
further in accordance with the determination that biometric authentication is available at the first electronic device, a second prompt displayed on the display of the second electronic device prompts the user to provide authorization information at the first electronic device via the biometric sensor; and
further in accordance with the determination that biometric authentication is not available at the first electronic device, a third prompt displayed on the display of the second electronic device prompts the user to provide authorization information at the first electronic device via the non-biometric input device.

24. The non-transitory computer-readable storage medium of claim 18, the one or more programs further including instructions for:
after the first prompt is displayed on the display of the second electronic device, detecting a change in availability of the first type of authentication at the first electronic device, and
in response to detecting the change in availability of the first type of authentication at the first electronic device, providing information indicating that the first type of authentication is no longer available at the first electronic device which causes the first prompt that is displayed on the display of the second electronic device to be replaced with a fourth prompt displayed on the display of the second electronic device, wherein the fourth prompt indicates a second type of authentication available at the first electronic device that is different from the first type of authentication available at the first electronic device.

25. The non-transitory computer-readable storage medium of claim 24, wherein replacing the first prompt that is displayed on the display of the second electronic device with a fourth prompt displayed on the display of the second electronic device includes animating a transition from the first prompt to the fourth prompt.

26. The non-transitory computer-readable storage medium of claim 16, wherein the one or more input devices includes a physical input mechanism and wherein the set of one or more inputs includes one or more inputs received via the physical input mechanism.

27. The non-transitory computer-readable storage medium of claim 16, wherein the one or more input devices includes a biometric sensor and wherein the set of one or more inputs further includes an input received via the biometric sensor.

28. The non-transitory computer-readable storage medium of claim 27, wherein prompting the user to provide authorization information at the first electronic device includes prompting the user to provide authorization information via the biometric sensor.

29. The non-transitory computer-readable storage medium of claim 16, wherein detecting the presence of the visual representation of data occurs while a camera application is active on the first electronic device and while the camera application is operating in a restricted mode.

30. The non-transitory computer-readable storage medium of claim 16, the one or more programs further including instructions for:
prior to detecting the presence of a visual representation of data, displaying, on the display, a preview of image data captured via the one or more cameras,
wherein prompting the user to provide authorization information at the first electronic device includes visually obscuring at least a portion of the preview of image data.

31. The non-transitory computer-readable storage medium of claim 16, the one or more programs further including instructions for:
receiving an indication that the visual representation of data has ceased to display on the second electronic device; and
in response to receiving the indication, ceasing prompting the user to provide authorization information at the first electronic device.

32. The non-transitory computer-readable storage medium of claim 16, wherein the determination that the set of one or more inputs includes or does not include authorization information that matches stored authorization information is made by the first electronic device.

33. The method of claim 17, wherein:
subsequent to detecting, at the first electronic device, the presence of the visual representation of data that is displayed on the display of the second electronic device, a first prompt is displayed on the display of the second electronic device, and
the first prompt indicates a first type of authentication available at the first electronic device.

34. The method of claim 32, wherein the first type of authentication is biometric authentication via a facial recognition sensor and the first prompt displayed on the display of the second electronic device indicates that biometric authentication via the facial recognition sensor is available at the first electronic device.

35. The method of claim 32, wherein the first type of authentication is biometric authentication via a fingerprint sensor and the first prompt displayed on the display of the second electronic device indicates that biometric authentication via the fingerprint sensor is available at the first electronic device.

36. The method of claim 32, wherein the first type of authentication is non-biometric authentication via a character input interface and the first prompt displayed on the display of the second electronic device indicates that non-biometric authentication is available at the first electronic device.

37. The method of claim 17, wherein:
the one or more input devices includes a biometric sensor and a non-biometric input device; and
prompting the user to provide authorization information at the first electronic device for enabling access to content on the second electronic device includes:
in accordance with a determination that biometric authentication is available at the first electronic device, generating, at the first electronic device, a prompt prompting the user to provide authorization information at the first electronic device via the biometric sensor; and
in accordance with a determination that biometric authentication is not available at the first electronic device, generating, at the first electronic device, a prompt prompting the user to provide authorization information at the first electronic device via the non-biometric input device.

38. The method of claim 36, wherein:
further in accordance with the determination that biometric authentication is available at the first electronic device, a second prompt displayed on the display of the second electronic device prompts the user to provide authorization information at the first electronic device via the biometric sensor; and
further in accordance with the determination that biometric authentication is not available at the first electronic device, a third prompt displayed on the display of the second electronic device prompts the user to provide authorization information at the first electronic device via the non-biometric input device.

39. The method of claim 32, further comprising:
after the first prompt is displayed on the display of the second electronic device, detecting a change in availability of the first type of authentication at the first electronic device, and
in response to detecting the change in availability of the first type of authentication at the first electronic device, providing information indicating that the first type of authentication is no longer available at the first electronic device which causes the first prompt that is displayed on the display of the second electronic device to be replaced with a fourth prompt displayed on the display of the second electronic device, wherein the fourth prompt indicates a second type of authentication available at the first electronic device that is different from the first type of authentication available at the first electronic device.

40. The method of claim 38, wherein replacing the first prompt that is displayed on the display of the second electronic device with a fourth prompt displayed on the display of the second electronic device includes animating a transition from the first prompt to the fourth prompt.

41. The method of claim 17, wherein the one or more input devices includes a physical input mechanism and wherein the set of one or more inputs includes one or more inputs received via the physical input mechanism.

42. The method of claim 17, wherein the one or more input devices includes a biometric sensor and wherein the set of one or more inputs further includes an input received via the biometric sensor.

43. The method of claim 41, wherein prompting the user to provide authorization information at the first electronic device includes prompting the user to provide authorization information via the biometric sensor.

44. The method of claim 17, wherein detecting the presence of the visual representation of data occurs while a camera application is active on the first electronic device and while the camera application is operating in a restricted mode.

45. The method of claim 17, further comprising:
prior to detecting the presence of a visual representation of data, displaying, on the display, a preview of image data captured via the one or more cameras,
wherein prompting the user to provide authorization information at the first electronic device includes visually obscuring at least a portion of the preview of image data.

46. The method of claim 17, further comprising:
receiving an indication that the visual representation of data has ceased to display on the second electronic device; and
in response to receiving the indication, ceasing prompting the user to provide authorization information at the first electronic device.

47. The method of claim 17, wherein the determination that the set of one or more inputs includes or does not include authorization information that matches stored authorization information is made by the first electronic device.

48. The first electronic device of claim 1, wherein the determination that the set of one or more inputs includes or does not include authorization information that matches stored authorization information is made by the first electronic device.

* * * * *

UNITED STATES PATENT AND TRADEMARK OFFICE
CERTIFICATE OF CORRECTION

PATENT NO. : 11,144,624 B2
APPLICATION NO. : 16/241199
DATED : October 12, 2021
INVENTOR(S) : Vincent P. Arroyo et al.

It is certified that error appears in the above-identified patent and that said Letters Patent is hereby corrected as shown below:

In the Claims

Column 53, Line 59, Claim 1, delete "one or more input devices one or more processors; and" and insert --one or more input devices;
one or more processors; and--.

Column 58, Line 56, Claim 34, delete "32" and insert --33--.

Column 58, Line 62, Claim 35, delete "32" and insert --33--.

Column 59, Line 1, Claim 36, delete "32" and insert --33--.

Column 59, Line 25, Claim 38, delete "36" and insert --37--.

Column 59, Line 38, Claim 39, delete "32" and insert --33--.

Column 60, Line 4, Claim 40, delete "38" and insert --39--.

Column 60, Line 17, Claim 43, delete "41" and insert --42--.

Signed and Sealed this
First Day of October, 2024

Katherine Kelly Vidal
*Director of the United States Patent and Trademark Office*